(12) United States Patent
Lee

(10) Patent No.: US 6,886,160 B1
(45) Date of Patent: Apr. 26, 2005

(54) DISTRIBUTION OF MAINFRAME DATA IN THE PC ENVIRONMENT

(76) Inventor: Hyung Sup Lee, 57 23 226th St., Bayside, NY (US) 11364-2046

( * ) Notice: Subject to any disclaimer, the term of this patent is extended or adjusted under 35 U.S.C. 154(b) by 495 days.

(21) Appl. No.: 09/726,462

(22) Filed: Nov. 29, 2000

(51) Int. Cl.$^7$ ................................................. G06F 9/45
(52) U.S. Cl. ......................... 717/173; 717/177; 717/178
(58) Field of Search ............................... 717/168, 169, 717/170, 171, 172, 173, 174, 175, 176, 177, 178

(56) References Cited

U.S. PATENT DOCUMENTS

| | | | | |
|---|---|---|---|---|
| 6,074,435 A | * | 6/2000 | Rojest.ang.l | 717/173 |
| 6,493,871 B1 | * | 12/2002 | McGuire et al. | 717/173 |
| 6,536,039 B2 | * | 3/2003 | Sanford | 717/173 |
| 6,601,212 B1 | * | 7/2003 | Guha et al. | 714/776 |
| 6,615,404 B1 | * | 9/2003 | Garfunkel et al. | 717/173 |

OTHER PUBLICATIONS

Riely et al, An instance of the application download pattern: The SPAIDS software loader verifier domain analysis and implementation, ACM pp 273–278, 1997.*

Borkar et al Automatic segmentation of text into structured records, ACM SIGMOD pp 175–186, 2001.*

Yaung et al. Linkage metrics for process reeengineering, ACM Proc. of 1993 conf. of Ctr of Advance studies on colloboration Resh in SWE, Oct. 1993, vol. 1.*

* cited by examiner

*Primary Examiner*—Anil Khatri
(74) *Attorney, Agent, or Firm*—Ladas & Parry

(57) ABSTRACT

A method of distributing mainframe software and data using PC-based data media is disclosed, comprising a mainframe program for converting a mainframe sequential dataset or all or part of a mainframe library of texts or load modules to a sequential dataset of fixed length records and for reverting these converted records to its original form in the same or another mainframe data center, and procedures for downloading the converted mainframe data to a PC and uploading the PC file to a mainframe. The converted mainframe data downloaded to a PC can be delivered to another mainframe data center using floppy diskketes, recordable CD-ROM, Internet Website, TCP/IP FTP, or email attachment, as an alternative to magnetic tapes. The PC hard disk is used as a backup storage of the mainframe libraries, and a mainframe text library downloaded to a PC can be edited on a local or remote stand-alone PC.

22 Claims, 13 Drawing Sheets

Transporting a load module when the receiver doesn't have the program PCFORM

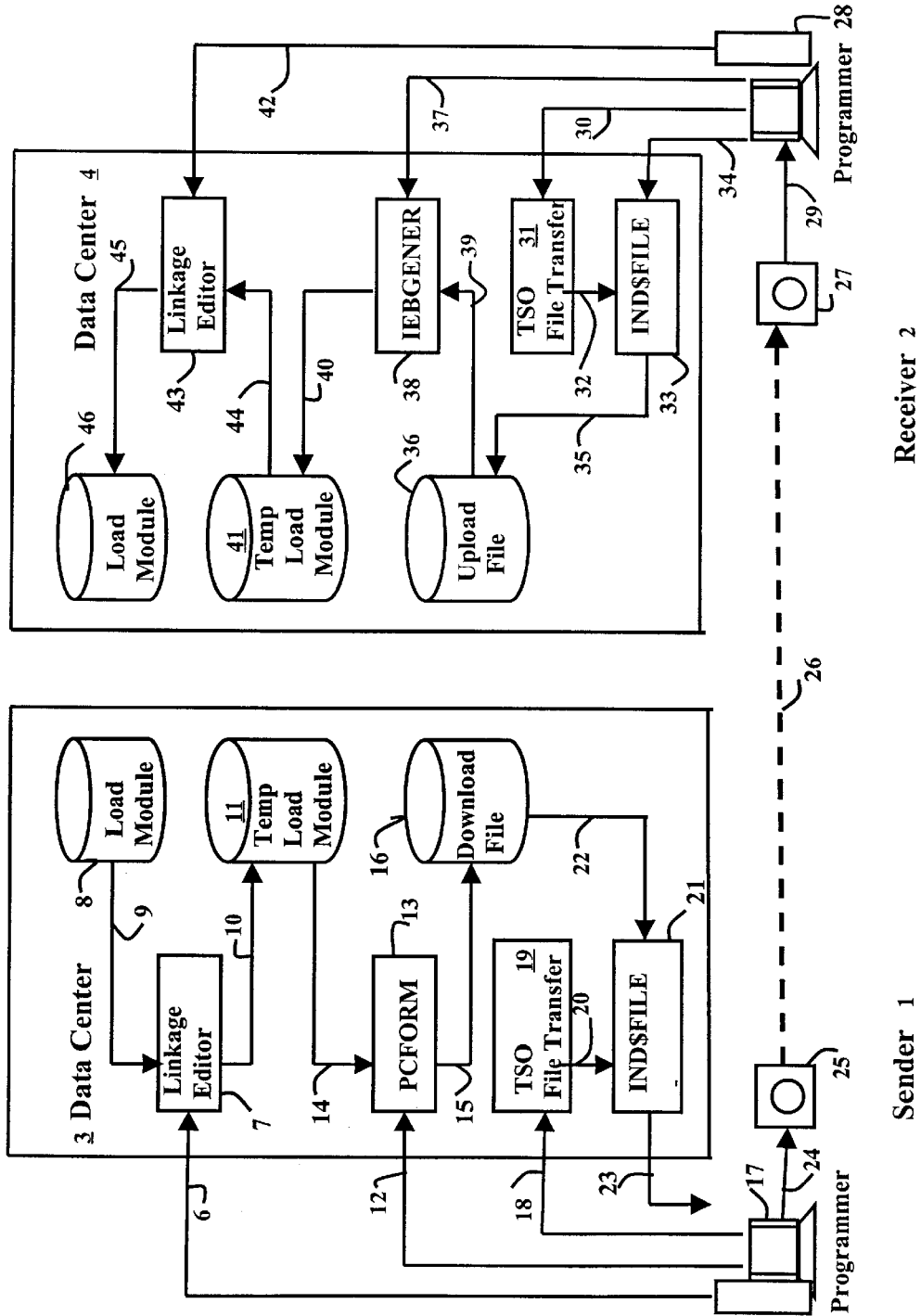
Fig. 1  Transporting a load module when the receiver doesn't have the program PCFORM

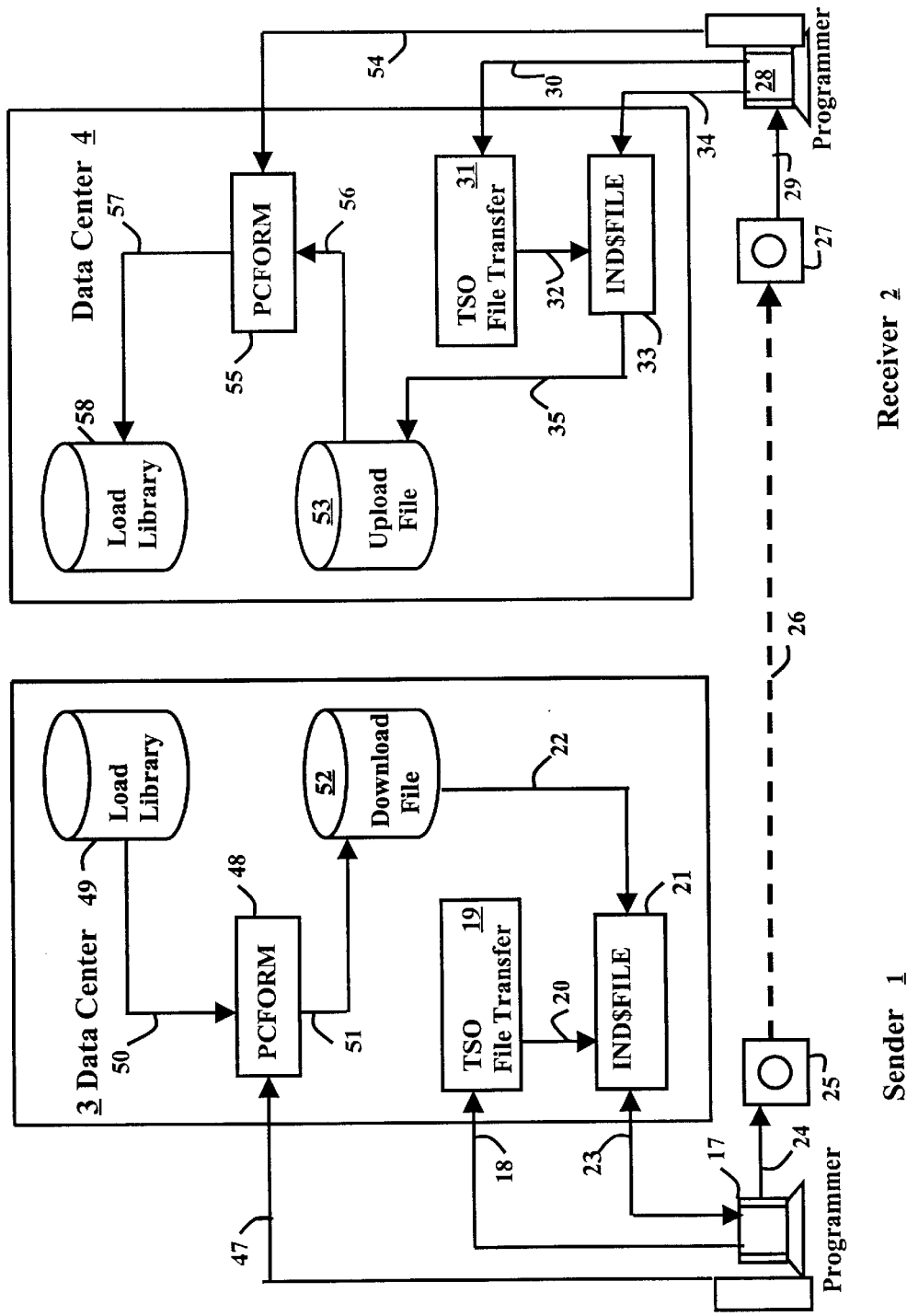
Fig. 2 Transporting a load library when the receiver has the program PCFORM

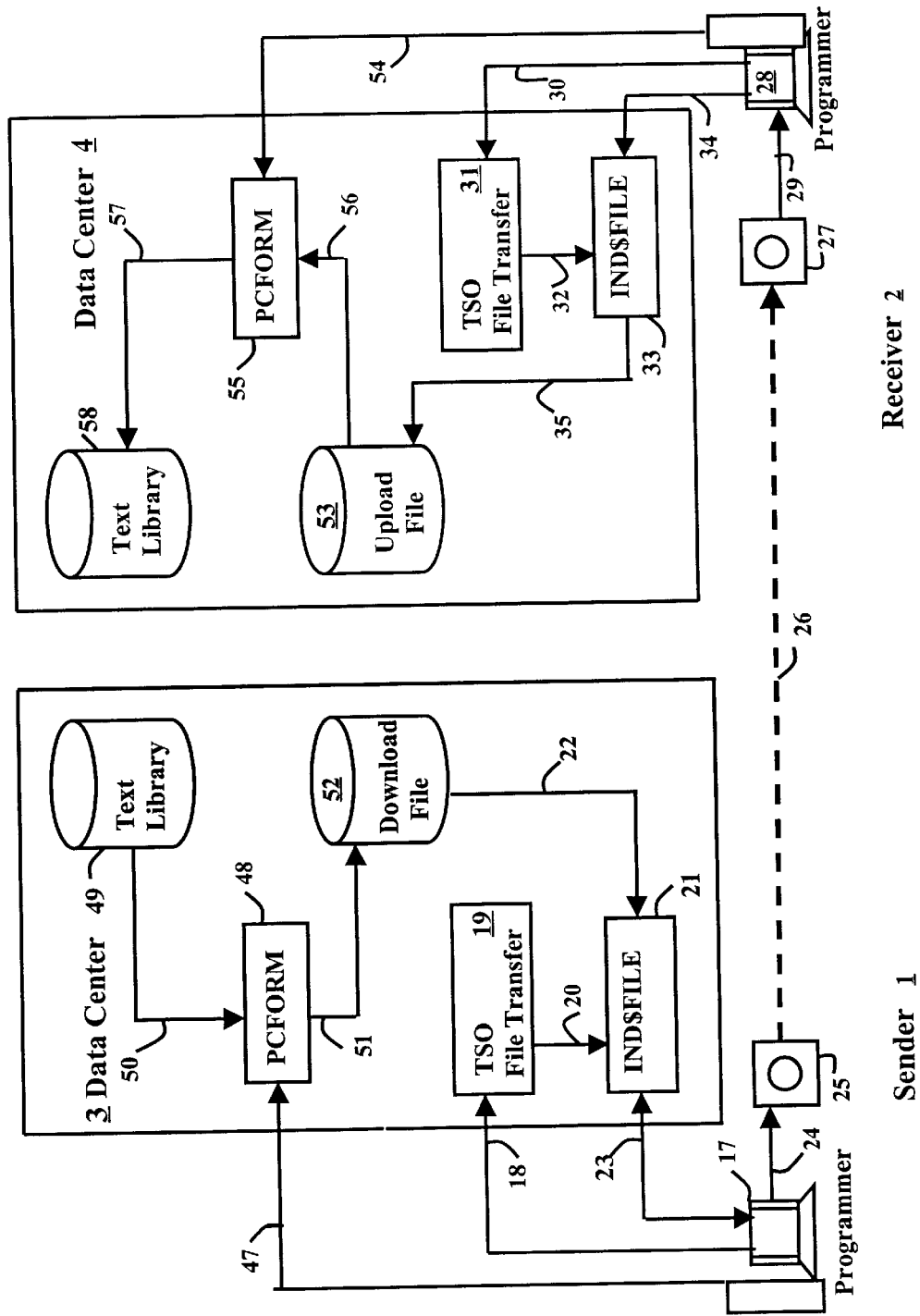
Fig. 3 Transporting a text library when the receiver has the program PCFORM

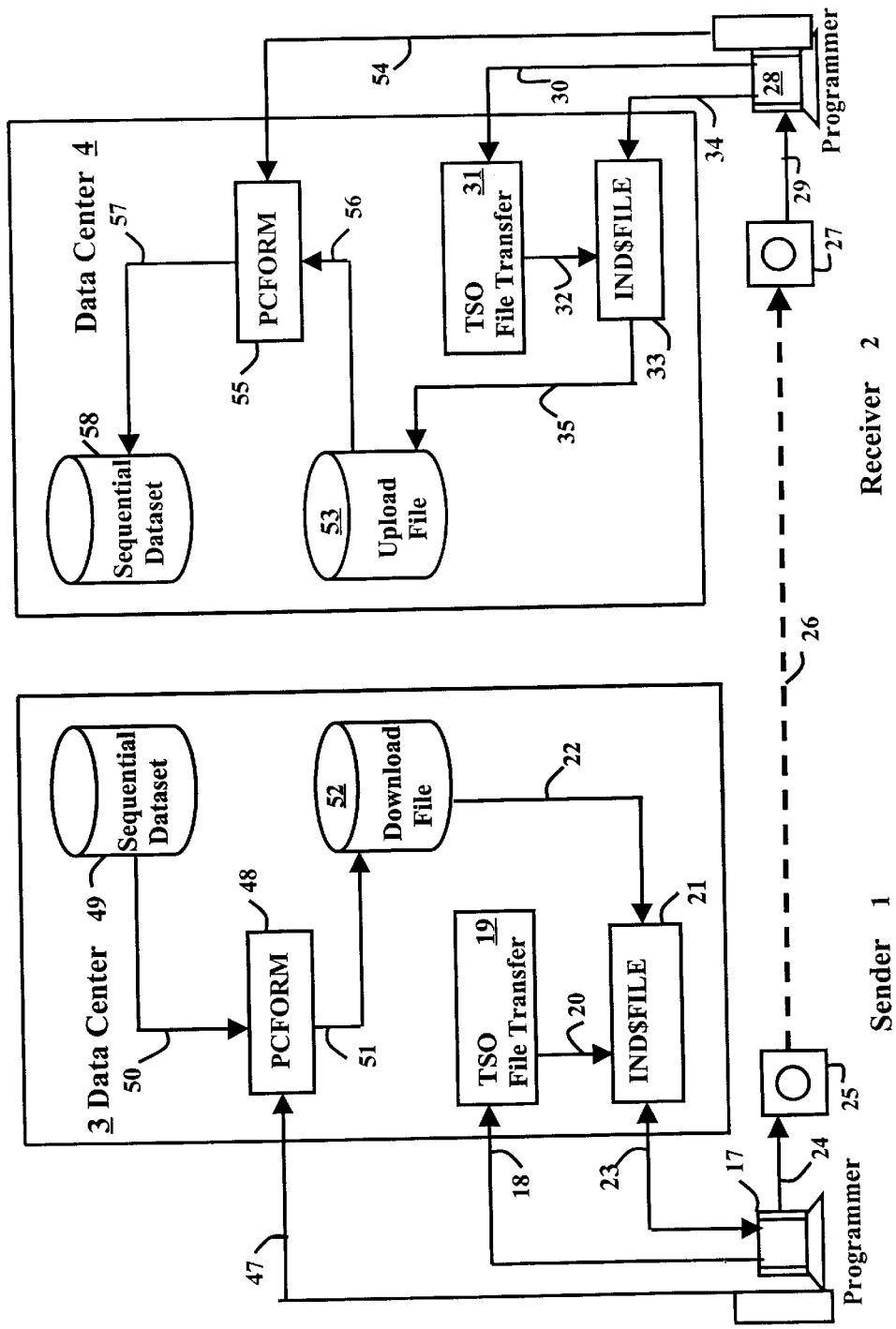
Fig. 4 Transporting a sequential dataset of fixed, undefined or variable record format when the receiver has the program PCFORM

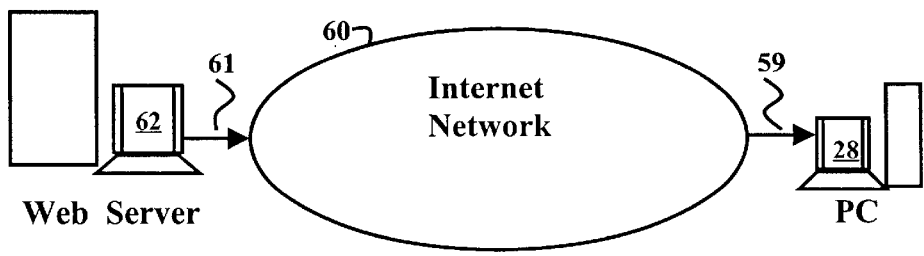
Fig. 5. World Wide Web and the Internet Download
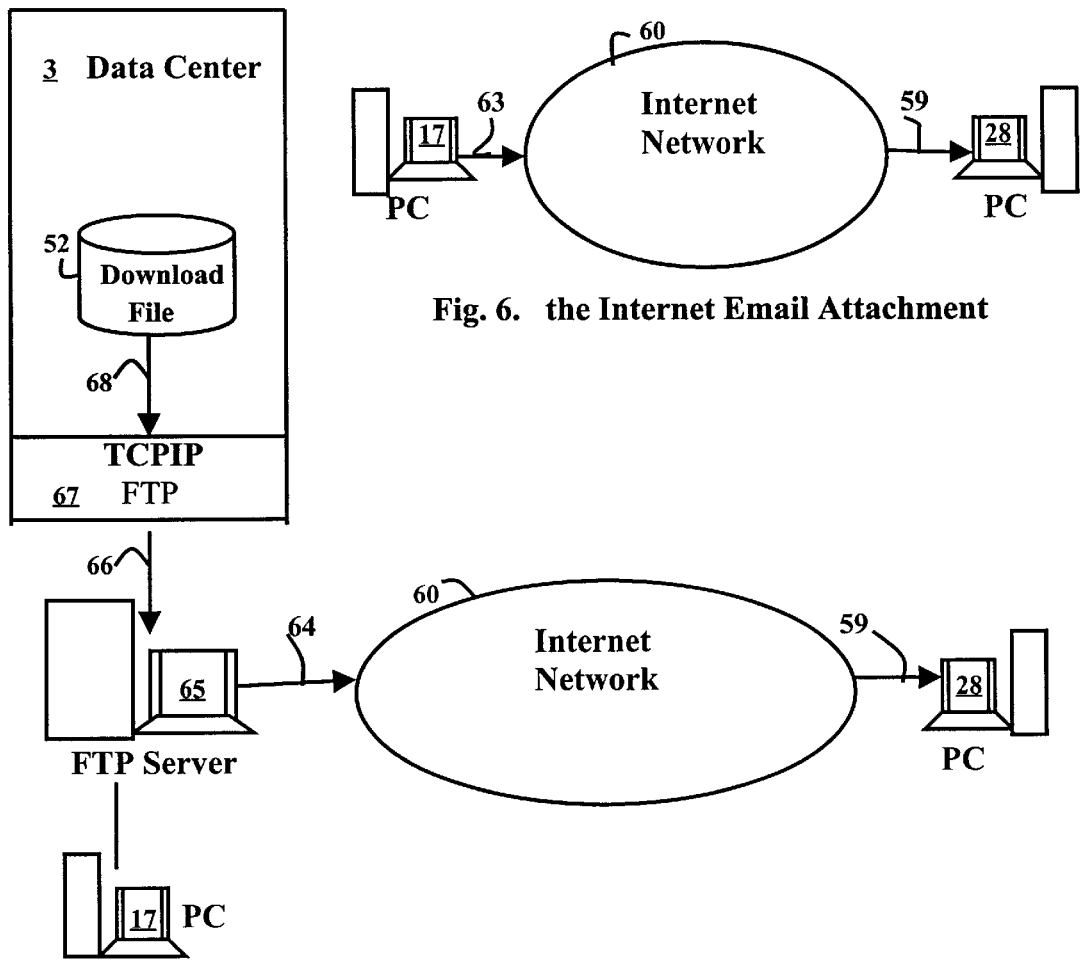
Fig. 6. the Internet Email Attachment
Fig. 7. FTP Download

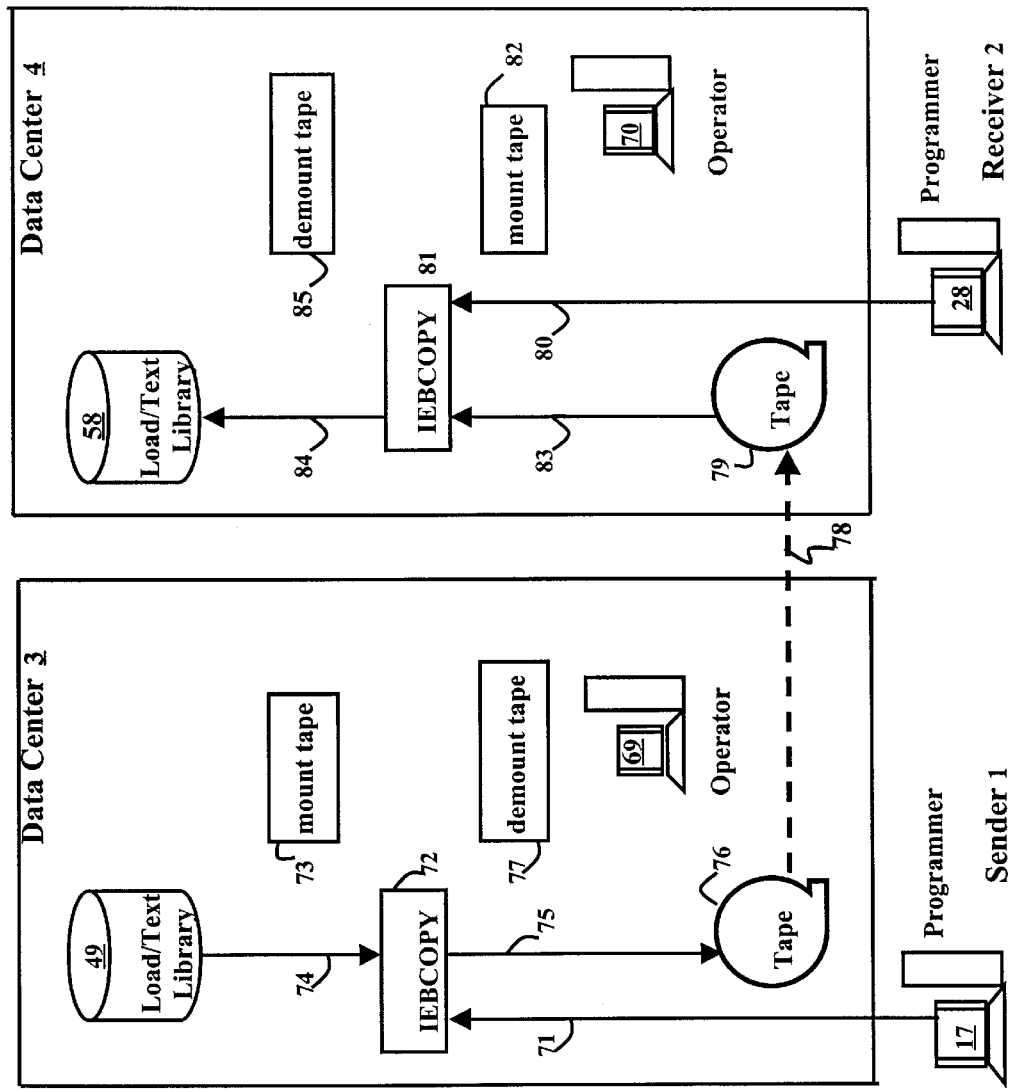
Fig. 8 The Conventional Tape Delivery of a Load/Text Library

Fig. 9. The Conversion Program PCFORM
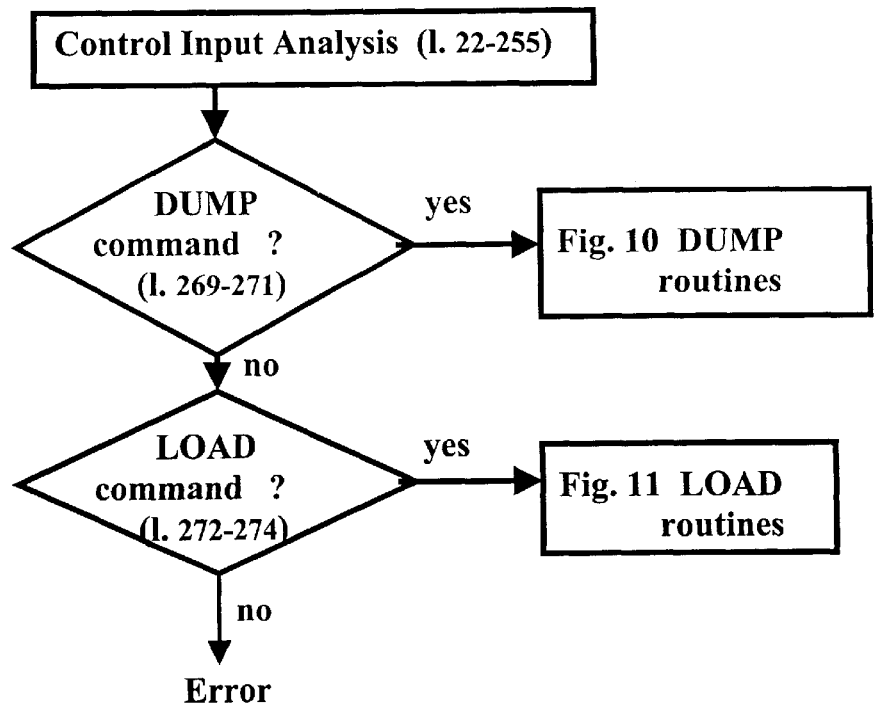
Fig. 10 DUMP Routines
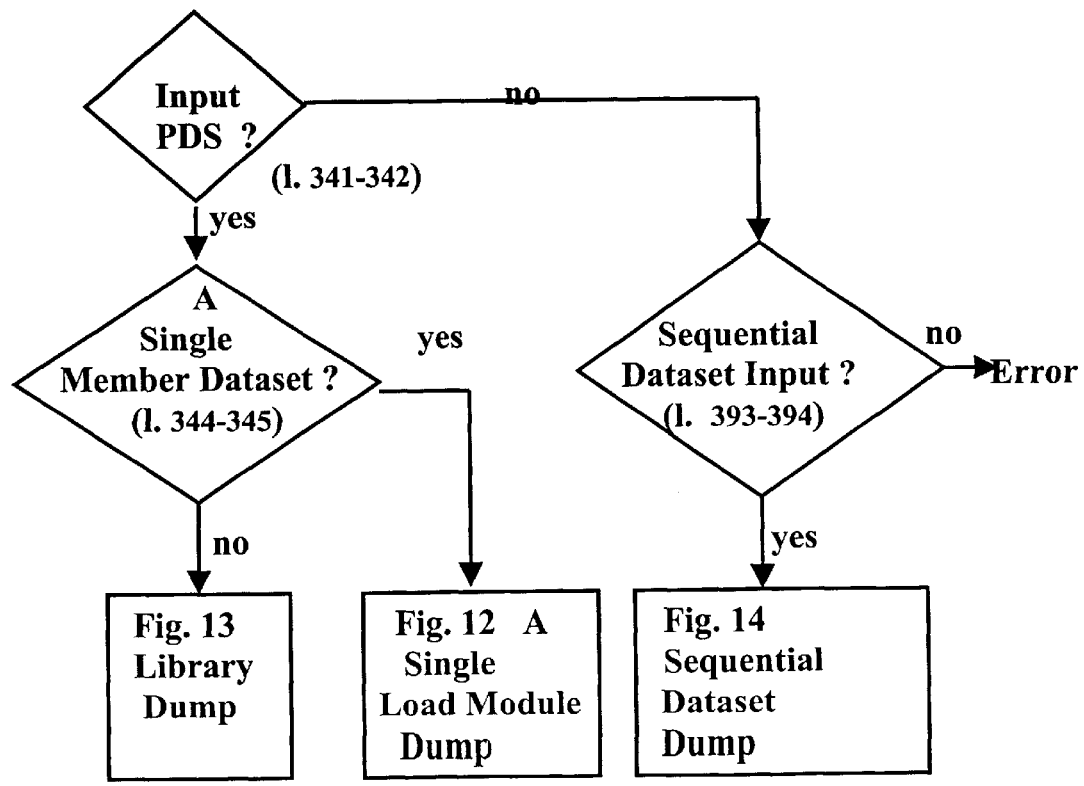

Fig. 11 LOAD Routines
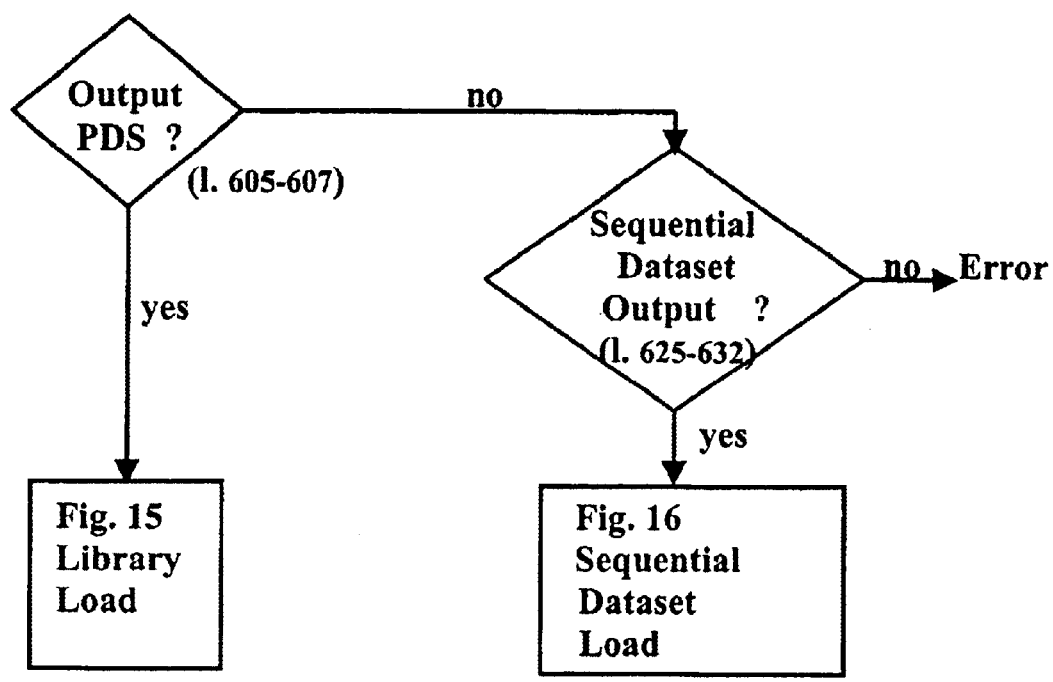
Fig. 12. A Single Load Module Dump Routine
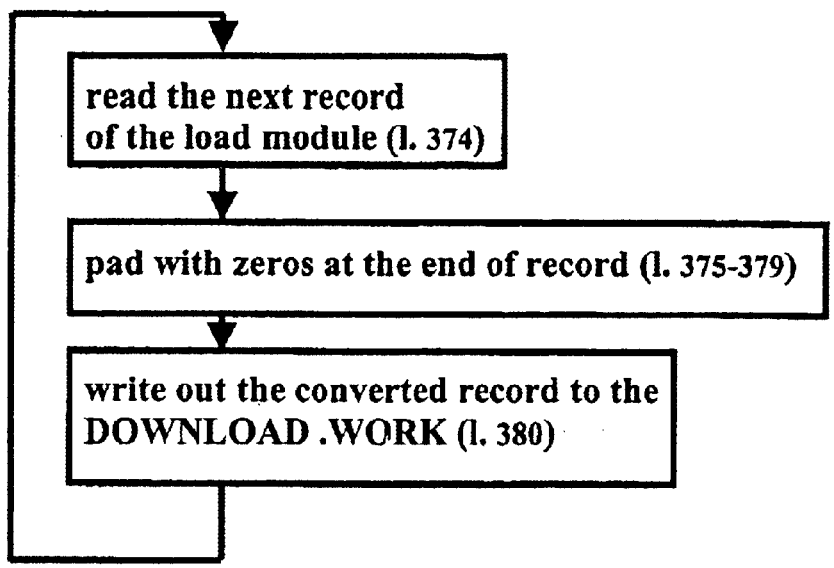

Fig. 13. Library DUMP Routine
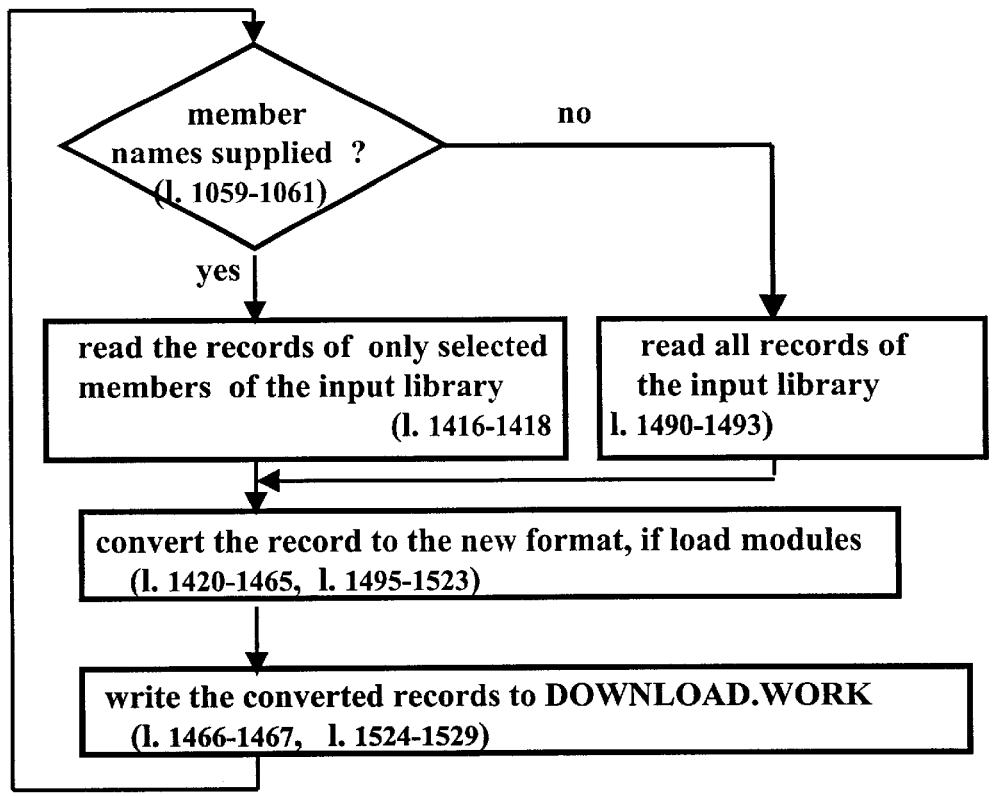
Fig. 14. Sequential Dataset Dump Routine
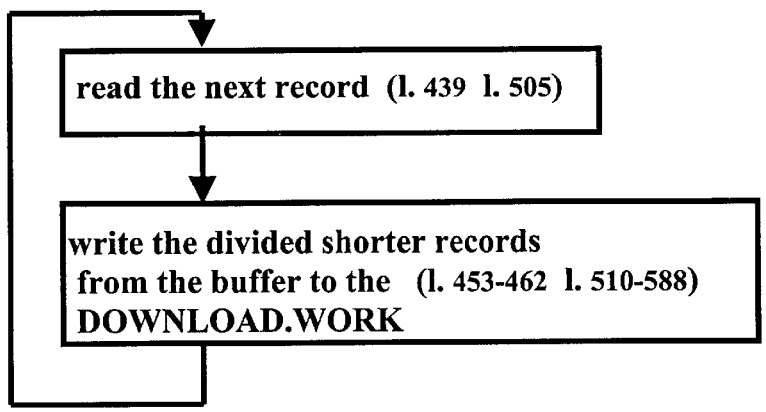

Fig. 15. Library LOAD Routine
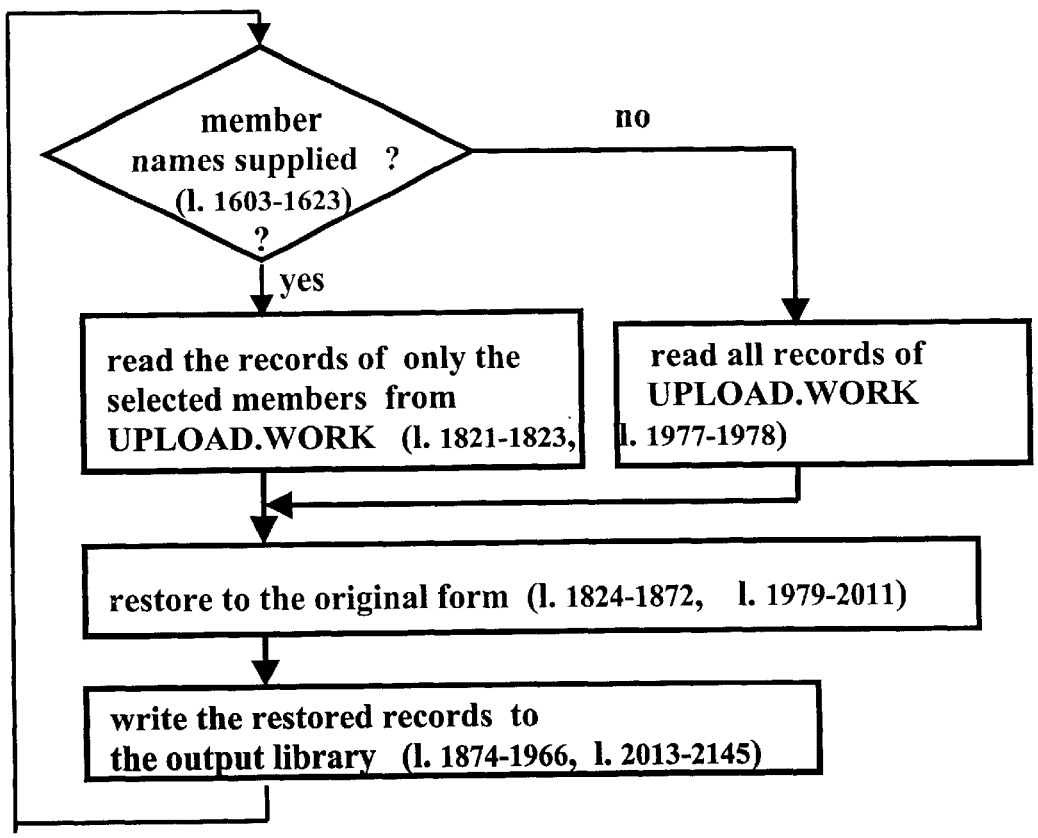
Fig. 16. Sequential Dataset LOAD Routine
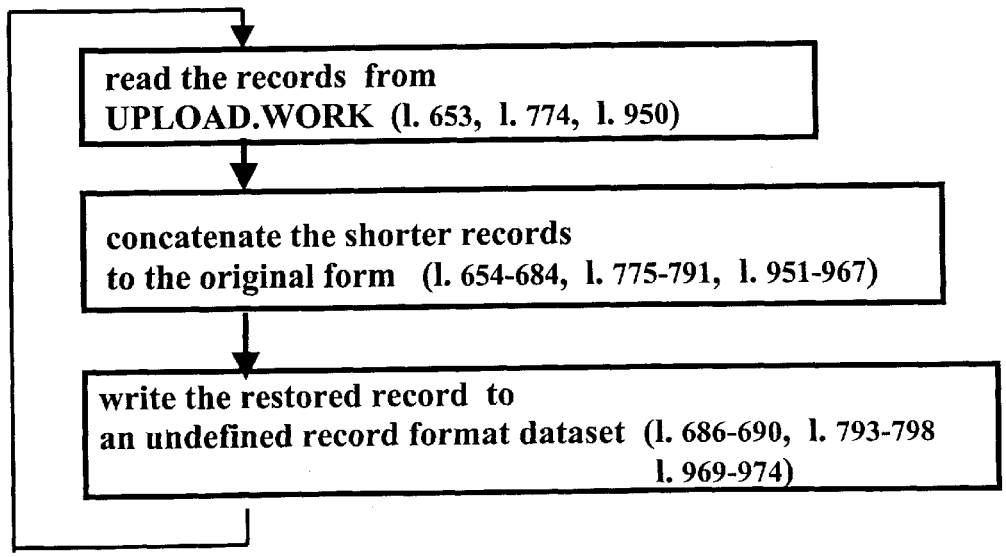

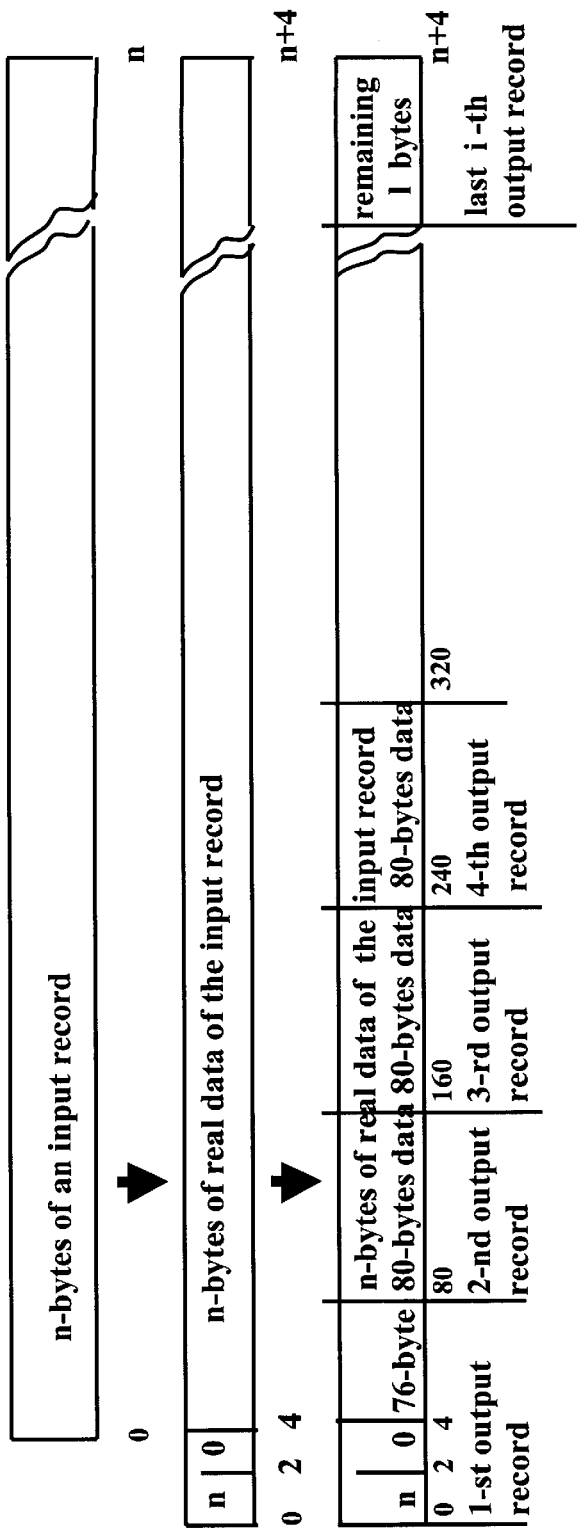

Fig. 17 A Conversion Method of A 4-bytes Header and Division

\* The length of the input record is assumed as n bytes long.

The logical record length of the output (Download & Upload) sequential dataset is assumed as 80-bytes.

A 4-bytes header with 2-bytes of real data length, e.g., n, and 2 null bytes.

$i = [(n+4+79)/80]$    where i-th record is the last output record of an input record and [...] is an integer value $l = (n+4) - ((i-1)*80)$    bytes length of the last output record

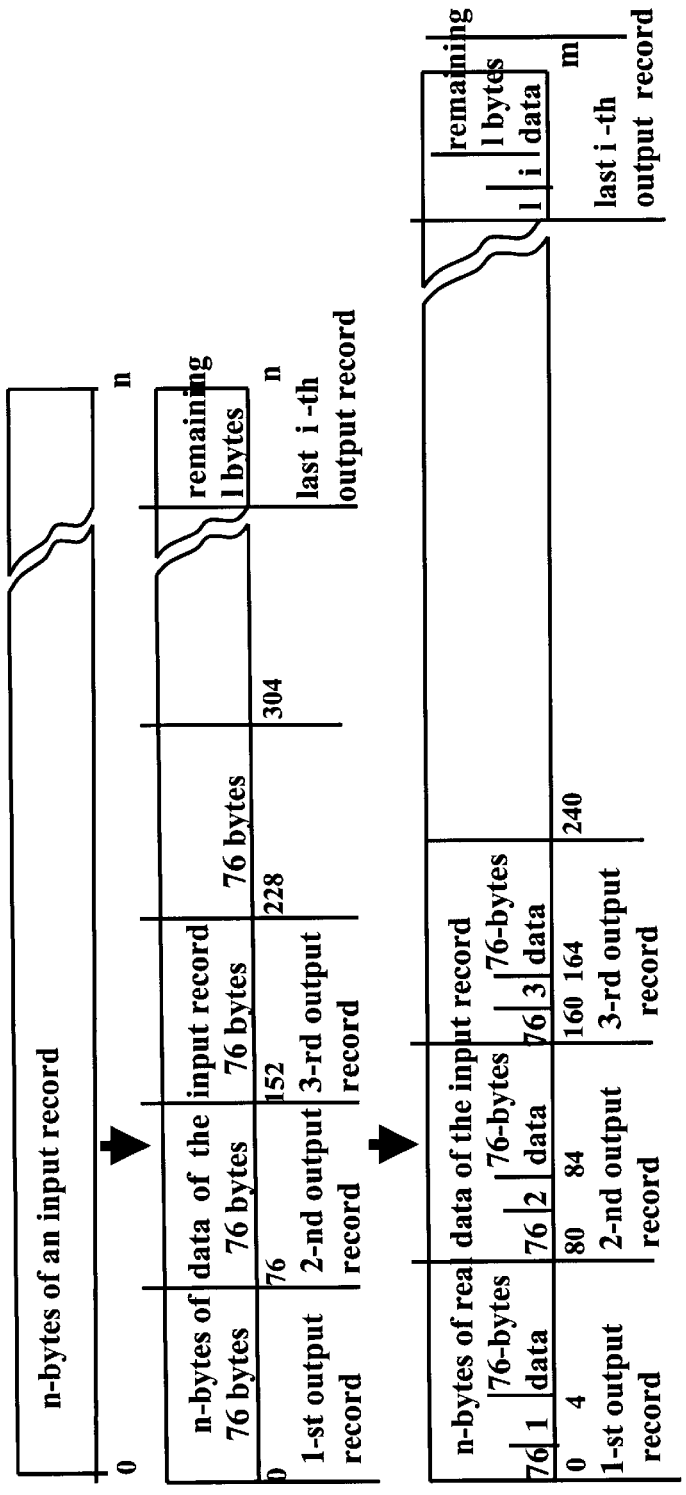

Fig. 18  A Conversion Method of Division into Shorter Records and A 4-bytes Header for Each Divided Shorter Record

* The input record is assumed as n bytes long.
The logical record length of the output (Download & Upload) dataset is assumed as 80-bytes long.
A 4-bytes header, for each divided shorter record, with
  2-bytes of real data length, e.g., 76  and
  2-bytes of sequence number of divided records
$i = [(n+75)/76]$    where i -th record is the last output record and [...] is an integer value
$l = n - ((i-1) * 76)$  bytes of real data in the last output record
$m = (i-1) * 80 + (l+4)$

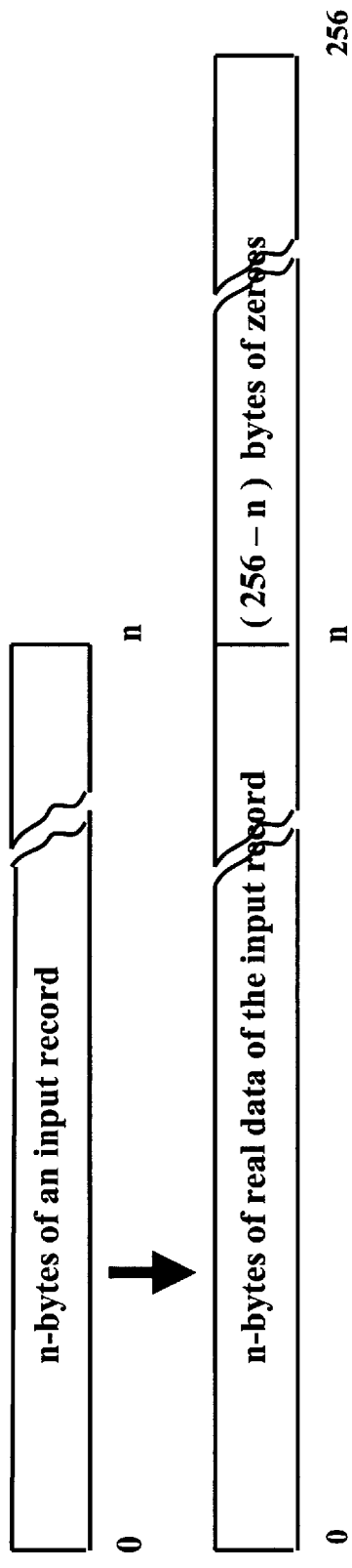

Fig. 19  Zero Padding of a record of a single load module

* The logical record length of the output (Download & Upload) sequential dataset is the same as the block size (maxmum record length) of the input load module library where the target single load module is located.  It is assumed as 256-bytes.

The length of the input record is assumed as  n  bytes long  where the maximum value of n is the block size of the library and it is assumed as 256 and the minimum value of n is 1.

DISTRIBUTION OF MAINFRAME DATA IN THE PC ENVIRONMENT

FIELD OF THE INVENTION

The invention relates to the distribution method of mainframe data using PC-based data media. More specifically, the invention relates to a mainframe program for allowing the file transfer of mainframe sequential datasets and libraries of texts or load modules between a mainframe computer and a PC and between two mainframe computers using floppy diskettes, recordable CD-ROM, Internet world wide web, TCP/IP FTP, and email attachment, thus providing an alternative to magnetic tape reels and tape cartridges, also allowing the PC hard disk to be used as a backup storage of the mainframe libraries, as well as for allowing a mainframe text library which is downloaded to a PC to be edited on a local or remote stand-alone PC workstation.

DISCUSSION OF RELATED ART

There are currently more than 21,000 mainframe data centers worldwide. More than 2 trillion dollars has been invested in mainframe software (around 150 billion lines of COBOL code alone worldwide). Mainframe computers are becoming less expensive ($100,000/MIPS in 1992, $2,300/MIPS in 2000, and $840 in 2002). 70% of all business information resides in mainframe databases. The operation costs of the distributed computing based on mini-computers are high. More than anything else, businesses need machines with enough computative power, a need which mini-computers cannot satisfy. Mainframes will continue to be the main workhorses for big businesses for the foreseeable future.

Mainframes have been upgraded by replacing the former "dumb" terminals, such as the IBM 3270s terminals which provided little more than a keyboard and a display screen, with desktop personal computers (PCs). These PCs can also be used as stand-alone computers for text editing, word processing, and other office tasks, when not being used as mainframe terminals.

A PC can connect to a mainframe system with the proper software and proper communication link. A PC terminal connects to and communicates with a mainframe through an IBM Systems Network Architecture(SNA) 3270 protocol emulation software. The PC can operate as a LAN terminal using a LAN server, an SNA gateway, and a 3270 emulation software, e.g., Attachmate Extra Personal Client™. The PC can work as a stand-alone mainframe terminal through a Synchronous Data Link Control (SDLC) communication board, a leased-line modem, and a 3270 emulation software, such as Attachmate Extra™, 3270 Elite™, or Dynacomm/Elite™. Or an Internet-enabled PC can work as a stand-alone mainframe terminal through a Telnet server which supports TCP/IP application protocol TN3270 clients with TN3270 Telnet SNA 3270 protocol emulation software, such as QWS3270 Plus TN3270 Telnet application™ of Jolly Giant Software or E-Term™ for IBM of DCSi.

The following procedure (Procedure #1) is a PC-mainframe connection procedure for an Internet-enabled PC with QWS3270 Plus TN3270 application software of Jolly Giant Software:

Procedure #1

A PC-to-mainframe Connect Using TN3270 Telnet

2. A PC-to-mainframe connect using TN3270 Telnet
1. Start the program QWS3270.
2. 'QWS3270PLUS TN3270 Telnet' screen comes up. Click the Host menu.
3. Click Connect from the drop-down list.
4. 'Host Selection' screen comes up.
   Type Session_Name. e.g., lj01
      decided by Host site
   Type Host_Name. e.g., 123.45.67.89
      a Telnet server's IP address
   Type Port number. e.g., 21 or 23.
      decided by Host site
   Choose Terminal_Type. e.g., IBM-3278-2
   Click Connect button.
5. Internet Dialing and Connecting screens come up.
6. The mainframe data center's main SignOn screen comes up.
   Type User Id. e.g., a TSO User ID. lj01
   Type Password. e.g., password of lj01
7. TSO screen comes up.

A PC connected to a mainframe with an IBM SNA 3270 protocol emulation software or the TN3270 Telnet software supports file transfers between the mainframe and the PC using the IBM mainframe program "IND$FILE". An Internet-enabled PC connected to a mainframe FTP server using the TCP/IP file transfer protocol (FTP) also supports the file transfer between the mainframe and the PC.

The three file transfer procedures (Procedures #2–4) between a mainframe and a PC are explained as examples. The first procedure(Procedure #2) is a file transfer during a TSO session using Attachmate Extra SNA 3270 emulation software:

Procedure #2

TSO File Transfer with Attachmate Extra Emulator
1. Get out of ISPF screen.
2. On 'READY' TSO prompt screen, click Tools menu.
3. Click Transfer_File from drop-down list.
4. On the 'Transfer File' screen:
   Type PC_File name.
   Type Host_File name inside quotes.
   Choose the transfer direction between Send or Receive.
   Choose a Scheme between Binary or Text mode.
   Choose TSO between the Host Systems TSO, CICS, and CMS.
   Click Add_to_List button.
   Click Transfer button.
5. 'File Transfer Progressing' screen comes up.
6. After the transfer is complete, the 'Transfer Summary' screen appears.
   Check for the message 'TRANS03 File Transfer complete.'
7. Click OK button.
8. A 'READY' TSO prompt screen will appear.

The second procedure (Procedure #3) is for an FTP file transfer started from the Attachmate main screen without a TSO session:

Procedure #3

FTP File Transfer from Attachmate Main Screen
1. Terminate TSO session.
2. On Attachmate initial session list screen, click Tools menu.
3. Click File_Transfer from drop-down list.
4. On 'File transfer' screen:
   Type PC_File name.
   Type Host_File name inside quotes.

Choose the transfer direction between Send or Receive.

Choose a Scheme between Binary or Text mode.

Click Transfer button.

5. On 'FTP Connect' screen:

Type Host_IP address. e.g., 123.45.67.89 or alias of FTP server

Type User_ID. e.g., a TSO User ID, lj01

Type Password. e.g., a TSO User ID's password

Click OK button.

6. 'File transfer' screen comes up.

7. On 'Transfer Summary' screen, check 'Transferred successfully' Comment message.

Click OK button.

8. Attachmate initial session list screen comes up.

The third procedure (Procedure #4) is FTP File Transfer started from MS-DOS prompt screen:

Procedure #4

FTP File Transfer from MS-DOS Screen

1. Minimize or terminate all other applications including Attachmate Extra.
2. Start MS-DOS.
3. On MS-DOS screen with C:\WINDOWS> prompt:

Type FTP after C:\WINDOWS> prompt.

Press Enter key.

4. FTP> prompt comes up.

Type OPEN and Host_IP-address at FTP> prompt. e.g., OPEN 123.45.67.89 or OPEN abc.def.ghij.com.

Press Enter key.

5. Internet connection starts,

Dialing screen and Connecting screens come up.

And finally the Internet screen disappears.

6. Click the minimized FTP program icon.
7. MS-DOS screen appears again with FTP messages of "Connected" and others.

Type User ID at User prompt. e.g., lj01

Press Enter key.

Type password at Password prompt

Press Enter key.

8. "Logon successful" FTP message comes up with FTP> prompt.

Type BINARY or ASCII at FTP> prompt.

At the FTP> prompt, type GET 'LJ01.TEXT.LIB(TEXT1)' C:\LJ01\TEXT1.TXT for download from mainframe to PC or type PUT C:\LJ01\TEXT1.TXT 'LJ01.TEXT.TEMP1' for upload from PC to mainframe.

Press Enter key

9. Transfer starts.
10. After completion of transfer, check for '250 Transfer completed successfully' FTP message.

11. Type QUIT at FTP> prompt.

Press Enter key.

12. Main Windows screen with all icons comes up.

Click the minimized MS-DOS icon. 13. MS-DOS screen comes up again with C:\WINDOWS> prompt.

Type EXIT at C:\WINDOWS> prompt.

Press Enter key. 14. Original Windows screen with all icons comes up.

After the mainframe file is transferred to a PC, the mainframe data stored in a PC can be copied to a PC-related data media repeatedly. Ubiquitous PC usage worldwide and the file transfer capability make it possible to send and receive data between mainframe data centers using PCs. Furthermore, the rise of PC-based technologies in exchanging information, such as email attachments using SMTP, the Internet world wide web, and FTP send/receive facility, allow data centers to transfer mainframe data using methods which were not previously available.

However, mainframe installations still send their mainframe libraries of texts and program load modules to other data centers using the half-inch thick, 9-track, 1600/6250 BPI, 1,200 foot 8.5-inch diameter or 2,400 foot 10.5-inch diameter round reel tapes created from IBM 3420/3430 Magnetic-Tape Units or 18-track, 550 foot 38,000 BPI tape cartridges created from IBM 3480 Magnetic-tape Units located in the mainframe computer rooms.

There have been no alternatives until now. These magnetic tapes or cartridges require IBM proprietary magnetic tape units.

There are two main reasons for using magnetic tapes exclusively to deliver a mainframe library. First, a part or whole of a mainframe library can not be downloaded (file transfer from a mainframe to a PC) as a whole. Currently, each member of the mainframe library can only be downloaded individually one at a time. Therefore a mainframe library can not be delivered to other data centers using PC-based data media. At mainframe data centers, libraries are processed only by dataset utility programs developed by IBM. Currently, IBM does not provide the capacity to distribute a mainframe library via PC-related data media.

Second, only sequential datasets of fixed length records (a "flat" file, in PC terms) or text datasets of undefined record format can be delivered to another data center using PC-related data media, and be safely reverted to its original form at another mainframe data center. While any sequential datasets can be downloaded to a PC a single file at a time, not all sequential datasets can be reverted to their original form when uploaded (file transfer from a PC to a mainframe) at the same or another data center.

During the downloading process each mainframe record is concatenated to the previous record to create a long thread of string, and stored upon the PC. The uploading process breaks down this long concatenated string of PC data into separate mainframe records. A text file can be downloaded to a PC in text mode with a carriage return (CR, hexadecimal value 0D) and line feed (LF, hexadecimal value 0A) marker appended to the end of each record as a record separator. This file can then be uploaded to a mainframe and reverted to its original form by detecting the CR/LF separator as a marker for the end of each record.

In general, any text file or hexadecimal file of fixed length records can be transferred to a PC in binary mode without appending a record end marker, and can be reverted to its original form when uploaded to a mainframe in the same binary mode. This is possible only because the length of all records are the same, and each record can be separated at the same length even without record separators. Text sequential datasets of undefined record format are rarely in use.

Mainframe load modules are not of fixed length records, they are of undefined record format and they contain a lot of non-character hexadecimal data. As a result, mainframe load modules can not be reverted to their original form when they are uploaded back to a mainframe. Therefore, currently, mostly text datasets of fixed length records, e.g., usually members of text libraries, are delivered, member by member, to other mainframe data centers using PC-based data media.

The mainframe library is a partitioned dataset (PDS) and is equivalent to a PC directory or subdirectory which contains a large number of files as its components. The mainframe library also contains components so called members. There are only two types of mainframe libraries, a text library with only text members and a load library with only program load module members. Each member has records in it. Members of a library have common attributes, such as the record format, maximum record length, and length of each record. Each member can be handled as a separate sequential dataset. A single member of a text or load library is simple to process, but the processing of a library as a whole is not simple.

Text library members have fixed length records of 80-bytes long, and are used for storing program source codes, macros, procedures (PROCs), JCL statements, help texts, instructions, manuals, documents, and letters. Currently, only text library members are downloaded to a PC one member at a time, and copies of each text member are delivered using PC-based data media if necessary. A part or whole of a text library is still delivered using conventional magnetic tapes or cartridges exclusively.

The mainframe program load module is different from text files. The members of a load module library are all executable program load modules (the output of the IBM linkage editor IEWL, also called a load module, and the equivalent of a PC "program" file with .exe, .com, or .dll extensions). Each member has individual records in it. Each record of a load module contains mostly non-readable, non-character hexadecimals, interspersed with some readable characters. The length of any record can be different from that of any other record. The load library is defined only with the maximum record length (at least 256 bytes, but usually greater than 12,000 bytes, upto 32,760 bytes). Each record can be less than 256 bytes long or longer than 256 bytes, up to 32,760 bytes long.

These load modules must be transferred to a PC in binary mode due to the fact that it contains hexadecimal data. A single program load module is handled as a sequential dataset of undefined record format, and it is not of fixed length records. Each record of different length must be separated from the next record by an end marker when downloaded to a PC, similar to the use of CR/LF as mentioned above in the case of the text mode transfer. However this end marker can be confused as normal hexadecimal data, and can not be handled correctly when uploaded to a mainframe. So, each record of a load module is concatenated at the end of the previous record without a separating marker when downloading. If this concatenated string of data, which does not possess a record separator, is uploaded to a mainframe in binary mode again, the end of each record can not be determined. Therefore the uploaded file will not have its original form, and will no longer be executable.

In summary, currently only a sequential dataset of fixed length records (e.g., a member of a text library), can be delivered to other mainframe data centers using PC-related data media. A part or whole library can not be downloaded to a PC as a single unit, so magnetic tapes or cartridges are exclusively used for the distribution of a part or whole of a program load library or text library to other mainframe data centers.

SUMMARY OF INVENTION

A new mainframe program, PCFORM, converts the content of the whole or a part of any mainframe library of load modules or texts or any sequential dataset of fixed record format, undefined record format or variable record format to a sequential dataset of fixed length records (FIGS. 17–19). These converted data can be subsequently downloaded to a PC and reverted to their original form in the same or another mainframe data center, if uploaded from a PC.

This invention makes it possible for software text and load libraries and VSAM and DB2 datasets, which are sequential datasets of undefined record format, to be transferred to another data center. Any libraries or any sequential datasets can be transferred to another data center.

This invention allows the mainframe data transfer to be conducted using PC-based data media as an alternative to the conventional magnetic tape reels and tape cartridges. The new program PCFORM can be even distributed by a diskette, a recordable CD-ROM, over the world wide web, via FTP, or as an email attachment, and installed at the user's mainframe without having to use the aforementioned tapes. After the installation of PCFORM, any kind of library can be transported to that data center via any PC data media.

The PC-based data media mentioned above to be used in conjunction with this invention can include any of the following: 3.5-inch standard 1.44 MB floppy diskettes, 650–700 MB recordable CD-ROM's, 100 MB or 250 MB ZIP disks, 3.5-inch 120-Mbytes SuperDisk diskettes, email, Internet Website, TCP/IP FTP or TELNET, and any other PC data media technologies which will be widely used in the future, such as recordable DVD-ROM's.

This invention helps mainframe programmers download their mainframe texts and load modules from expensive mainframe disks to cheap and high-capacity PC hard disks. This allows mainframe programmers to use PC hard disk space to store backups of their mainframe work text data and load modules. This avoids the excessive buildup of backup libraries within mainframe disks, as well as the external accumulation of magnetic tapes.

By downloading the mainframe text library data to a PC, the mainframe programmers can perform routine text editing work on a stand-alone PC work station, instead of signing on to the mainframe. The copy of the downloaded PC file can be carried to a remote PC, where the mainframe programmer can perform any text editing.

The main benefits of this invention are derived from the facts that (1) PCs are ubiquitous, and familiar to most mainframe data center users, (2) most mainframe data centers already have a file transfer facility between their PC terminals and the mainframe, (3) a PC hard disk file of the downloaded mainframe dataset can be used repeatedly, (4) copying from a PC hard disk to PC-based data media is simpler, easier, and faster than creating a mainframe magnetic tape, (5) delivery is easy and simple, (6) emerging CD-ROM, Internet, TCP/IP FTP, and email can be used, (7) PC data media can be a convenient means for the backup storage of a mainframe text library and load library, and (8) a PC, local or remote, can be used as a stand-alone working station for mainframe text editing, especially for program source codes.

The only requirement to be able to use this invention is that the sender and the receiver of this portable PC data media must have a file transfer facility between a mainframe and a PC. Then the program PCFORM can be installed on their mainframe system using the invention itself, without using any magnetic tapes from the start. After the program PCFORM is installed, a part or whole of any library or any sequential dataset can be downloaded to a PC, delivered to other mainframe computer data centers using PC-based data media, and uploaded from a PC in those receiving mainframe data centers.

There has been a need to better integrate emerging PC technology with mainframe technology, and to use the more convenient and cost effective PC-environment data transportation media in mainframe software libraries and data distribution. Also, there was a need to use cheap and high-capacity PC hard disks for storing mainframe text libraries, and use the PC as a stand-alone text editing work station for mainframe text library data in the PC hard disk.

The invention provides a method and apparatus for converting a part or whole of a mainframe software load library or text library or a mainframe sequential dataset of fixed record format, undefined record format or variable record format to a sequential dataset of fixed length records which can be distributed using PC-based data media to other mainframe computer data centers.

One embodiment of the invention provides a method and apparatus for reverting a mainframe software libraries and data delivered via PC-based data media to its original form when uploaded to a mainframe computer at the same site or at another site.

A further embodiment of the invention provides a method and apparatus for storing mainframe text libraries in a PC hard disk and working at a local or remote stand-alone PC for text editing of mainframe program source codes, macros, JCL streams, procs, manuals, documents, and letters which were downloaded from a mainframe.

BRIEF DESCRIPTION OF THE DRAWINGS

The invention and its particular features and advantages will become more apparent with examination of the following detailed description considered with the accompanying drawings, wherein:

FIG. 1 is a functional block diagram of the PC data media delivery of a single program load module when the sender has the program PCFORM, but the receiver does not;

FIG. 2 is a functional block diagram of the PC data media delivery of a program load library when both the sender and the receiver has the program PCFORM;

FIG. 3 is a functional block diagrams of the PC data media delivery of a text library when both the sender and the receiver has the program PCFORM;

FIG. 4 is a functional block diagrams of the PC data media delivery of a sequential dataset of fixed record format, undefined record format or variable record format when both the sender and the receiver has the program PCFORM;

FIG. 5 shows how this invention can be used with the Internet world wide web download;

FIG. 6 shows how this invention can be used with the Internet email attachment file;

FIG. 7 shows how this invention can be used with the TCP/IP FTP protocol;

FIG. 8 is a functional block diagram of the current conventional magnetic tape delivery;

FIGS. 9–16 are the block diagrams of the program PCFORM;

FIG. 17 shows the conversion of an input record with a 4-byes header and division into shorter records;

FIG. 18 shows the conversion of an input record with the division into shorter records and a 4-byes header for each divided shorter record;

FIG. 19 shows the conversion of an input record with zero padding at the end of the input data; and TABLE 1 is the listing of the source codes of the program PCFORM in assembler language.

DETAILED DESCRIPTION OF THE INVENTION

FIGS. 1 to 7 show four different situations within which this invention can be used with the PC-based data media. FIG. 8 shows the flow of events in the conventional magnetic tape delivery method. Before describing the block diagrams (FIGS. 1–7) of this invention, the flow diagram (FIG. 8) of the conventional magnetic tape delivery, is described first.

Conventional Delivery using Magnetic Tapes

As an example explanation, let's assume that a software company, a sender 1, wants to deliver a whole text library, a program load module, and a whole load library 49 of a software package to a customer data center, a receiver 2, by tape 76. This explanation assumes that the name of a sender 1 is BSoft Co. The name of the software package to be delivered is assumed to be CPGM. Receiver 2 of this product CPGM will be referred to as C Co. The JCL streams of JCL Lists #1 and #2 explain how the events of FIG. 8 are actually handled in the mainframe data centers. The job control language (JCL) specifies the program name and the required files for the program. JCL streams or statements are entered to the operating system by the SUBMIT TSO command from the TSO/ISPF screen. The OS interprets these JCL statements, brings up the program from the step library or system load library, allocates the requested files, and passes the CPU control to the program.

A sender programmer 17 of a sending site 1 starts 71 a JCL stream of JCL List #1. An IBM utility program IEBCOPY 72 copies a whole text library, a program load module, and a whole load library 49 to tapes 76 as the output. A computer operator 69 mounts 73 the blank tape on the tape drive units when prompted by a system console 69. After IEBCOPY 72 finishes copying 74–75, system console 69 prompts the unloading 77 of tapes 76.

JCL List #1
Copy a Text Library, a Load Module and a Load Library to Magnetic Tape
```
//jobname JOB (account),MSGCLASS=V,CLASS=L
//TEXTS EXEC PGM=IEBCOPY
//IN DD DISP=SHR,DSN=BSOFT.CPGM.TEXTLIB
//OUT DD DSN=TEXTLIB.TAPE,
// DISP=(,KEEP,DELETE),
// DCB=(BSOFT.CPGM.TEXTLIB),
// UNIT=TAPE,
// LABEL=(1,SL), dataset sequence no=1
// VOL=(,RETAIN,,2) maximum 2 tapes
//SYSUT3 DD UNIT=SYSDA,SPACE=(TRK, (500,20))
//SYSUT4 DD UNIT=SYSDA,SPACE=(TRK, (500,20))
//SYSPRINT DD SYSOUT=*
//SYSIN DD *
    COPY INDD=IN,OUTDD=OUT
//*
//LOAD1 EXEC PGM=IEBCOPY
//IN DD DISP=SHR,DSN=BSOFT.CPGM.LOADLIB
//OUT DD DSN=PROGRAM1.TAPE,
// DISP=(,KEEP,DELETE),
// DCB=(BSOFT.CPGM.LOADLIB),
// UNIT=TAPE,
// LABEL=(2,SL), dataset sequence no=2
// VOL=(,RETAIN,,,REF=*.TEXTS.OUT)
//SYSUT3 DD UNIT=SYSDA,SPACE=(TRK, (500,20))
//SYSUT4 DD UNIT=SYSDA,SPACE=(TRK, (500,20))
//SYSPRINT DD SYSOUT=*
```

```
//SYSIN DD *
   COPY INDD=IN,OUTDD=OUT
   SELECT MEMBER=(PROGRAM1)
//*
//LOADS EXEC PGM=IEBCOPY
//IN DD DISP=SHR,DSN=BSOFT.CPGM.LOADLIB
//OUT DD DSN=LOADLIB.TAPE,
// DISP=(,KEEP,DELETE),
// DCB=(BSOFT.CPGM.LOADLIB),
// UNIT=TAPE,
// LABEL=(3,SL), dataset sequence no=3
// VOL=(,RETAIN,,,REF=*.LOAD1.OUT)
//SYSUT3 DD UNIT=SYSDA,SPACE=(TRK, (500,20))
//SYSUT4 DD UNIT=SYSDA,SPACE=(TRK, (500,20))
//SYSPRINT DD SYSOUT=*
//SYSIN DD *
   COPY INDD=IN,OUTDD=OUT
```

Receiver programmer 28 receives delivered tapes 79. Receiver programmer 28 checks the volume serial number of tapes 79 and creates a JCL stream of JCL List #2. Receiver programmer at 28 brings received tapes 79 to a computer room 4 and starts 80 a loading JCL streams in JCL List #2 which requests a tape mount 82, and copies 83–84 the content of tapes 79 to destination libraries 58. After a load job 81 finishes, the computer operator unloads 85 tapes 79.

JCL List #2
Loading a Text Library, a Load Module, and a Load Library from Magnetic Tape

```
//jobname JOB (account),MSGCLASS=V,CLASS=L
//TEXTS EXEC PGM=IEBCOPY
//IN DD DSN=TEXTLIB.TAPE,
// DISP=OLD,
// UNIT=TAPE,
// LABEL=(1,SL), dataset sequence no=1
// VOL=(,RETAIN,,,SER=123456)
//* destination text library
//OUT DD DSN=C.CPGM.TEXTLIB,
// DISP=(,CATLG),
// DCB=(DSORG=PO,RECFM=FB,
// LRECL=80,BLKSIZE=8000),
// UNIT=SYSDA,
// SPACE=(CYL, (5,2,10)) depending on software
//SYSUT3 DD UNIT=SYSDA,SPACE=(TRK, (500,20))
//SYSUT4 DD UNIT=SYSDA,SPACE=(TRK, (500,20))
//SYSPRINT DD SYSOUT=*
//SYSIN DD *
   COPY INDD=IN,OUTDD=OUT
//*
//LOAD1 EXEC PGM=IEBCOPY
//IN DD DSN=PROGRAM1.TAPE,
// DISP=OLD,
// UNIT=TAPE,
// LABEL=(2,SL), dataset sequence no=2
//VOL=(,RETAIN,,,REF=*.TEXTS.IN)
//* destination load library
//OUT DD DSN=C.CPGM.LOADLIB,
DISP=(,CATLG),
// DCB=(DSORG=PO,RECFM=U,BLKSIZE=32760),
//UNIT=SYSDA,
SPACE=(CYL, (20,5,50)) depending on software
//SYSUT3 DD UNIT=SYSDA,SPACE=(TRK, (500,20))
//SYSUT4 DD UNIT=SYSDA,SPACE=(TRK, (500,20))
//SYSPRINT DD SYSOUT=*
//SYSIN DD *
   COPY INDD=IN,OUTDD=OUT
//*
//LOADS EXEC PGM=IEBCOPY
//IN DD DSN=LOADLIB.TAPE,
// DISP=OLD,
// UNIT=TAPE,
// LABEL=(3, SL), dataset sequence no=3
// VOL=(REF=*.LOAD1.IN)
//* destination load library
//OUT DD DSN=C.CPGM.LOADLIB,
// DISP=OLD
//SYSUT3 DD UNIT=SYSDA,SPACE=(TRK, (500,20))
//SYSUT4 DD UNIT=SYSDA,SPACE=(TRK, (500,20))
//SYSPRINT DD SYSOUT=*
//SYSIN DD *
   COPY INDD=IN,OUTDD=OUT
```

The tape delivery method is characterized by the operator interventions 73, 77, 82, 85, tapes 76, 79, two tape control units in two computer rooms 3, 4 and moving tapes between computer rooms 3, 4 and programmers' work areas 17, 28.

Delivery by the Present Invention

FIGS. 1–7 show four different situations within which this invention can be used with the PC-based data media. The floppy diskette is most common PC-based data media. The recordable CD-ROM is easy and simple to use and provides enough capacity for most mainframe data delivery situations. More and more mainframe data centers are in a situation in which they are ready to use the Internet and the TCP/IP FTP as the data transportation media. This invention does not require the involvement of any mainframe computer operators 69 and 70 nor magnetic tape drive units 76 and 79, as is requireed in the conventional tape delivery method shown in FIG. 8.

This new PC data media delivery method can be used in two different ways: when the receiver with and without the program PCFORM installed.

1. When a Receiver Doesn't have the Program PCFORM
  FIG. 1 show the flow of the functional events in Procedure #5 when a sender 1 has a program PCFORM 13, but a receiver 2 doesn't have it. Sender 1 tries to send a copy of a single program load module 8 to another data center 2 which does not have the mainframe program PCFORM 13. In this case, receiver 1 can handle an individual program load module separately, but cannot handle a whole library of data.

Procedure #5
When the Receiver Doesn't have the Program PCFORM
1. A sender programmer at a PC 17 converts single mainframe program load module 8 to a download sequential dataset 16 of fixed record length of 256 bytes.
2. Sender programmer at 17 downloads 18–23 the converted content in download sequential dataset 16 to PC 17 hard disk using Procedure #2, #3 or #4.
3. Sender programmer at 17 chooses a PC data media 25, copies PC 17 hard disk file to a transportation media 25, and mails 26 it, or notifies receiver 2 that program load module 8 is in a sender's Website 62 or FTP site 65.
4. A receiver programmer at PC 28 receives 26 a PC data media 27 and stores 29 it in PC 28 hard disk.
5. Receiver programmer at 28 uploads 30–35 the received data from PC 28 to a mainframe upload sequential dataset 36 of the same record length, 256 bytes, as used for download sequential dataset 16 at sender 1.
6. Receiver programmer at 28 converts the content of upload sequential dataset 36 to a member of a destination program load library 46 using an IBM utility program IEBGENER 38 and an IBM linkage editor IEWL 43.

2. When the Receiver has the Program PCFORM.

FIGS. 2–4 show the flow of functional events in Procedure #6 when both a sender 1 and a receiver 2 have program PCFORM 48, 55. Sender 1 can send a single load module, a part or whole of a load library, a part or whole of a text library or any sequential dataset 49 to receiver 2.

Procedure #6

When the Receiver has the Program PCFORM

1. A sender programmer at a PC 17 converts 50–51 a whole or part of program load module library, a whole or part of text library or a sequential dataset 49 to a download sequential dataset 52 of fixed length record of 80-bytes long using program PCFORM 48.
2. Sender programmer at 17 downloads 18–23 the content of download sequential dataset 52 to PC 17 hard disk using Procedure #2, #3 or #4.
3. Sender programmer at 17 chooses a PC data transportation media 25, copies PC 17 hard disk file(s) to transportation media 25, and mails 2E them or notifies receiver 2 that program load module(s) and/or text(s) are in a sender's Website 62 or FTP Server 65.
4. A receiver programmer at a PC 28 receives 26 a PC data media 27 and stores 29 them in PC 28 hard disk.
5. Receiver programmer at 28 uploads 30–35 the received data from PC 28 hard disk to a mainframe upload sequential dataset 53 of the same record length, 80 bytes, as used for download sequential dataset 52 of sender 1.
6. Receiver programmer at 28 converts 56–57 the content of mainframe upload sequential dataset 53 to a part or whole of a destination program load module library, a part or whole of a destination text library or a destination sequential dataset of respective record format 58 accordingly using program PCFORM 55.

For both above two situations of Procedures #5 and #6, the first three steps are for sender 1 (i.e., a mainframe software vendor company) to create PC 17 hard disk file(s) from a whole or part of program load module library, a whole or part of text library or a sequential dataset 49 of a sender's mainframe system.

The last three steps are for receiver 2 (i.e., general user mainframe data centers) to convert data delivered in PC data media 27 to members of mainframe destination load module library or text library or a sequential dataset 58. At step 6, if program load module library and/or text library 58 already exists in a user data center 4, only the delivered members of libraries will be added or updated in place.

A downloaded mainframe data file in PC 17 hard disk can be copied to a Website 62 and downloaded by authorized mainframe users 28 via the Internet 60 as in FIG. 5. The program can be sent to each email user 28 directly as an email attachment as in FIG. 6. Or receiver programmer 28 can receive the content of sender's mainframe download dataset 16 via TCP/IP FTP as in FIG. 7.

The above two different situations, FIG. 1 and FIGS. 2–4, are described in more detail. All blocks, except blocks of TSO File Transfer and IND$FILE, in the figures represent different JCL streams, JCL Lists #3, #4, #6, #7, #9 and #12, which are explained in more detail. FIG. 1 is described first, and then FIGS. 2–4 are explained.

Detail Description of FIG. 1

FIG. 1 shows the functional block diagram when sender 1 has program PCFORM 13, but receiver 2 doesn't have the mainframe program PCFORM. In this situation, receiver 2 can only handle a single load module. This diagram explains how to send single program load module 8 to a mainframe user data center 2 via floppy diskettes or recordable CD-ROM 25, 27 without the involvement of magnetic tapes, and how to install the program into a mainframe destination load library 46. This diagram also shows how the new program PCFORM can be delivered to other software companies and general mainframe user companies without the need for magnetic tapes at the beginning.

For this example explanation, the JCL streams assume that the name of sender 1 is ASoft Co., the developer of the program PCFORM. The name of the program to be delivered is assumed to be PCFORM. In the example, receiver does not have the program PCFORM. Receiver 2 of this product PCFORM will be referred to as C Co., with a mainframe data center 4. Program PCFORM 8 is assumed to be in the program library ASOFT.LOADLIB at sender 1. The delivered PCFORM will be installed in C Co.'s destination load library, C.ASOFT.LOADLIB 46.

Download Procedure of the Sender in FIG. 1

The left side of FIG. 1 describes the download procedure for sender 1 to create portable floppy diskette or recordable CD-ROM 25.

The first step of creating download sequential dataset 16 is done by use of an IBM linkage editor program IEWL 7. The maximum record length of input load module PCFORM 8 in the COPYLIB load library is usually very large, e.g., up to 32,760 bytes. The maximum record length of an output temporary load module member 11 in a SYSLMOD temporary load library is defined as 256 bytes as a default: this is the recommended length. The BLKSIZE value of SYSLMOD temporary load library 11 must be 256 bytes or greater. But the BLKSIZE of 256 bytes is recommended. Step 7 converts 9–10 original load module PCFORM 8 into new temporary load module 11 of shorter records. IBM linkage editor IEWL 7 performs this conversion when sender programmer 17 enters 6 a JCL stream of JCL List #3 to the operating system.

JCL List #3

Creating a Temporary Load Module of Shorter Length
//jobname JOB (account),MSGCLASS=V,CLASS=L
//LKED  EXEC  PGM=IEWL,PARM='MAP,XREF,LET,
   LIST'
//SYSPRINT DD SYSOUT=*
//SYSLOUT DD SYSOUT=*
//SYSUT1 DD DSN=&&SYSUT1,
// UNIT=SYSDA,SPACE=(CYL,(2,1))
//COPYLIB DD DISP=SHR,DSN=ASOFT.LOADLIB
//SYSLMOD DD DSN=TEMP.LOADLIB,
// DISP=(,CATLG),
// DCB=(DSORG=PO,RECFM=U,
// LRECL=0, BLKSIZE=256)
// UNIT=SYSDA,SPACE=(CYL, (1,1,3))
//SYSLIN DD *
  ENTRY PCFORM
  INCLUDE COPYLIB(PCFORM)
  NAME TEMPTEMP
//

Here, the SYSLIN control information may be adjusted for each program load module 8 and receiver 2 of this program will use this SYSLIN control information when he uploads the program delivered. Depending on the software program, the first SYSLIN line ENTRY control statement may or may not be required, and can have a different name from that of the program.

Output temporary load module TEMPTEMP 11 in the SYSLMOD library is still an executable load module, which means that the length of each record in the module may be different from the length of others.

At the next step, program PCFORM 13 converts 14–15 temporary load module TEMPTEMP 11 to download sequential dataset 16 of uniform fixed length records. This conversion is necessary because only uniform fixed length records of a load module can be reverted to the original load module status when they are downloaded to a PC and uploaded to a mainframe back again. Program PCFORM 13 is executed by entering 12 a JCL stream of JCL List #4 to the OS/390 by sender programmer at 17:

JCL List #4
Creating the Revertible Sequential Dataset from the Temporary Load Module
//jobname JOB (account),MSGCLASS=V,CLASS=L
//CONVERT EXEC PGM=PCFORM
//STEPLIB DD DISP=SHR,DSN=ASOFT.LOADLIB
//IN DD DISP=SHR,DSN=TEMP.LOADLIB (TEMPTEMP)
//OUT DD DSN=DOWNLOAD.WORK,
// DISP=(,CATLG),
// DCB=(DSORG=PS,RECFM=FB,
// LRECL=256,BLKSIZE=2560),
// UNIT=SYSDA,SPACE=(CYL, (1,1))
//CONTROL DD * DUMP
//

The LRECL value of output download sequential dataset 16 specified by OUT ddname must be the same as the BLKSIZE value (256 bytes is recommended and is used as the default) of IN temporary load library 11 created by a JCL stream of JCL List #3. The disk SPACE value of OUT download sequential dataset 16 is approximately the same as the size of original program load module 8, when the value of its LRECL is near 256.

Original program load module library 8 itself can be used directly as the IN dataset of above JCL stream (JCL List #4). In this case, linkage editor IEWL 7 step which was necessary in the previous case can be eliminated. But because the LRECL value of OUT download sequential dataset 16 must be the same as the BLKSIZE value of the IN dataset, and due to the large BLKSIZE of original load library 8 (e.g., up to 32,760), the LRECL value of OUT download sequential dataset 16 becomes correspondingly very large. Thus the total output size to transfer between a mainframe and a PC, and between two mainframe data centers can be very large. This is not recommended. The smaller the LRECL value of the OUT dataset, the smaller the amount of the data which needs to be transferred. This is why the minimum allowable value, 256 bytes, is recommended as the default value.

Now, download sequential dataset 16 is ready to be transferred to a PC.

Sender programmer at 17 transfers 18–23 the content of mainframe download sequential dataset, DOWNLOAD.WORK, 16 to PC 17 as C:\pcform.exe in Binary mode using Procedure #2, #3 or #4.

Sender programmer at 17 copies 24 C:\pcform.exe, to a PC data transportation medium 25, e.g., a floppy diskette, A:\pcform.exe, or a recordable CD-ROM, D:\pcform.exe.

This dataset data can include letters, installation guides, installation JCLs, help information, manuals, and other documents.

Sender 1 mails 26 diskette or CD-ROM 25 to receiver data center 2.

A downloaded load module file in PC 17 hard disk can be copied to a Website 62 and downloaded by authorized mainframe users 28 via the Internet 60 as in FIG. 5. The program can be sent to each email user 28 directly as an email attachment as in FIG. 6. Or receiver programmer 28 can receive the content of sender's mainframe download dataset 16 via TCP/IP FTP as in FIG. 7.

Upload Procedure of the Receiver in FIG. 1

The right side of FIG. 1 describes the functional event flow at receiver's mainframe site 2, referred to as the upload procedure for the user data center.

Receiver programmer at 28 of mainframe site 2 receives floppy diskettes or CD-ROM 27 mailed 26 from sender 1 and saves 29 the content of diskettes or CD-ROM 27 to the hard disk of PC 28. Receiver programmer at 28 copies A:\pcform.exe or D:\pcform.exe to C:\ASOFT\pcform.exe.

Receiver programmer at 28 submits a JCL stream in JCL List #5 to the mainframe operating system to create upload sequential dataset 36, destination program load library 46, and destination text library 46 which will receive the data delivered.

The LRECL value 256 of FILE1 upload sequential dataset 36 must be the same value as the LRECL value (256 bytes recommended and used as the default) of download sequential dataset 16 of sender 1.

The BLKSIZE value 32,760 of FILE2 destination load library 46 is the maximum allowed value, and is the value which is recommended to use for the transfer. This value can be changed to any number equal to 256 bytes or greater.

JCL List #5
Creating the Receiving Datasets
//jobname JOB (account),MSGCLASS=V,CLASS=L
//NEWDS EXEC PGM=IEFBR14
//FILE1 DD DSN=UPLOAD.WORK,
// DISP=(,CATLG),
// DCB=(DSORG=PS,RECFM=FB,
// LRECL=256, BLKSIZE=2560),
// UNIT=SYSDA,SPACE=(CYL, (1,1))
//* destination load library
//FILE2 DD DSN=C.ASOFT.LOADLIB,
// DISP=(,CATLG),
// DCB=(DSORG=PO,RECFM=U,
// BLKSIZE=32760),
// UNIT=SYSDA,
// SPACE=(CYL, (1,1,5)) depending on software
//* destination text library
//FILE3 DD DSN=C.ASOFT.TEXTLIB,
// DISP=(,CATLG),
//DCB=(DSORG=PO,RECFM=FB,
// LRECL=80, BLKSIZE=8000),
// UNIT=SYSDA,
// SPACE=(CYL, (5,2,10)) depending on software Receiver programmer at 28 transfers 30–35 delivered data in PC 28, C:\ASOFT\pcform.exe, to mainframe upload sequential dataset, UPLOAD.WORK, 36 in Binary mode using Procedures #2, #3 or #4.

Receiver programmer at 28 submits 37 a JCL stream in JCL List #6. JCL List #6 then calls IBM dataset utility program IEBGENER 38 and copies 39–40 the content of SYSUT1 upload sequential dataset 36 into a temporary member TEMPTEMP 41 of SYSUT2 destination load library 46.

JCL List #6
Creating a Temporary Member in a Load Library
//jobname JOB (account),MSGCLASS=V,CLASS=L
//COPY EXEC PGM=IEBGENER
//SYSUT1 DD DISP=SHR,DSN=UPLOAD.WORK

```
//SYSUT2 DD  DISP=SHR,DSN=C.ASOFT.LOADLIB
   (TEMPTEMP)
//SYSIN DD DUMMY
//SYSPRINT DD DUMMY
//
```

Temporary output member TEMPTEMP 41 of SYSUT2 destination load library is not executable. Its only purpose is to be used as the input for linkage editor IEWL 43 in a next JCL stream of JCL List #7.

Receiver programmer at 28 then submits 42 a JCL stream in JCL List #7 which calls IBM utility program linkage editor IEWL and converts 44–45 non-executable member TEMPTEMP 41 of COPYLIB library to an executable load module member PCFORM 46 in the SYSLMOD destination load library.

JCL List #7
Creating the Executable Load Module Member from the Temporary Member

```
//jobname JOB (account),MSGCLASS=V,CLASS=L
//LKED  EXEC  PGM=IEWL,PARM='MAP,XREF,LET,
   LIST'
//SYSPRINT DD SYSOUT=*
//SYSLOUT DD SYSOUT=*
//SYSUT1 DD DSN=&&SYSUT1,UNIT=SYSDA,
// SPACE=(CYL, (1,1))
//COPYLIB DD DISP=SHR,DSN=C.ASOFT.LOADLIB
//SYSLMOD DD DISP=SHR,DSN=C.ASOFT.LOADLIB
//SYSLIN DD *
   ENTRY PCFORM
   INCLUDE COPYLIB(TEMPTEMP)
   NAME PCFORM
```

JCL List #7 creates an executable final load module member PCFORM 46, which was delivered in a converted form via diskette or CD-ROM 27, in SYSLMOD destination load library 46.

This example description illustrates how single load module PCFORM 46 was delivered via floppy diskette or CD-ROM 27, without having to use conventional magnetic tape 79, and is installed just using the available IBM utility programs at mainframe user data center 2, even without the help of the program PCFORM.

In summary, this invention will now allow a general mainframe user company, e.g., C Co., to receive any library and any sequential datasets from any mainframe software company, using any kind of PC-based data media, without any need whatsoever for the conventional magnetic tapes which are being currently used for such transfers.

Detail Description of FIGS. 2 and 3

A situation in which both sender 1 and receiver 2 have program PCFORM 48, 55 will now be explained. In this scenario both sender 1 (a software company) and receiver 2 (a general mainframe data center) have installed program PCFORM 48, 55 by the method depicted in FIG. 1, and as explained above.

FIGS. 2 and 3 diagrams explain how to send and install a whole or part of a load library or a text library of a mainframe software company 1 to a mainframe user data center 2 via floppy diskettes or recordable CD-ROM 25 without the use of magnetic tapes. FIG. 4 diagram show how a mainframe data center 1 send a sequential dataset of fixed record format, undefined record format or variable record format, e.g., copy datasets of VSAM datasets or DB2 datasets, to another mainframe data center using PC-based data media.

FIGS. 2 and 3 are explained first and FIG. 4 will be explained later.

The JCL streams of this diagram also assumes for the sake of convenience, as in the FIG. 1 explanation, that the name of sender 1, a mainframe software company, is assumed to be BSoft Co. A client company 2 of BSoft Co. is assumed to be C Co. The name of a mainframe software package 49 to be delivered to C Co. is CPGM. The load modules and related texts of the mainframe software package, CPGM, reside in the libraries BSOFT.CPGM.LOADLIB and BSOFT.CPGM.TEXTLIB at BSoft Co. They will be installed into the destination libraries C.CPGM.LOADLIB and C.CPGM.TEXTLIB of C Co. Program PCFORM is assumed in the program library BSOFT.ASOFT.LOADLIB at BSoft Co. and C.ASOFT.LOADLIB at C Co.

This example diagram is based on the use of 3.5-inch standard 1.44 MB floppy diskettes 25 and 27. Using recordable CD-ROM media is simpler than floppy diskettes.

Download Procedure of the Sender in FIGS. 2 and 3

We will begin by detailing the download procedure for sender 1 to create portable floppy diskettes 25 containing the data to be transferred.

Sender programmer at 17 creates a JCL stream in JCL List #8 for creating download sequential dataset 52 of fixed length records.

JCL List #8
Creating the Download Sequential Dataset

```
//jobname JOB (account),MSGCLASS=V,CLASS=L
//NEWDS EXEC PGM=IEFBR14
//FILE1 DD DSN=DOWNLOAD.WORK,
// DISP=(,CATLG),
// DCB=(DSORG=PS,RECFM=FB,
// LRECL=80, BLKSIZE=8000).
// UNIT=SYSDA,SPACE=(CYL, (10,10))
//
```

The primary and secondary quantity of CYLinders may be different depending on the size of each target load library or text library to be delivered, and whether a whole or part of the library or just a single member is to be delivered. One cylinder can hold approximately 650 K bytes of data. In the above example the SPACE parameter specifies a maximum of 160 cylinders and an approximate maximum of 104 million bytes (equivalent to approximately 7 2400-ft magnetic tape reels). Download sequential dataset 52 is used repeatedly, so SPACE parameter should be allocated a high enough value to fit all the libraries to be sent out.

The LRECL value of texts is fixed at 80 bytes. There is no variety and thus no confusion about the LRECL value for a text library. But for program load modules, sender programmer at 17 can choose any fixed LRECL value of 80 or greater for download sequential dataset, DOWNLOAD.WORK, 52. Receiver programmer at 28 of mainframe site 2 must use this same LRECL value to create upload sequential dataset 53. In order to avoid any confusion, the LRECL value of download sequential dataset 52 can be fixed at 80-bytes long as a default value for both the program load modules and texts. The LRECL value 80 is strongly recommended. And this default value of 80 bytes length is used in this example explanation. This dataset of 80 bytes record length can be used for both text libraries and load libraries.

When program load modules are sent out to users, sender programmer 17 may notify receiver programmer 28 about the BLKSIZE value of original load module library, e.g., BSOFT.CPGM.LOADLIB 49. Receiver programmer 28 can create destination program load module library 58 with the BLKSIZE value suggested by sender programmer 17, or greater up to the maximum allowed BLKSIZE value of 32,760 which can receive any BLKSIZE value of original load library 49.

Sender programmer at 17 submits the above IBM dataset utility program IEFBR14 JCL stream (JCL List #8) to create download sequential dataset, DOWNLOAD.WORK 52.

Download sequential dataset 52 and other download work datasets which will be created later will be used repeatedly for each library download. Therefore the full procedure, from the submission 47 of PCFORM program 48 to the completion 23 of the file transfer to a PC, must be done separately for each library whether it is a load library or a text library. A library is downloaded to a PC one library at a time.

Sender programmer at 17 creates a JCL stream (JCL List #9) which will bring up program PCFORM 48 from the STEPLIB library. The IN DD statement identifies original text or load library 49 to be delivered. The OUT dataset is download sequential dataset 52.

JCL List #9
Dumping the Content of a Load Library to the Download Sequential Dataset //jobname JOB (account),MSGCLASS=V,CLASS=L
//PCFORM EXEC PGM=PCFORM
//STEPLIB DD DISP=SHR,DSN=BSOFT.ASOFT.
   LOADLIB
//SYSPRINT DD SYSOUT=*
//* original library
//IN DD DISP=SHR,DSN=BSOFT.CPGM.LOADLIB
//* download dataset
//OUT DD DISP=SHR,DSN=DOWNLOAD.WORK
//CONTROL DD * DUMP
//

The DUMP CONTROL command without any member names makes program PCFORM 48 dump 50–51 whole records in IN input original text or load library 49 to OUT output download sequential dataset 52.

The CONTROL control command DUMP converts the content of IN original library 49 to OUT download sequential dataset 52 records. The DUMP command starts at column 1 and can be followed by any number of library member names; in this case only the named members will be dumped to download sequential dataset 52. More than one member list lines can follow the DUMP control command line, but the first column must be blank. Using DUMP control command without any member names, as shown in the above sample JCL stream, will convert the whole content of original library 49 to download sequential dataset 52 records.

JCL Note #1
Examples of Free Format DUMP Command Syntax (1). DUMP
(2). DUMP PROGRAM1 Program2
   program3, PROGRAM4,
      PROGRAM5 program6,
      PROGRAM7, PROGRAM8
(3). DUMP
   PROGRAM1 PROGRAM2
      PROGRAM3, PROGRAM4
         PROGRAM5
      PROGRAM6, PROGRAM7

(4). DUMP (
   JCL1, JCL2, JCL3, HELP1,
      HELP2, UPLOAD1,
         Manual1
            Manual2
      ERRORMSG,VENDOR
   )

Let's start with the download of load library 49 first. The download procedure of a text library will be repeated after the completion of the load library download.

Sender programmer at 17 submits 47 above PCFORM program JCL stream (JCL List #9) to dump the software package in original load library 49 to download sequential dataset 52.

If output download sequential dataset 52 is too big for a standard 1.44 MB floppy diskette, the records in download sequential dataset 52 must be divided into smaller sequential datasets in order to use 1.44 MB floppy diskettes as the transportation media. This division is necessary only for 1.44 MB floppy diskettes. If a recordable CD-ROM is used, this division is not necessary. Also, if the data is to be transferred over the world wide web or the TCP/IP FTP, this division is not necessary.

If a text member or a part or whole of a text library is downloaded to a PC, sometimes it can be edited in the PC using a PC word processor or an ASCII editor. Therefore it is handy to keep the text file small enough to edit in the PC using ASCII editor. Some ASCII editors can not handle larger files.

For load modules, this division can be done only in the mainframe. But for texts, this division can be done in the mainframe or in a PC with PC word processors or ASCII text editors.

One 3.5-inch floppy diskette can deliver 1.4 million bytes or up to approximately 17,000 records of 80-byte length mainframe records. But let's use the number 15,000 as an example for simplicity. If the library to be downloaded is a text library, it is recommended to divide the library into smaller datasets which are easier for PC text editors to handle If download sequential dataset, DOWNLOAD.WORK, 52 contains more than 15,000 records of 80-byte long, it is necessary to create more than one smaller temporary work sequential datasets, e.g., DOWNLOAD.WORK1 and DOWNLOAD.WORK2, and so on, until the whole library can be divided into approximately 15,000 80-byte records per each smaller dataset. These temporary smaller datasets are created using the same DCB parameters as download sequential dataset 52, that is, DSORG=PS, RECFM=FB, LRECL=80, BLKSIZE=8000, but with a different SPACE parameter, SPACE=(CYL,(1,1)) for example.

And sender programmer at 17 divides the content of download sequential dataset, DOWNLOAD.WORK, 52 into smaller datasets of 15,000 records for each dataset using the TSO/ISPF EDIT panel or another software program. For an explanation, let's assume that download sequential dataset 52 was divided into four smaller datasets, DOWNLOAD.WORK1, DOWNLOAD.WORK2, DOWNLOAD.WORK3, and DOWNLOAD.WORK4.

Now, download sequential dataset(s) 52 is ready to be downloaded to a PC.

Sender programmer at 17 transfers 18–23 mainframe download sequential datasets 52 to the hard disk of PC 17 individually in Binary mode using Procedure #2, #3 or #4:

1. if download sequential dataset 52 itself is to be downloaded 18–23, download DOWNLOAD.WORK to the PC file C:\CPGM.exe, or 2. if download sequential dataset was divided into smaller datasets, download DOWNLOAD.WORK1 to C:\CPGM1.exe, download DOWNLOAD.WORK2 to C:\CPGM2.exe, download DOWNLOAD.WORK3 to C:\CPGM3.exe, download DOWNLOAD.WORK4 to C:\CPGM4.exe.

Now, whole original load library 49 is stored in the hard disk of PC 17. It is ready to be delivered to any client user data center 2, e.g., including C Co. in this example.

Now, let's repeat the full download procedure for text library 49. As mentioned before, the download for each individual library starts with the submission 47 of program PCFORM JCL stream (JCL List #10).

This time, the IN dataset of PCFORM program 48 is a text library 49. Same download sequential dataset 52 is used repeatedly as the OUT dataset. So the previous content of download sequential dataset 52 will be overwritten with new content every time after this step 48.

JCL List #10

Dumping the Content of a Text Library to the Download Sequential Dataset

```
//jobname JOB (account),MSGCLASS=V,CLASS=L
//PCFORM EXEC PGM=PCFORM
//STEPLIB    DD      DISP=SHR,DSN=
  BSOFT.ASOFT.LOADLIB
//SYSPRINT DD SYSOUT=*
//* original library
//IN DD DISP=SHR,DSN=BSOFT.CPGM.TEXTLIB
//* download dataset
//OUT DD DISP=SHR,DSN=DOWNLOAD.WORK
//CONTROL DD * DUMP
//
```

After PCFORM program 48 is finished successfully, the content of download sequential dataset 52 can be divided into smaller work datasets, e.g., DOWNLOAD.WORK1, DOWNLOAD.WORK2, DOWNLOAD.WORK3, DOWNLOAD.WORK4, and so on, using the same method as used for the load library above.

As the final step of the text library download, sender programmer 17 transfers 18–23 the mainframe datasets to the hard disk of PC 17 individually in Text mode using Procedure #2, #3 or #4:

1. if download sequential dataset 52 itself is to be downloaded, download DOWNLOAD.WORK to the PC file C:\CPGM.txt, or 2. if download sequential dataset 52 was divided into smaller work datasets, download DOWNLOAD.WORK1 to C:\CPGM1.txt, download DOWNLOAD.WORK2 to C:\CPGM2.txt, download DOWNLOAD.WORK3 to C:\CPGM3.txt, download DOWNLOAD.WORK4 to C:\CPGM4.txt.

Now, whole program load library and/or whole text library 49 are stored in the hard disk of PC 17. They are ready to be delivered to any client user data center 2, e.g., C Co. in this example.

Sender programmer at 17 copies 24 all parts of the downloaded libraries from the hard disk of PC 17 to PC data media 25. In the case of the example below, the libraries are copied to 1.44 MB floppy diskettes:

copy C:\CPGM1.exe to A:\CPGM1.exe copy C:\CPGM2.exe to A:\CPGM2.exe copy C:\CPGM3.exe to A:\CPGM3.exe copy C:\CPGM4.exe to A:\CPGM4.exe copy C:\CPGM1.txt to A:\CPGM1.txt copy C:\CPGM2.txt to A:\CPGM2.txt copy C:\CPGM3.txt to A:\CPGM3.txt copy C:\CPGM4.txt to A:\CPGM4.txt This data will be accompanied with letters, installation guides, installation JCLs, help information, manuals, and other documents.

Now, sender programmer 17 mails diskettes 25 which were created.

As like the explanation of FIG. 1 diagram, downloaded load module and text files in PC 17 hard disk can be copied to a Website 62 and downloaded by authorized mainframe users 28 via the Internet 60 as in FIG. 5. The files can be sent to each email user 28 directly as an email attachments as in FIG. 6. Or receiver programmer 28 can receive the content of sender's mainframe download dataset 16 via TCP/IP FTP as in FIG. 7.

Upload Procedure of the Receiver in FIGS. 2 and 3

The right side of the FIGS. 2 and 3 show the upload procedure for each user data center which received the diskettes of a library.

Receiver programmer 28 receives 26 floppy diskettes 27 and saves 29 them onto PC 28 hard disk as:

copy A:\CPGM1.exe to C:\BSOFT\CPGM1.exe copy A:\CPGM2.exe to C:\BSOFT\CPGM2.exe copy A:\CPGM3.exe to C:\BSOFT\CPGM3.exe copy A:\CPGM4.exe to C:BSOFTCPGM4.exe copy A:\CPGM1.txt to C:\BSOFTCPGM1.txt copy A:\CPGM2.txt to:C:\BSOFTCPGM2.txt copy A:\CPGM3.txt to C:\BSOFTCPGM3.txt copy A:\CPGM4.txt to C:\BSOFTCPGM4.txt.

Receiver programmer 28 submits a JCL stream in JCL List #11 to create required datasets: destination load library 58, destination text library 58, and upload sequential datasets 53, e.g., UPLOAD.WORK1, UPLOAD.WORK2, UPLOAD.WORK3, and UPLOAD.WORK4, to receive the data delivered.

JCL List #11

Creating the Receiving Datasets

```
//jobname JOB (account),MSGCLASS=V,CLASS=L
//NEWDS EXEC PGM=IEFBR14
//* destination text library
//DD1 DD DSN=C.CPGM.TEXTLIB,
// DISP=(,CATLG),
// DCB=(DSORG=PO,RECFM=FB,
// LRECL=80, BLKSIZE=800),
// UNIT=SYSDA,
// SPACE=(CYL, (10,10,20)) depending on software
//* destination program library
//DD2 DD DSN=C.CPGM.LOADLIB,
// DISP=(,CATLG),
// DCB=(DSORG=PO,RECFM=U,BLKSIZE=32760),
// UNIT=SYSDA,
// SPACE=(CYL, (10,10,20)) depending on software
//DD3 DD DSN=UPLOAD.WORK1,
// DISP=(,CATLG),
// DCB=(DSORG=PS,RECFM=FB,
// LRECL=80,BLKSIZE=800),
 UNIT=SYSDA,SPACE=(CYL, (1,1))
//* for Cpgm2.exe or .txt
//DD4 DD DSN=UPLOAD.WORK2,
// DISP=(,CATLG),
 DCB=(DSORG=PS, RECFM=FB,
// LRECL=80, BLKSIZE=800),
// UNIT=SYSDA,SPACE=(CYL, (1,1))
//* for Cpgm3.exe or .txt
```

//DD5 DD DSN=UPLOAD.WORK3,
// DISP=(,CATLG),
// DCB=(DSORG=PS, RECFM=FB,
// LRECL=80, BLKSIZE=800),
// UNIT=SYSDA,SPACE=(CYL, (1,1))
//* for Cpgm4.exe or .txt
//DD6 DD DSN=UPLOAD.WORK4,
// DISP=(,CATLG),
DCB=(DSORG=PS,RECFM=FB,
// LRECL=80, BLKSIZE=800),
// UNIT=SYSDA,SPACE=(CYL,(1,1))

The LRECL value of upload sequential datasets, UPLOAD.WORKn 53 must be the same value as LRECL value of download sequential dataset, DOWNLOAD.WORK, 52 at sender's site 1. The LRECL value of 80 bytes is the default value for the sender. But sender 1 may use a different value, so receiver 2 must be careful about this LRECL value.

The disk space parameters of destination load library and destination text library 58 must be carefully decided. This space must be sufficient to receive all the data delivered. Mostly sender 1 supplies this information. Upload sequential datasets 53 are used repeatedly for each upload of both the text and load library data, so it is recommended to allocate enough space to fit all situations.

At the above, the BLKSIZE value 32,760 of destination load library, C.CPGM.LOADLIB, 58 is the maximum allowed value, and is recommended and set as the default value. This value can be changed to any value equal to or greater than the BLKSIZE value of original load library 49 at sender 1, which is usually supplied by sender 1.

Like the download procedure of each library, the whole upload procedure, from the first step 30 of the file transfer step 30–35 to the completion of loading 55 the final library, is also performed repeatedly for each individual library delivered. Each library must be uploaded separately individually.

Let's start with the upload of the load library data delivered. The upload procedure for the text library data will be repeated later after the completion of the upload of the load library data.

Receiver programmer 28 now transfers 30–35 PC 28 files of original load library 49 to mainframe upload sequential datasets 53 in binary mode using Procedure #2, #3 or #4.

transfer C:\BSOFT\CPGM1.exe to UPLOAD.WORK1.
    transfer C:\BSOFT\CPGM2.exe to UPLOAD.WORK2.
    transfer C:\BSOFT\CPGM3.exe to UPLOAD.WORK3.
    transfer C:\BSOFT\CPGM4.exe to UPLOAD.WORK4.

Now, all the copies of original load library 49 are transferred to a receiver's mainframe 4.

Receiver programmer 28 has to load 56–57 all the contents of upload sequential dataset 53 to destination load library 58 by running 54 program PCFORM 55. A PCFORM program JCL stream in JCL List #12 is submitted 54 and program PCFORM 55 loads 56–57 all the data in IN upload sequential datasets 53 to OUT destination program load library 58.

JCL List #12
Loading the Delivered Load Library Data to a Load Library
//jobname JOB (account),MSGCLASS=V,CLASS=L
//PCFORM EXEC PGM=PCFORM
//STEPLIB DD DISP=SHR,DSN=C.ASOFT.LOADLIB
//SYSPRINT DD SYSOUT=*
//IN DD DISP=SHR,DSN=UPLOAD.WORK1
// DD DISP=SHR,DSN=UPLOAD.WORK2
// DD DISP=SHR,DSN=UPLOAD.WORK3
// DD DISP=SHR,DSN=UPLOAD.WORK4
//* destination library
//OUT DD DISP=SHR,DSN=C.CPGM.LOADLIB
//CONTROL DD * LOAD
//

Here, the CONTROL control command LOAD converts the content of upload sequential datasets 53 to the members of destination library 58. The LOAD command starts at column 1 and can be followed by any number of library member names. More than one member list lines can follow the LOAD control command line, but the first column of the following lines must be blank. In this case, only the named members are picked up from upload sequential datasets 53 and loaded to destination library 58. The LOAD control command without any member names, as shown as in the above sample JCL stream, will load the whole content of upload sequential datasets 53 to destination library 58.

JCL Note #2
Example of Free Format LOAD Command Syntax
  (1). LOAD
  (2). LOAD PROGRAM1 PROGRAM2
    PROGRAM3, Program4,
    PROGRAM5 program6,
      PROGRAM7, PROGRAM8
  (3). LOAD
    PROGRAM1 PROGRAM2
      program3, PROGRAM4
        PROGRAM5
      PROGRAM6, PROGRAM7
  (4). LOAD (
    text1 jc12
    source3
      Macro4
    Source5 ,SOURCE6 )

Now, delivered original load library or load modules 49 were loaded 56–57 into destination program load module library 58. This was done without the use of magnetic tape.

The upload of a part or whole of a text library also can be done in just the same way. At first, the PC files of delivered text data are transferred 30–35 to mainframe upload sequential datasets 53 and the content of upload sequential datasets 53 are loaded 56–57 to destination text library 58 by a program PCFORM JCL stream (JCL List #13).

Receiver programmer 28 transfers the PC files of original text library 49 to mainframe upload sequential datasets 53 in Text mode using Procedure #2, #3 or #4.

transfer C:\BSOFT\CPGM1.txt to UPLOAD.WORK1.
    transfer C:\BSOFT\CPGM2.txt to UPLOAD.WORK2.
    transfer C:\BSOFT\CPGM3.txt to UPLOAD.WORK3.
    transfer C:\BSOFT\CPGM4.txt to UPLOAD.WORK4.

Receiver programmer 28 loads 56–57 all the transferred content to destination text library 58 by running 54 program PCFORM JCL stream shown in JCL List #13 which is just the same as above load library upload procedure, except for the OUT library name. The IN dataset is upload sequential dataset 53 and OUT dataset is final destination text library 58.

JCL List #13
Loading the Delivered Text Library Data to a Text Library
//jobname JOB (account),MSGCLASS=V,CLASS=L
//PCFORM EXEC PGM=PCFORM
//STEPLIB DD DISP=SHR,DSN=C.ASOFT.LOADLIB
//SYSPRINT DD SYSOUT=*
//IN DD DISP=SHR,DSN=UPLOAD.WORK1

```
// DD DISP=SHR,DSN=UPLOAD.WORK2
// DD DISP=SHR,DSN=UPLOAD.WORK3
// DD DISP=SHR,DSN=UPLOAD.WORK4
//* destination text library
//OUT DD DISP=SHR,DSN=C.CPGM.TEXTLIB
//CONTROL DD * LOAD
//
```

Text members or a whole text library were loaded 56–57 into destination text library 58. JCL Lists #12 and #13 are similar except the OUT datasets. Delivery of Various Sequential Datasets in FIG. 4

Any sequential dataset of fixed record format, undefined record format or variable record format can be transferred to another mainframe using PC-based data media and can be reverted to its original form when uploaded, as depicted in FIG. 4.

The events in FIG. 4 can be explained using JCL streams of JCL Lists #14 and #15, which are similar to JCL Lists #9 or #10 and JCL Lists #12 or #13 with only small differences. The IN dataset in JCL stream of JCL List #14 at the sender's site and the OUT dataset in JCL List #15 at the receiver's site are sequential datasets of fixed record format, undefined record format or variable record format respectively. The block size of both IN and OUT sequential datasets must be the same when they are of undefined record format or variable record format. The logical record length of both IN and OUT sequential datasets must be same when they are of fixed record format. Download and upload procedures of FIG. 4 are exactly the same as in FIGS. 2 and 3.

JCL List #14

Dumping the Content of a Sequential Dataset to the Download Sequential Dataset

```
//jobname JOB (account), MSGCLASS=V, CLASS=L
//PCFORM EXEC PGM=PCFORM
//STEPLIB DD DISP=SHR,DSN=BSOFT.ASOFT.
   LOADLIB
//SYSPRINT DD SYSOUT=*
//IN DD DISP=SHR,DSN=a_F/U/V_dataset_name
//OUT DD DISP=SHR, DSN=DOWNLOAD.WORK
//CONTROL DD * DUMP
//
```

JCL List #15

Loading the Delivered Data to a Destination Sequential Dataset

```
//jobname JOB (account), MSGCLASS=V, CLASS=L
//PCFORM EXEC PGM=PCFORM
//STEPLIB DD DISP=SHR,DSN=C.ASOFT.LOADLIB
//SYSPRINT DD SYSOUT=*
//IN DD DISP=SHR,DSN=UPLOAD.WORK
//OUT DD DISP=SHR,DSN=a_F/U/V_dataset_name
//CONTROL DD * LOAD
//
```

Conclusion of FIGS. 1–7

If two mainframe data centers have the program PCFORM, one data center can send any sequential dataset and a part or whole of a load library or a text library using PC-based data transportation media. Any data center can be a sender or a receiver of mainframe data.

If the receiver does not have the program PCFORM, it can only receive a single load module, but it can not receive a library or other dataset. This feature is useful to send the program PCFORM to other mainframe data centers using PC-based data media.

Creation of Download Sequential Datasets

This invention solves the download and upload problems of a single load module, a part or whole of a load module library, a part or whole of a text library and a sequential dataset by converting to a download sequential dataset of fixed record format.

Fixed record format means that each record has the same length. As the explanation in the section of the Discussion of Related Art, only a sequential dataset of fixed record format can be downloaded to a PC and uploaded to a mainframe from a PC into its original form. A dataset which is not of fixed record format must be converted to a sequential dataset of fixed record format first to be delivered to another mainframe data center. The download sequential dataset of the sender and the upload sequential dataset of the receiver are defined as a fixed record format and their logical record length must be the same.

For undefined record format dataset, only the block size is given and each block has only one record in it. So the block size is the maximum length of the records. Minimum record length can be 1 byte long. Each record can have different record length of from 1 byte to the maximum record length defined. This type of dataset cannot be reverted to its original form if downloaded to a PC and uploaded back to a mainframe. This type of dataset must first be converted to a sequential dataset of fixed record format to be delivered to another mainframe data center.

A program load module library and its members, program load modules, are of undefined record format.

Many VSAM datasets and DB2 datasets are of undefined-type record format. For VSAM dataset, it's not called undefined record format, but it does have undefined record lengths. In many VSAM datasets, its maximum record length and average record length are given. Here, average record length is just an average value, not a minimum value. Each record length can be from 1 byte long to the maximum record length defined. When these VSAM datasets are copied to a sequential dataset, the sequential dataset must be of an undefined record format.

FIG. 1 shows that a single load module is delivered when the sender has the program PCFORM, but the receiver does not have the program PCFORM. The load module is an undefined record format dataset. In this case, the logical record length of the download dataset of fixed record length is defined with the same value as the blick size of the library in where the single load module is located. Each input load module record of various length is padded with zeroes at the end of input data up to the blick size length as in FIG. 19 and written out to the download sequential dataset. These padded records are uploaded and reverted to its original form in another mainframe using IBM utility programs IEBGENER and IEWL.

FIG. 2 shows that a part or whole of a load module library is delivered to another mainframe data center when both the sender and the receiver have the program PCFORM. As explained above, a load module library is of undefined record format. Only its block size is given and the length of one record can be different from other records and unpredictable. These undefined various length records must be converted to a sequential dataset of fixed length records. The conversion of a load module library is handled in two different ways in this invention. First method (FIG. 17) is: each input record is appended at the beginning of each logical record by a 4-bytes header which contains the real length of the undefined record and this record with 4-bytes header is divided into fixed length shorter records of download sequential dataset of fixed record length format. When uploading, the real record length in a 4-bytes header is analyzed first and proper number of following records are concatenated according to this length. The second method (FIG. 18) is: each input record of various length is first divided into shorter records of (the logical record length of the download sequential dataset minus 4) bytes length. Each divided record is appended at the beginning with a 4-bytes of header of 2-bytes of real data length and 2-bytes of sequence number of shorter records in the original input record. The first devided shorter record has the sequence number, 1. The last shorter record of each input record may have the data length shorter than the record length of the download sequential dataset of fixed record format. When upload, the upload record with the sequence number 1 in the header becomes the start of each output record and the real data length is in the header, so the concatenation is possible.

FIG. 3 shows when a part or whole of a text library is delivered to another mainframe data center when both the sender and receiver have the program PCFORM. In the case of a text library, all records are of fixed length and their length is 80-bytes long. No conversion is necessary because the output download sequential dataset is of fixed record format and its record length is defined as 80-bytes long. Each record from the input text library is written out to the output download dataset. Upload sequential dataset is also of fixed record format and record length is 80-bytes. Each upload record is written out to the destination text library. There is no conversion of text records.

FIG. 4 shows when a sequential dataset of fixed record format, undefined record format or variable record format is delivered to another mainframe data center when both the sender and the receiver have the program PCFORM. As mentioned above, for a sequential dataset of undefined record format, only the maximum record length is known, minimum record length can be 1 byte long and each record can have different record length. This is just the same situation as for the load module library. So, the udefined various length records are converted just the same ways as for the load module library records. The above two conversion methods of a load module library can be used for this sequential dataset of undefined record format.

Although the invention has been described with reference to a particular arrangement of events, features, sequences and the like, these are not intended to exhaust all possible arrangements or features, and indeed many other modifications and variations will be ascertainable to those of skill in the art.

TABLE 1

| | | | |
|---|---|---|---|
| PCFORM | CSECT | | |
| | USING | *,15 | |
| | STM | 14,12,12(13) | |
| | BAL | 2,*+76 | |
| | DROP | 15 | |
| | DS | 18F | |
| | ST | 2,8(,13) | |
| | ST | 13,4(,2) | |
| | LR | 13,2 | |
| | USING | PCFORM+8,13,12,11,10,9,8 | BASES |
| | LA | 12,4095(,13) | |
| | LA | 12,1(,12) | |
| | LA | 11,4095(,12) | |
| | LA | 11,1(,11) | |
| | LA | 10,4095(,11) | |
| | LA | 10,1(,10) | |
| | LA | 9,4095(,10) | |
| | LA | 9,1(,9) | |
| | LA | 8,4095(,9) | |
| | LA | 8,1(,8) | |
| * | | | |
| | OPEN | SYSIN | |
| | TM | SYSIN+X'30',X'10' | OPEN OK ? |
| | BNO | PDSPROG3 | NO |
| | OPEN | (SYSPRINT,OUTPUT) | |
| * | | | |
| | LA | 8,CNTLTBL | |
| | LA | 2,CMPCSTR | ADDRESS OF CMPCSTR TABLE |
| | ST | 2,ACPMCSTR | INITIALIZE TO THE BEGINNING |
| | ST | 2,12(,8) | |
| CMDSYSIN | DS | 0H | |
| | GET | SYSIN | |
| | MVC | MSGWORK,0(1) | |
| | PUT | SYSPRINT,MSGWORK | |
| * | | | |
| | LA | 7,MSGWORK | |
| | CLI | 0(7),C' ' | CONTINUED CARD ? |
| | BE | ANLCNTL2 | YES, CONTINUED CARD |
| | MVI | CMDCONTN,X'00' | COMMAND CONTINUATION OFF |
| | LR | 1,7 | STARTING LOCATION OF STRING |
| | LA | 2,5 | LENGTH |
| | BAL | 14,TOCAPITL | CONVERT TO CAPITAL |
| | CLC | =C'LOAD ',0(7) | LIBRARY LOAD COMMAND ? |
| | BE | CMDLLOAD | YES |
| | CLC | =C'DUMP ',0(7) | LIBRARY DUMP COMMAND ? |
| | BE | CMDLDUMP | YES |
| | B | CMDSNTXE | |
| ANLCNTL2 | DS | 0H | CONTINUED CARD |
| | CLI | CMDCONTN,X'01' | LIB DUMP COMMAND CONTINUED ? |

TABLE 1-continued

|           | BE   | CMDLDMPH              | YES                          |
|-----------|------|-----------------------|------------------------------|
|           | CLI  | CMDCONTN,X'02'        | LIB LOAD COMMAND CONTINUED ? |
|           | BE   | CMDLLODH              | YES                          |
|           | B    | CMDSNTXE              | SYNTAX ERROR                 |
| *         |      |                       |                              |
| CMDSNTXE  | DS   | 0H                    |                              |
|           | WTO  | 'COMMAND SYNTAX ERROR' |                             |
|           | LA   | 15,4                  | COMMAND SYNTAX ERROR         |
|           | L    | 13,4(13)              |                              |
|           | ST   | 15,16(,13)            |                              |
|           | LM   | 14,12,12(13)          |                              |
|           | BR   | 14                    |                              |
| *         |      |                       |                              |
| *         |      |                       |                              |
| ACPMCSTR  | DS   | A                     |                              |
| CNTLTBL   | DS   | XL16                  |                              |
| CMPCSTR   | DS   | CL4000  MAXIMUM 500 MEMBER NAMES |                   |
| *         |      |                       |                              |
| CMDCONTN  | DC   | X'00'   X'01'   LIB DUMP COMMAND CONTINUED |          |
| *         |      |         X'02'   LIB LOAD COMMAND CONTINUED |          |
| *         |      |                       |                              |
| CMDCONTI  | DC   | X'00'                 |                              |
| *         |      |                       |                              |
| DSDMVC1   | MVC  | 0(0,4),0(5)   MOVE FROM R5 TO R4 |                   |
| *         |      |                       |                              |
| SYSIN     | DCB  | DDNAME=CONTROL,DSORG=PS,MACRF=GL,            X |
|           |      | RECFM=FB,LRECL=80,BLKSIZE=800,EODAD=SYSINEND |
| *         |      |                       |                              |
| MSGWORK   | DC   | CL80' '               |                              |
| MSGWORK2  | DC   | CL80' '               |                              |
| *         |      |                       |                              |
| SYSPRINT  | DCB  | DDNAME=SYSPRINT,DSORG=PS,MACRF=PM,           X |
|           |      | RECFM=FB,LRECL=80,BLKSIZE=800 |                      |
| *         |      |                       |                              |
| *         |      |                       |                              |
| *         |      |                       |                              |
| CMDLLOAD  | DS   | 0H    LOAD            |                              |
| *         |      |       LOAD   PROGRAM1 PROGRAM2 |                     |
| *         |      |              PROGRAM3,PROGRAM4, |                    |
| *         |      |              PROGRAM5 PROGRAM6, |                    |
| *         |      |              PROGRAM7,PROGRAM8 |                     |
| *         |      |       LOAD            |                              |
| *         |      |              PROGRAM1 PROGRAM2 |                     |
| *         |      |              PROGRAM3, PROGRAM4 |                    |
| *         |      |              PROGRAM5 |                              |
| *         |      |              PROGRAM6,PROGRAM7 |                     |
| *         |      |       LOAD   (        |                              |
| *         |      |              PROGRAM1 PROGRAM2 |                     |
| *         |      |              PROGRAM3 |                              |
| *         |      |              PROGRAM4 |                              |
| *         |      |              PROGRAM5,PROGRAM6 |                     |
| *         |      |              )        |                              |
| *         |      |                       |                              |
|           | MVC  | 0(4,8),=C'LOAD'       |                              |
|           | MVI  | CMDCONTI,X'00'        | LIB LOAD STARTS              |
|           | MVI  | CMDCONTN,X'02'        | LIB LOAD MAY CONTINUE        |
|           | LA   | 7,4(,7)               | AFTER 'LOAD '                |
|           | B    | CMDLDMPB              |                              |
| *         |      |                       |                              |
| CMDLLODH  | DS   | 0H                    |                              |
|           | B    | CMDLDMPH              |                              |
| *         |      |                       |                              |
| *         |      |                       |                              |
| CMDLDUMP  | DS   | 0H    DUMP            |                              |
| *         |      |       DUMP   PROGRAM1 PROGRAM2 |                     |
| *         |      |              PROGRAM3,PROGRAM4, |                    |
| *         |      |              PROGRAM5 PROGRAM6, |                    |
| *         |      |              PROGRAM7,PROGRAM8 |                     |
| *         |      |       DUMP            |                              |
| *         |      |              PROGRAM1 PROGRAM2 |                     |
| *         |      |              PROGRAM3, PROGRAM4 |                    |
| *         |      |              PROGRAM5 |                              |
| *         |      |              PROGRAM6,PROGRAM7 |                     |
| *         |      |       DUMP   (        |                              |
| *         |      |              PROGRAM1 PROGRAM2 |                     |
| *         |      |              PROGRAM3 |                              |
| *         |      |              PROGRAM4 |                              |
| *         |      |              PROGRAM5 ,PROGRAM6 |                    |
| *         |      |              )        |                              |

TABLE 1-continued

```
*
          MVC    0(4,8),=C'DUMP'
          MVI    CMDCONTI,X'00'         LIB DUMP STARTS
          MVI    CMDCONTN,X'01'         LIB DUMP MAY CONTINUE
          LA     7,4(,7)                AFTER 'DUMP '
*
CMDLDMPB  DS     0H
          SR     2,2
          ST     2,4(,8)                ZERO MEMBER COUNT
          STH    2,10(,8)               ZERO TEXT LENGTH
          LR     1,7
          BAL    14,SKIPBLNK            SKIP BLANKS
          BZ     CMDSYSIN               ALL BLANKS. GO GET NEXT CARD
          LR     7,1                    LOCATION OF NON-BLANK FOUND
          B      CMDLDMPC
*
CMDLDMPH  DS     0H
          LR     1,7
          BAL    14,SKIPBLNK            SKIP BLANKS
          BZ     CMDSNTXE               ALL BLANKS. SYNTAX ERROR
          LR     7,1                    LOCATION OF NON-BLANK FOUND
*
CMDLDMPC  DS     0H
          CLI    0(7),C'('
          BNE    CMDLDMPF
          LH     2,10(,8)               TEXT LENGTH
          LTR    2,2                    ANY LENGTH ?
          BNZ    CMDSNTXE               YES. SYNTAX ERROR
          CLI    CMDCONTI,X'00'         CLOSING PAREN EXPECTED FLAG ON ?
          BNE    CMDSNTXE               YES. SYNTAX ERROR
          MVI    CMDCONTI,X'01'         CLOSING PARENTHESIS EXPECTED FLAG
          LA     7,1(,7)                AFTER '('
*
CMDLDMPF  DS     0H
          LR     1,7
          BAL    14,SKIPBLNK            SKIP BLANKS
          BZ     CMDSYSIN               ALL BLANKS. GO GET NEXT CARD
          LR     7,1                    LOCATION OF NEXT STRING
          CLI    0(7),C','
          BE     CMDLDMPJ               GO IGNORE ,
          CLI    0(7),C')'
          BE     CMDLDMPG               ALL MEMBER NAME DONE
          LR     1,7                    STARTING LOCATION OF STRING
          LA     2,9                    LENGTH
          BAL    14,TOCAPITL            CONVERT TO CAPITAL
          LR     1,7
          BAL    14,FINDDELM            R1 POINTS TO THE STARTING POINT
          BZ     CMDSNTXE               DELIMITER NOT FOUND
          LR     6,1
          SR     1,7                    LENGTH OF MEMBER NAME
          C      1,=F'8'                MEMBER NAME > 8 CHARS ?
          BH     CMDSNTXE               YES, INVALID MEMBER NAME
          BCTR   1,0
          LR     5,7
          L      4,ACPMCSTR             NEXT TEXT SAVE AREA ADDRESS
          MVI    0(4),C' '
          MVC    1(7,4),0(4)
          EX     1,DSDMVC1              MVC 0(0,4),0(5)
          LR     7,6
          L      4,ACPMCSTR             USED TEXT SAVE AREA ADDRESS
          LA     4,8(,4)
          ST     4,ACPMCSTR             NEXT TEXT SAVE AREA ADDRESS
          L      1,4(,8)                MEMBER COUNT
          LA     1,1(,1)                INCREASE MEMBER COUNT
          ST     1,4(,8)                NEW MEMBER COUNT
          LH     1,10(,8)               TEXT LENGTH
          LA     1,8(,1)                INCREASE TEXT LENGTH
          STH    1,10(,8)               NEW TEXT LENGTH
          B      CMDLDMPF
*
CMDLDMPJ  DS     0H
          LA     7,1(,7)                IGNORE ,
          B      CMDLDMPF
*
CMDLDMPG  DS     0H
          CLI    CMDCONTI,X'01'         CLOSING PAREN EXPECTED FLAG ON ?
          BNE    CMDSNTXE               NO. SYNTAX ERROR
          LH     1,10(,8)               TEXT LENGTH
          LTR    1,1                    ANY MEMBER NAME ?
```

TABLE 1-continued

| | | | |
|---|---|---|---|
| | BZ | CMDSNTXE | NO. SYNTAX ERROR |
| | MVI | CMDCONTN,X'00' | COMMAND CONTINUATION OFF |
| | MVI | CMDCONTI,X'02' | PARM OFF |
| | B | CMDSYSIN | ALL MEMBER DONE |
| * | | | |
| * | | | |
| * | | FIND THE TRAILING DELIMITER | |
| FINDDELM | DS | 0H | R1 POINTS TO THE STARTING POINT |
| | LR | 3,1 | ARGUMENT ADDRESS |
| | XC | PDSTRTHX,PDSTRTHX | |
| | MVI | PDSTRTHX+C' ',X'01' | |
| | MVI | PDSTRTHX+C',',X'01' | |
| | MVI | PDSTRTHX+C')',X'01' | |
| | LA | 1,9(,1) | MAX 9 bytes |
| | TRT | 0(9,3),PDSTRTHX | SEARCH FOR A DELIMITER BYTE |
| | BNZR | 14 | ADDRESS OF THE FIRST DELIMITER IN R1 |
| | BR | 14 | DELIMITER NOT FOUND |
| * | | | |
| * | SKIP BLANKS | | |
| SKIPBLNK | DS | 0H | R1 POINTS TO THE STARTING POINT |
| | LR | 3,1 | ARGUMENT ADDRESS |
| | MVI | PDSTRTHX,X'01' | |
| | MVC | PDSTRTHX+1(255),PDSTRTHX | |
| | MVI | PDSTRTHX+C' ',X'00' | |
| | LA | 1,74(,1) | MAX 74 blanks |
| | TRT | 0(74,3),PDSTRTHX | SEARCH FOR A NON-BLANK BYTE |
| | BNZR | 14 | ADDRESS OF THE FIRST NON-BLANK IN R1 |
| | BR | 14 | ALL BLANKS |
| * | | | |
| * | R1 POINTS TO THE TEXT STRING | | |
| * | R2 CONTAINS THE LENGTH | | |
| TOCAPITL | DS | 0H | |
| | LR | 3,1 | |
| | BCTR | 2,0 | |
| | EX | 2,TOCAPIT2 | TR 0(0,3),TOCPTLTB |
| | BR | 14 | |
| TOCAPIT2 | TR | 0(0,3),TOCPTLTB | |
| TOCPTLTB | DC | 256AL1(*-TOCPTLTB) | |
| | ORG | TOCPTLTB+C'a' | |
| | DC | C'ABCDEFGHI' | |
| | ORG | TOCPTLTB+C'j' | |
| | DC | C'JKLMNOPQR' | |
| | ORG | TOCPTLTB+C's' | |
| | DC | C'STUVWXYZ' | |
| | ORG | , | |
| * | | | |
| * | | | |
| | LTORG | | |
| * | | | |
| SYSINEND | DS | 0H | |
| | CLOSE | SYSIN | |
| * | | | |
| * | | | |
| | LA | 5,CNTLTBL | |
| | L | 2,4(,5) | MEMBER COUNT |
| | ST | 2,ACTNCNT | |
| | LH | 2,10(,5) | TEXT LENGTH |
| | STH | 2,TEXTLEN | |
| | L | 2,12(,5) | TEXT LOCATION |
| | ST | 2,TEXTLOC | |
| * | | | |
| | LA | 15,DUMPINOT | |
| | CLC | 0(4,5),=C'DUMP' | |
| | BE | PDSPROG4 | |
| | LA | 15,LOADINOT | |
| | CLC | 0(4,5),=C'LOAD' | |
| | BE | PDSPROG4 | |
| * | | | |
| PDSPROG3 | DS | 0H | |
| | WTO | 'CONTROL command missing' | |
| | LA | 15,4 | |
| | B | PDSPROG9 | |
| * | | | |
| PDSPROG4 | DS | 0H | |
| | BALR | 14,15 | |
| * | | | |
| | WTO | 'COMPLETED SUCCESSFULLY' | |
| | SR | 15,15 | |
| * | | | |

TABLE 1-continued

```
PDSPROG9   DS      0H
           L       13,4(,13)
           ST      15,16(,13)
           LM      14,12,12(13)
           BR      14
*
*
ACTNCNT    DS      A                           MEMBER COUNT
TEXTLEN    DS      H                           TEXT LENGTH IF ANY
TEXTLOC    DS      A                           TEXT LOCATION IF ANY
*
PDSDMPSW   DC      X'02'      X'01'            WHEN EACH INPUT LOAD LIBRARY RECORD
*                                              IS FIRST DIVIDED INTO RECORDS OF SAME
*                                              LENGTH OF (OUTPUT LRECL − 4) BYTES AND
*                                              THEN EACH DIVIDED RECORD IS APPENDED AT
*                                              THE FRONT WITH 4-BYTES HEADER OF 2-BYTES
*                                              OF CONTENT LENGTH IN THE DIVIDED RECORD
*                                              AND 2-BYTES OF CONTINATION SEQUENCE NUMBER
*                              X'02'           WHEN 4-BYTES HEADER, WITH 2-BYTES OF
*                                              INPUT LOAD LIBRARY RECORD LENGTH AND 2
*                                              NULL BYTES, IS FIRST APPENDED AT THE
*                                              BEGINING OF EACH INPUT LOAD LIBRARY RECORD
*                                              AND THEN IT IS DIVIDED INTO THE OUTPUT
*                                              RECORDS OF SAME LENGTH
*
*
           LTORG
*
*
RETURN99   DS      0H
           CLOSE   PSGETDCB
           CLOSE   PSPUTDCB
           LM      0,15,PDSRSAVE
           BR      14
*
*
*
*          TRANSFER OF RECFM=U or V or F DATASET IS POSSIBLE.
*          TRANSFER OF A SINGLE LOAD MODULE IS POSSIBLE.
*
DUMPINOT   DS      0H
           STM     0,15,PDSRSAVE
*
           MVC     JFCBDCB+X'28'(8),=CL8'IN'   MOVE DDNAME INTO DCB
           RDJFCB  JFCBDCB
           LTR     15,15                       RDJFCB succeeded ?
           BNZ     PDSERR0G                    NO
           OPEN    JFCBDCB
           MVC     OBTNDSN,JFCBAREA            MOVE DATASET NAME
           MVC     OBTVOLSR,JFCBAREA+X'76'     MOVE VOL=SER NUMBER
           OBTAIN  OBTAIN1
           LTR     15,15                       OBTAIN OK ?
           BNZ     PDSERR0H                    NO
           CLOSE   JFCBDCB
           TM      OBTNDSCB+X'26',X'02'        PO ?
           BNO     UVFDTSET                    NO, CHECK U OR VB OR F DATASET
*
           TM      JFCBAREA+X'56',X'01'        A MEMBER OF A PDS ?
           BNO     PDSDUMP                     NO, A PDS WHOLE LIBRARY
*
*          A SINGLE MEMBER OF A LIBRARY
           OPEN    PSGETDCB
           TM      PSGETDCB+X'30',X'10'        OPEN OK ?
           BNO     PDSERR03                    NO
           TM      PSGETDCB+X'24',X'C0'        RECFM=U ?
           BNO     FDATASET                    NO, A TEXT MEMBER
           LH      2,PSGETDCB+X'3E'            MAX BLOCK SIZE
           STH     2,PDSBLKSZ
           LA      2,RETURN99                  NEW EODAD ADDRESS
           STCM    2,7,PSGETDCB+X'21'          EODAD
           OPEN    (PSPUTDCB,OUTPUT)
           TM      PSPUTDCB+X'30',X'10'        OPEN OK ?
           BNO     PDSERR04                    NO
           TM      PSPUTDCB+X'24',X'C0'        RECFM=U ?
           BO      PDSERR0F                    NO, RECFM NOT SUPPORTED
           TM      PSPUTDCB+X'24',X'80'        RECFM=F or FB ?
           BNO     PDSERR0F                    NO, RECFM NOT SUPPORTED
           LH      2,PSPUTDCB+X'52'            LRECL OF OUTPUT FILE
           STH     2,PSOLRECL
```

TABLE 1-continued

|          | CH    | 2,PDSBLKSZ              | OUT LRECL > IN BLKSIZE ?              |
|          | BL    | PDSERR08                | OUT LRECL TOO SMALL                   |
| PADDING2 | DS    | 0H                      |                                       |
|          | L     | 2,=A(THEWORK)           |                                       |
|          | LH    | 3,PSPUTDCB+X'3E'        | OUT BLKSIZE                           |
|          | SR    | 4,4                     |                                       |
|          | SR    | 5,5                     |                                       |
|          | MVCL  | 2,4                     | MAKE IT ZERO                          |
|          | GET   | PSGETDCB                |                                       |
|          | LR    | 4,1                     |                                       |
|          | LH    | 5,PSGETDCB+X'52'        | IN LRECL                              |
|          | L     | 2,=A(THEWORK)           |                                       |
|          | LR    | 3,5                     |                                       |
|          | MVCL  | 2,4                     | MOVE IN RECORD TO OUT BUFFER          |
|          | PUT   | PSPUTDCB,THEWORK        |                                       |
|          | B     | PADDING2                |                                       |
| *        |       |                         |                                       |
| *        |       |                         |                                       |
| *        | U OR VB OR F DATASET |          |                                       |
| UVFDTSET | DS    | 0H                      |                                       |
|          | OPEN  | PSGETDCB                |                                       |
|          | TM    | PSGETDCB+X'30',X'10'    | INPUT OPEN OK ?                       |
|          | BNO   | PDSERR03                | NO                                    |
|          | TM    | PSGETDCB+X'1A',X'40'    | INPUT DSORG = PS ?                    |
|          | BNO   | PDSERR0J                | NO.                                   |
|          | MVC   | PDSRECFM,PSGETDCB+X'24' | V=X'40' or VB=X'50' or U=X'C0'        |
|          | TM    | PSGETDCB+X'24',X'C0'    | INPUT RECFM=U ?                       |
|          | BO    | UDATASET                | YES                                   |
|          | TM    | PSGETDCB+X'24',X'80'    | INPUT RECFM=F ?                       |
|          | BO    | FDATASET                | YES                                   |
|          | TM    | PSGETDCB+X'24',X'40'    | INPUT RECFM=V ?                       |
|          | BO    | VDATASET                | YES                                   |
|          | B     | PDSERR0K                |                                       |
| *        |       |                         |                                       |
| *        |       |                         |                                       |
| *        |       |                         |                                       |
| *        | DOWNLOAD OF INPUT RECFM = V or VB DATASET |  |                        |
| VDATASET | DS    | 0H                      |                                       |
|          | LA    | 2,RETURN99              | NEW EODAD ADDRESS                     |
|          | STCM  | 2,7,PSGETDCB+X'21'      | EODAD                                 |
|          | OPEN  | (PSPUTDCB,OUTPUT)       |                                       |
|          | TM    | PSPUTDCB+X'30',X'10'    | OUTPUT OPEN OK ?                      |
|          | BNO   | PDSERR04                | NO                                    |
|          | LH    | 2,PSPUTDCB+X'52'        | OUTPUT LRECL                          |
|          | STH   | 2,PSOLRECL              |                                       |
| *        |       |                         |                                       |
|          | MVC   | PDSOUTWK(23),=CL23'Dump of VB Dataset : ' | |                     |
|          | TM    | PSGETDCB+X'24',X'10'    | INPUT RECFM=VB ?                      |
|          | BO    | VDATSET1                | YES                                   |
|          | MVC   | PDSOUTWK(23),=CL23'Dump of V Dataset : '  | |                     |
| VDATSET1 | DS    | 0H                      |                                       |
|          | MVC   | PDSOUTWK+23(44),JFCBAREA | DSNAME                               |
|          | TIME  | DEC                     |                                       |
|          | STCM  | 1,15,PDSWRKDW           | X'00YYDDDF'                           |
|          | STCM  | 0,12,PDSWRKDW+4         | X'HHMM'                               |
|          | LA    | 1,PDSWRKDW+1            | X'0095013F'      95/01/13             |
|          | BAL   | 14,EDITDATE             | R1 —> YYDDMMDD                        |
|          | MVC   | PDSOUTWK+68(2),5(1)     | MM                                    |
|          | MVI   | PDSOUTWK+70,C'/'        |                                       |
|          | MVC   | PDSOUTWK+71(2),7(1)     | DD                                    |
|          | MVI   | PDSOUTWK+73,C'/'        |                                       |
|          | MVC   | PDSOUTWK+74(2),0(1)     | YY                                    |
|          | PUT   | PSPUTDCB,PDSOUTWK       |                                       |
|          | MVI   | PDSOUTWK,C'*'           |                                       |
|          | MVC   | PDSOUTWK+1(79),PDSOUTWK |                                       |
|          | PUT   | PSPUTDCB,PDSOUTWK       |                                       |
| *        |       |                         |                                       |
| VDATSET2 | DS    | 0H                      |                                       |
|          | L     | 2,=A(THEWORK3)          |                                       |
|          | L     | 3,=A(THEWORKL)          |                                       |
|          | SR    | 0,0                     |                                       |
|          | SR    | 1,1                     |                                       |
|          | MVCL  | 2,0                     | INIT WITH X'00'                       |
|          | GET   | PSGETDCB                |                                       |
|          | LR    | 6,1                     | A LOGICAL RECORD WHEN RECFM=V         |
|          |       |                         | A BLOCK WHEN RECFM=VB                 |
| *        |       |                         |                                       |
| *        |       |                         |                                       |
|          | LH    | 2,PSGETDCB+X'52'        | INPUT LENGTH.                         |
| *        |       |                         | A LOGICAL RECORD LENGTH WHEN RECFM=V  |

TABLE 1-continued

|  |  |  | A BLOCK LENGTH WHEN RECFM=VB |
| --- | --- | --- | --- |
| * | STH | 2,PSILRECL |  |
|  | L | 2,=A(THEWORK3) |  |
|  | LH | 3,PSILRECL | INPUT LRECL |
|  | LR | 0,6 |  |
|  | LR | 1,3 |  |
|  | MVCL | 2,0 |  |
|  | L | 5,=A(THEWORK3) |  |
| VDATSET3 | DS | 0H |  |
|  | L | 3,=A(THEWORK3) |  |
|  | LH | 2,PSILRECL | INPUT LRECL |
|  | AR | 3,2 |  |
|  | CR | 5,3 |  |
|  | BNL | VDATSET2 |  |
|  | PUT | PSPUTDCB,(5) |  |
|  | LH | 2,PSOLRECL | OUTPUT LRECL |
|  | AR | 5,2 |  |
|  | B | VDATSET3 |  |
| * |  |  |  |
| * |  |  |  |
| * |  | DOWNLOAD OF INPUT RECFM = F DATASET |  |
| FDATASET | DS | 0H |  |
| * |  | DOWNLOAD OF INPUT RECFM = U DATASET |  |
| UDATASET | DS | 0H |  |
|  | LA | 2,RETURN99 | NEW EODAD ADDRESS |
|  | STCM | 2,7,PSGETDCB+X'21' | EODAD |
|  | OPEN | (PSPUTDCB,OUTPUT) |  |
|  | TM | PSPUTDCB+X'30',X'10' | OUTPUT OPEN OK ? |
|  | BNO | PDSERR04 | NO |
|  | TM | PSPUTDCB+X'24',X'C0' | OUTPUT RECFM=U ? |
|  | BO | PDSERR0F | YES, RECFM NOT SUPPORTED |
|  | TM | PSPUTDCB+X'24',X'80' | OUTPUT RECFM=F or FB ? |
|  | BNO | PDSERR0F | NO, RECFM NOT SUPPORTED |
|  | LH | 2,PSPUTDCB+X'52' | OUTPUT LRECL |
|  | STH | 2,PSOLRECL |  |
| * |  |  |  |
|  | MVC | PDSOUTWK(23),=CL23'Dump of U Dataset : ' |  |
|  | TM | PSGETDCB+X'24',X'C0' | INPUT RECFM=U ? |
|  | BO | UDATSET1 | YES |
|  | TM | PSGETDCB+X'24',X'80' | INPUT RECFM=F ? |
|  | BNO | PDSERR0K | NO |
|  | MVC | PDSOUTWK(23),=CL23'Dump of F Dataset : ' |  |
| UDATSET1 | DS | 0H |  |
|  | MVC | PDSOUTWK+23(44),JFCBAREA | DSNAME |
|  | TIME | DEC |  |
|  | STCM | 1,15,PDSWRKDW | X'00YYDDDF' |
|  | STCM | 0,12,PDSWRKDW+4 | X'HHMM' |
|  | LA | 1,PDSWRKDW+1 | X'0095013F'      95/01/13 |
|  | BAL | 14,EDITDATE | R1 —> YYDDDMMDD |
|  | MVC | PDSOUTWK+68(2),5(1) | MM |
|  | MVI | PDSOUTWK+70,C'/' |  |
|  | MVC | PDSOUTWK+71(2),7(1) | DD |
|  | MVI | PDSOUTWK+73,C'/' |  |
|  | MVC | PDSOUTWK+74(2),0(1) | YY |
|  | PUT | PSPUTDCB,PDSOUTWK |  |
|  | MVI | PDSOUTWK,C'*' |  |
|  | MVC | PDSOUTWK+1(79),PDSOUTWK |  |
|  | PUT | PSPUTDCB,PDSOUTWK |  |
| * |  |  |  |
| UDATSET2 | DS | 0H |  |
|  | GET | PSGETDCB |  |
|  | LR | 6,1 |  |
|  | LH | 2,PSGETDCB+X'52' | IN LRECL |
|  | STH | 2,PSILRECL |  |
| * |  |  |  |
|  | CLI | PDSDMPSW,X'02' |  |
|  | BE | UDATSET5 |  |
| * |  |  |  |
| * |  | WHEN EACH INPUT U RECORD FORMAT RECORD IS FIRST DIVIDED INTO |  |
| * |  | MORE THAN ONE RECORDS OF SAME LENGTH OF (OUTPUT LRECL – 4) |  |
| * |  | BYTES AND THEN EACH DIVIDED RECORD IS APPENDED AT THE FRONT |  |
| * |  | WITH 4-BYTES HEADER OF 2-BYTES OF CONTENT LENGTH IN THE |  |
| * |  | DIVIDED RECORD AND 2-BYTES OF CONTINUATION SEQUENCE NUMBER |  |
| * |  |  |  |
|  | LR | 4,6 |  |
|  | LR | 5,6 |  |
|  | LH | 2,PSILRECL |  |
|  | AR | 4,2 | THE END OF INPUT BLOCK |
|  | SR | 1,1 |  |

TABLE 1-continued

|  |  |  |  |
|---|---|---|---|
|  | STH | 1,PSORECNO |  |
| UDATSET3 | DS | 0H |  |
|  | CR | 5,4 | BLOCK END ? |
|  | BNL | UDATSET2 | YES |
|  | L | 2,=A(THEWORK3) |  |
|  | LH | 3,PSOLRECL | OUTPUT LRECL |
|  | SR | 0,0 |  |
|  | SR | 1,1 |  |
|  | MVCL | 2,0 | INIT WITH X'00' |
| * |  |  |  |
|  | LH | 3,PSOLRECL | OUTPUT FILE LRECL |
|  | S | 3,=F'4' |  |
|  | LR | 0,4 |  |
|  | SR | 0,5 | REMAINING LENGTH |
|  | CR | 0,3 |  |
|  | BNL | UDATSET4 |  |
|  | LR | 3,0 |  |
| UDATSET4 | DS | 0H |  |
|  | L | 2,=A(THEWORK3) |  |
|  | STH | 3,0(,2) | LENGTH |
|  | LH | 1,PSORECNO |  |
|  | LA | 1,1(,1) |  |
|  | STH | 1,PSORECNO |  |
|  | STH | 1,2(,2) | CONCATENATION COUNT |
|  | LR | 0,5 |  |
|  | LR | 1,3 |  |
|  | LA | 2,4(,2) | AFTER HEADER |
|  | MVCL | 2,0 |  |
|  | L | 3,=A(THEWORK3) |  |
|  | PUT | PSPUTDCB,(3) |  |
|  | LH | 2,0(,3) | LENGTH |
|  | AR | 5,2 | NEXT LOCATION IN BLOCK |
|  | B | UDATSET3 |  |
| * |  |  |  |
| * |  | WHEN 4-BYTES HEADER, WITH 2-BYTES OF RECORD LENGTH OF INPUT |  |
| * |  | U RECORD FORMAT RECORD AND 2 NULL BYTES, IS FIRST APPENDED |  |
| * |  | AT THE BEGINING OF EACH INPUT U RECFM RECORD AND IT IS |  |
| * |  | DIVIDED INTO MORE THAN ONE OUTPUT RECORDS OF SAME LENGTH |  |
| UDATSET5 | DS | 0H |  |
|  | L | 2,=A(THEWORK3) |  |
|  | LH | 3,PSPUTDCB+X'3E' | OUTPUT BLOCK SIZE |
|  | LA | 3,8(,3) |  |
|  | SR | 4,4 |  |
|  | SR | 5,5 | INIT WITH X'00' |
|  | MVCL | 2,4 |  |
| * |  |  |  |
|  | LH | 3,PSILRECL | INPUT LRECL SIZE |
|  | L | 5,=A(THEWORK3) | ADDRESS IN THEWORK3 |
|  | STH | 3,0(5) | SAVE THE LENGTH OF THE INPUT RECORD |
|  | SR | 1,1 |  |
|  | STH | 1,2(,5) |  |
|  | LR | 0,6 | INPUT RECORD ADDRESS |
|  | LR | 1,3 | INPUT RECORD LENGTH |
|  | LA | 2,4(,5) | AFTER HEADER |
|  | MVCL | 2,0 |  |
|  | LH | 2,PSILRECL | INPUT LRECL SIZE |
|  | L | 5,=A(THEWORK3) |  |
|  | LA | 4,4(2,5) | THE END OF DATA IN THEWORK3 |
|  | LH | 3,PSOLRECL | OUTPUT FILE LRECL |
| UDATSET6 | DS | 0H |  |
|  | CR | 5,4 | END OF DATA IN THEWORK3 ? |
|  | BNL | UDATSET2 | YES |
|  | PUT | PSPUTDCB,(5) |  |
|  | AR | 5,3 | NEXT LOCATION IN THEWORK3 |
|  | B | UDATSET6 |  |
| * |  |  |  |
| * |  |  |  |
| * |  |  |  |
| LOADINOT | DS | 0H |  |
|  | STM | 0,15,PDSRSAVE |  |
| * |  |  |  |
|  | MVC | JFCBDCB+X'28'(8),=CL8'OUT' | MOVE DDNAME INTO DCB |
|  | RDJFCB | JFCBDCB |  |
|  | LTR | 15,15 | RDJFCB succeeded ? |
|  | BNZ | PDSERR0G | NO |
|  | OPEN | JFCBDCB |  |
|  | MVC | OBTNDSN,JFCBAREA | MOVE DATASET NAME |
|  | MVC | OBTVOLSR,JFCBAREA+X'76' | MOVE VOL=SER NUMBER |
|  | OBTAIN | OBTAIN1 |  |

TABLE 1-continued

|  |  |  |  |
|---|---|---|---|
|  | LTR | 15,15 | OBTAIN OK ? |
|  | BNZ | PDSERR0H | NO |
|  | CLOSE | JFCBDCB |  |
|  | TM | OBTNDSCB+X'26',X'02' | OUTPUT IS A PO ? |
|  | BO | PDSLOAD | YES |
| * |  |  |  |
|  | OPEN | PSGETDCB |  |
|  | TM | PSGETDCB+X'30',X'10' | INPUT OPEN OK ? |
|  | BNO | PDSERR03 | NO |
|  | TM | PSGETDCB+X'1A',X'40' | INPUT DSORG = PS ? |
|  | BNO | PDSERR0J | NO. |
|  | TM | PSGETDCB+X'24',X'C0' | INPUT RECFM=U ? |
|  | BO | PDSERR0K | YES |
|  | TM | PSGETDCB+X'24',X'80' | INPUT RECFM=F ? |
|  | BNO | PDSERR0K | NO |
|  | OPEN | (PSPUTDCB,OUTPUT) |  |
|  | TM | PSPUTDCB+X'30',X'10' | OUTPUT OPEN OK ? |
|  | BNO | PDSERR04 | NO |
|  | MVC | PDSRECFM,PSPUTDCB+X'24' | V=X'40' or VB=X'50' or U=X'C0' |
| * |  |  |  |
|  | GET | PSGETDCB | FIRST UPLOAD RECORD |
|  | LR | 6,1 |  |
|  | CLC | =CL23'Dump of U Dataset : ',0(6) |  |
|  | BE | UPSLOAD | LOAD OF RECFM = U |
|  | CLC | =CL23'Dump of F Dataset : ',0(6) |  |
|  | BE | FPSLOAD | LOAD OF RECFM = F |
|  | CLC | =CL23'Dump of V Dataset : ',0(6) |  |
|  | BE | VPSLOAD | LOAD OF RECFM = V |
|  | CLC | =CL23'Dump of VB Dataset : ',0(6) |  |
|  | BE | VBPSLOAD | LOAD OF RECFM = VB |
|  | B | PDSERR0L |  |
| * |  |  |  |
| * |  |  |  |
| * | UPLOAD OF RECFM = V DATASET |  |  |
| VPSLOAD | DS | 0H |  |
| * | UPLOAD OF RECFM = VB DATASET |  |  |
| VBPSLOAD | DS | 0H |  |
|  | LA | 2,RETURN99 | NEW EODAD ADDRESS |
|  | STCM | 2,7,PSGETDCB+X'21' | EODAD |
|  | GET | PSGETDCB | 2ND UPLOAD RECORD |
|  | LH | 2,PSGETDCB+X'52' | IN LRECL |
|  | STH | 2,PSILRECL |  |
|  | TM | PDSRECFM,X'40' | OUTPUT RECFM=V ? |
|  | BNO | PDSERR0M | NO, RECFM NOT SUPPORTED |
| VPSLOAD2 | DS | 0H |  |
|  | L | 2,=A(THEWORK3) |  |
|  | L | 3,=A(THEWORKL) |  |
|  | SR | 0,0 |  |
|  | SR | 1,1 |  |
|  | MVCL | 2,0 | INIT WITH X'00' |
|  | GET | PSGETDCB | FIRST SECTION RECORD |
|  | LR | 6,1 |  |
|  | LH | 2,0(,6) | LENGTH OF THE OUTPUT RECORD |
|  | STH | 2,PSOLRECL | OUTPUT LENGTH |
|  | LH | 3,PSPUTDCB+X'3E' | OUTPUT BLKSIZE |
|  | CR | 2,3 |  |
|  | BH | PDSERR0A | BLOCKSIZE TOO SMALL |
|  | L | 5,=A(THEWORK3) |  |
|  | LR | 2,5 |  |
|  | LH | 3,PSILRECL | INPUT LRECL |
|  | LR | 0,6 |  |
|  | LR | 1,3 |  |
|  | MVCL | 2,0 |  |
|  | LH | 3,PSILRECL | INPUT LRECL |
|  | AR | 5,3 |  |
| VPSLOAD3 | DS | 0H |  |
|  | L | 3,=A(THEWORK3) |  |
|  | LH | 2,PSOLRECL | OUTPUT LRECL |
|  | AR | 3,2 |  |
|  | CR | 5,3 |  |
|  | BNL | VPSLOAD4 |  |
|  | GET | PSGETDCB |  |
|  | LR | 6,1 |  |
| * |  |  |  |
|  | LR | 2,5 |  |
|  | LH | 3,PSILRECL | INPUT LRECL |
|  | LR | 0,6 |  |
|  | LR | 1,3 |  |
|  | MVCL | 2,0 |  |

TABLE 1-continued

|  |  |  |  |
|---|---|---|---|
|  | LH | 3,PSILRECL | INPUT LRECL |
|  | AR | 5,3 |  |
|  | B | VPSLOAD3 |  |
| * |  |  |  |
| VPSLOAD4 | DS | 0H |  |
|  | LH | 2,PSOLRECL |  |
|  | STH | 2,PSPUTDCB+X'52' |  |
|  | PUT | PSPUTDCB,THEWORK3 |  |
|  | B | VBPSLOD2 |  |
| * |  |  |  |
| * |  |  |  |
| * |  | UPLOAD OF RECFM = U DATASET |  |
| UPSLOAD | DS | 0H |  |
|  | GET | PSGETDCB | 2ND UPLOAD RECORD |
|  | LH | 2,PSGETDCB+X'52' | IN LRECL |
|  | STH | 2,PSILRECL |  |
| * |  |  |  |
|  | TM | PSPUTDCB+X'24',X'C0' | OUTPUT RECFM=U ? |
|  | BNO | PDSERR0M | NO, RECFM NOT SUPPORTED |
|  | LH | 2,PSPUTDCB+X'3E' | OUTPUT BLKSIZE |
|  | STH | 2,PSOLRECL |  |
| * |  |  |  |
|  | CLI | PDSDMPSW,X'02' |  |
|  | BE | UPSLOADB |  |
| * |  |  |  |
| * |  |  |  |
| * |  | WHEN EACH INPUT RECORD OF U RECORD FORMAT RECORD WAS FIRST |  |
| * |  | DIVIDED INTO MORE THAN ONE RECORDS OF SAME LENGTH OF |  |
| * |  | (OUTPUT LRECL – 4) BYTES AND THEN EACH DIVIDED RECORD WAS |  |
| * |  | APPENDED AT THE FRONT WITH 4-BYTES HEADER OF 2-BYTES OF |  |
| * |  | CONTENT LENGTH IN THE DIVIDED RECORD AND 2-BYTES OF |  |
| * |  | CONTINUATION SEQUENCE NUMBER |  |
| * |  |  |  |
|  | LA | 2,UPSLOADA | NEW EODAD ADDRESS |
|  | STCM | 2,7,PSGETDCB+X'21' | EODAD |
|  | L | 5,=A(THEWORK) |  |
|  | XC | PSIRECNO,PSIRECNO |  |
| UPSLOAD4 | DS | 0H |  |
|  | L | 3,=A(THEWORK) |  |
|  | LH | 2,PSOLRECL | OUTPUT BLOCK SIZE |
|  | AR | 3,2 |  |
|  | CR | 5,3 |  |
|  | BH | PDSERR0A | OUTPUT DATASET BLOCKSIZE TOO SMALL |
|  | GET | PSGETDCB |  |
|  | LR | 6,1 |  |
|  | CLC | 2(2,6),=X'0001' | CONCATENATION COUNT |
|  | BNE | UPSLOAD5 |  |
|  | CLC | PSIRECNO,=X'0000' |  |
|  | BNE | UPSLOAD6 | FIRST OUTPUT RECORD |
| UPSLOAD5 | DS | 0H |  |
|  | MVC | PSIRECNO,2(6) |  |
|  | LH | 1,PSILRECL | INPUT LRECL |
|  | S | 1,=F'4' | HEADER LENGTH |
|  | LH | 3,0(,6) | REAL DATA LENGTH |
|  | CR | 3,1 |  |
|  | BH | PDSERR0B | INPUT UPLOAD DATASET LRECL TOO SMALL |
|  | LR | 4,5 |  |
|  | LR | 1,5 | SAVE R5 |
|  | LR | 5,3 |  |
|  | LA | 2,4(,6) |  |
|  | MVCL | 4,2 |  |
|  | LR | 5,1 | RESTORE R5 |
|  | LH | 2,0(,6) | REAL DATA LENGTH |
|  | AR | 5,2 |  |
|  | B | UPSLOAD4 |  |
| * |  |  |  |
| UPSLOAD6 | DS | 0H | FIRST OUTPUT RECORD |
|  | L | 4,=A(THEWORK) |  |
|  | SR | 5,4 | OUTPUT RECORD LENGTH |
|  | STH | 5,PSPUTDCB+X'52' | OUTPUT RECORD LENGTH |
|  | PUT | PSPUTDCB,(4) |  |
| * |  |  |  |
| UPSLOAD7 | DS | 0H |  |
|  | L | 5,=A(THEWORK) |  |
|  | LH | 1,PSILRECL |  |
|  | S | 1,=F'4' | HEADER LENGTH |
|  | LH | 3,0(,6) | REAL DATA LENGTH |
|  | CR | 3,1 |  |
|  | BH | PDSERR0B | INPUT UPLOAD DATASET LRECL TOO SMALL |
|  | LR | 4,5 |  |

TABLE 1-continued

|  |  |  |  |
|---|---|---|---|
|  | LR | 1,5 | SAVE R5 |
|  | LR | 5,3 |  |
|  | LA | 2,4(,6) |  |
|  | MVCL | 4,2 |  |
|  | LR | 5,1 | RESTORE R5 |
|  | LH | 2,0(,6) | REAL DATA LENGTH |
|  | AR | 5,2 |  |
| UPSLOAD8 | DS | 0H |  |
|  | L | 3,=A(THEWORK) |  |
|  | LH | 2,PSPUTDCB+X'3E' |  |
|  | AR | 3,2 |  |
|  | CR | 5,3 |  |
|  | BH | PDSERR0A | OUTPUT DATASET BLOCKSIZE TOO SMALL |
|  | GET | PSGETDCB |  |
|  | LR | 6,1 |  |
|  | CLC | 2(2,6),=X'0001' | CONCATENATION COUNT |
|  | BE | UPSLOAD9 |  |
|  | LH | 1,PSGETDCB+X'52' |  |
|  | S | 1,=F'4' | HEADER LENGTH |
|  | LH | 3,0(,6) | REAL DATA LENGTH |
|  | CR | 3,1 |  |
|  | BH | PDSERR0B | INPUT UPLOAD DATASET LRECL TOO SMALL |
|  | LR | 4,5 |  |
|  | LR | 1,5 | SAVE R5 |
|  | LR | 5,3 |  |
|  | LA | 2,4(,6) |  |
|  | MVCL | 4,2 |  |
|  | LR | 5,1 | RESTORE R5 |
|  | LH | 2,0(,6) | REAL DATA LENGTH |
|  | AR | 5,2 |  |
|  | B | UPSLOAD8 |  |
| * |  |  |  |
| UPSLOAD9 | DS | 0H |  |
|  | L | 4,=A(THEWORK) |  |
|  | SR | 5,4 |  |
|  | STH | 5,PSPUTDCB+X'52' | OUTPUT RECORD SIZE |
|  | PUT | PSPUTDCB,(4) |  |
|  | B | UPSLOAD7 |  |
| * |  |  |  |
| UPSLOADA | DS | 0H |  |
|  | L | 4,=A(THEWORK) |  |
|  | SR | 5,4 |  |
|  | LTR | 5,5 |  |
|  | BZ | RETURN99 |  |
|  | STH | 5,PSPUTDCB+X'52' | OUTPUT RECORD SIZE |
|  | PUT | PSPUTDCB,(4) |  |
|  | B | RETURN99 |  |
| * |  |  |  |
| * | WHEN 4-BYTES HEADER, WITH 2-BYTES OF RECODE LENGTH OF |  |  |
| * | INPUT U RECORD FORMAT RECORD AND 2 NULL BYTES, WAS FIRST |  |  |
| * | APPENDED AT THE BEGINING OF EACH INPUT LOAD LIBRARY RECORD |  |  |
| * | AND THEN IT WAS DIVIDED INTO MORE THAN ONE OUTPUT RECORDS |  |  |
| * | OF SAME LENGTH |  |  |
| * |  |  |  |
| UPSLOADB | DS | 0H |  |
|  | LA | 2,UPSLOADF | NEW EODAD ADDRESS |
|  | STCM | 2,7,PSGETDCB+X'21' | EODAD |
| UPSLOADC | DS | 0H |  |
|  | GET | PSGETDCB | FIRST UPLOAD RECORD OF EACH OUTPUT |
|  | LR | 6,1 |  |
|  | LH | 2,0(,6) | LENGTH OF OUTPUT RECORD |
|  | STH | 2,LTHEWORK |  |
|  | LH | 3,PSOLRECL | OUTPUT DATASET BLKSIZE |
|  | CR | 2,3 |  |
|  | BH | PDSERR0A | OUTPUT DATASET BLOCKSIZE TOO SMALL |
|  | LH | 4,PSILRECL | INPUT UPLOAD RECORD LRECL |
|  | S | 4,=F'4' | HEADER LENGTH |
|  | LR | 1,4 |  |
|  | LR | 3,4 |  |
|  | LA | 2,4(,6) | AFTER 4-BYTES HEADER |
|  | L | 0,=A(THEWORK) |  |
|  | MVCL | 0,2 |  |
|  | L | 2,=A(THEWORK) |  |
|  | AR | 2,4 |  |
|  | ST | 2,ATHEWORK |  |
| UPSLOADD | DS | 0H |  |
|  | L | 2,ATHEWORK |  |
|  | L | 3,=A(THEWORK) |  |
|  | SR | 2,3 |  |

TABLE 1-continued

|  |  |  |  |
|---|---|---|---|
|  | LH | 3,LTHEWORK |  |
|  | CR | 2,3 |  |
|  | BNL | UPSLOADE |  |
|  | GET | PSGETDCB |  |
|  | LR | 6,1 |  |
|  | LH | 3,PSILRECL | INPUT UPLOAD RECORD LRECL |
|  | L | 4,ATHEWORK |  |
|  | LR | 1,4 |  |
|  | AR | 1,3 |  |
|  | ST | 1,ATHEWORK |  |
|  | LR | 5,3 |  |
|  | LR | 2,6 |  |
|  | MVCL | 4,2 |  |
|  | B | UPSLOADD |  |
| * |  |  |  |
| UPSLOADE | DS | 0H |  |
|  | L | 4,=A(THEWORK) |  |
|  | LH | 5,LTHEWORK |  |
|  | STH | 5,PSPUTDCB+X'52' | OUTPUT RECORD LENGTH |
|  | PUT | PSPUTDCB,(4) |  |
|  | B | UPSLOADC |  |
| * |  |  |  |
| UPSLOADF | DS | 0H |  |
|  | B | RETURN99 |  |
| * |  |  |  |
| * |  |  |  |
| * | UPLOAD OF RECFM = F DATASET |  |  |
| FPSLOAD | DS | 0H |  |
|  | GET | PSGETDCB | 2ND UPLOAD RECORD |
|  | LH | 2,PSGETDCB+X'52' | IN LRECL |
|  | STH | 2,PSILRECL |  |
| * |  |  |  |
|  | TM | PSPUTDCB+X'24',X'C0' | OUTPUT RECFM=U ? |
|  | BO | PDSERR0M | YES, RECFM NOT SUPPORTED |
|  | TM | PSPUTDCB+X'24',X'80' | OUTPUT RECFM=F ? |
|  | BNO | PDSERR0M | NO, RECFM NOT SUPPORTED |
|  | LH | 2,PSPUTDCB+X'52' | OUTPUT LRECL |
|  | STH | 2,PSOLRECL |  |
| * |  |  |  |
|  | CLI | PDSDMPSW,X'02' |  |
|  | BE | FPSLOADB |  |
| * |  |  |  |
| * |  |  |  |
| * | WHEN EACH INPUT RECORD OF U RECORD FORMAT RECORD WAS FIRST |  |  |
| * | DIVIDED INTO MORE THAN ONE RECORDS OF SAME LENGTH OF |  |  |
| * | (OUTPUT LRECL − 4) BYTES AND THEN EACH DIVIDED RECORD WAS |  |  |
| * | APPENDED AT THE FRONT WITH 4-BYTES HEADER OF 2-BYTES OF |  |  |
| * | CONTENT LENGTH IN THE DIVIDED RECORD AND 2-BYTES OF |  |  |
| * | CONTINUATION SEQUENCE NUMBER |  |  |
| * |  |  |  |
|  | LA | 2,FPSLOADA | NEW EODAD ADDRESS |
|  | STCM | 2,7,PSGETDCB+X'21' | EODAD |
|  | L | 5,=A(THEWORK) |  |
|  | XC | PSIRECNO,PSIRECNO |  |
| FPSLOAD4 | DS | 0H |  |
|  | L | 3,=A(THEWORK) |  |
|  | LH | 2,PSOLRECL | OUTPUT LRECL |
|  | AR | 3,2 |  |
|  | CR | 5,3 |  |
|  | BH | PDSERR0O | OUTPUT DATASET LRECL TOO SMALL |
|  | GET | PSGETDCB |  |
|  | LR | 6,1 |  |
|  | CLC | 2(2,6),=X'0001' | CONCATENATION COUNT |
|  | BNE | FPSLOAD5 |  |
|  | CLC | PSIRECNO,=X'0000' |  |
|  | BNE | FPSLOAD6 | FIRST OUTPUT RECORD |
| FPSLOAD5 | DS | 0H |  |
|  | MVC | PSIRECNO,2(6) |  |
|  | LH | 1,PSILRECL | INPUT LRECL |
|  | S | 1,=F'4' | HEADER LENGTH |
|  | LH | 3,0(,6) | REAL DATA LENGTH |
|  | CR | 3,1 |  |
|  | BH | PDSERR0B | INPUT UPLOAD DATASET LRECL TOO SMALL |
|  | LR | 4,5 |  |
|  | LR | 1,5 | SAVE R5 |
|  | LR | 5,3 |  |
|  | LA | 2,4(,6) |  |
|  | MVCL | 4,2 |  |
|  | LR | 5,1 | RESTORE R5 |
|  | LH | 2,0(,6) | REAL DATA LENGTH |

TABLE 1-continued

|            | AR    | 5,2             |                                      |
|------------|-------|-----------------|--------------------------------------|
|            | B     | FPSLOAD4        |                                      |
| *          |       |                 |                                      |
| FPSLOAD6   | DS    | 0H              | FIRST OUTPUT RECORD                  |
|            | L     | 4,=A(THEWORK)   |                                      |
|            | SR    | 5,4             | OUTPUT RECORD LENGTH                 |
|            | LH    | 2,PSPUTDCB+X'52'| OUTPUT RECORD LENGTH                 |
|            | CR    | 5,2             |                                      |
|            | PUT   | PSPUTDCB,(4)    |                                      |
| *          |       |                 |                                      |
| FPSLOAD7   | DS    | 0H              |                                      |
|            | L     | 5,=A(THEWORK)   |                                      |
|            | LH    | 1,PSILRECL      |                                      |
|            | S     | 1,=F'4'         | HEADER LENGTH                        |
|            | LH    | 3,0(,6)         | REAL DATA LENGTH                     |
|            | CR    | 3,1             |                                      |
|            | BH    | PDSERR0B        | INPUT UPLOAD DATASET LRECL TOO SMALL |
|            | LR    | 4,5             |                                      |
|            | LR    | 1,5             | SAVE R5                              |
|            | LR    | 5,3             |                                      |
|            | LA    | 2,4(,6)         |                                      |
|            | MVCL  | 4,2             |                                      |
|            | LR    | 5,1             | RESTORE R5                           |
|            | LH    | 2,0(,6)         | REAL DATA LENGTH                     |
|            | AR    | 5,2             |                                      |
| FPSLOAD8   | DS    | 0H              |                                      |
|            | L     | 3,=A(THEWORK)   |                                      |
|            | LH    | 2,PSOLRECL      |                                      |
|            | AR    | 3,2             |                                      |
|            | CR    | 5,3             |                                      |
|            | BH    | PDSERR0O        | OUTPUT DATASET LRECL TOO SMALL       |
|            | GET   | PSGETDCB        |                                      |
|            | LR    | 6,1             |                                      |
|            | CLC   | 2(2,6),=X'0001' | CONCATENATION COUNT                  |
|            | BE    | FPSLOAD9        |                                      |
|            | LH    | 1,PSILRECL      |                                      |
|            | S     | 1,=F'4'         | HEADER LENGTH                        |
|            | LH    | 3,0(,6)         | REAL DATA LENGTH                     |
|            | CR    | 3,1             |                                      |
|            | BH    | PDSERR0B        | INPUT UPLOAD DATASET LRECL TOO SMALL |
|            | LR    | 4,5             |                                      |
|            | LR    | 1,5             | SAVE R5                              |
|            | LR    | 5,3             |                                      |
|            | LA    | 2,4(,6)         |                                      |
|            | MVCL  | 4,2             |                                      |
|            | LR    | 5,1             | RESTORE R5                           |
|            | LH    | 2,0(,6)         | REAL DATA LENGTH                     |
|            | AR    | 5,2             |                                      |
|            | B     | FPSLOAD8        |                                      |
| *          |       |                 |                                      |
| FPSLOAD9   | DS    | 0H              |                                      |
|            | L     | 4,=A(THEWORK)   |                                      |
|            | SR    | 5,4             |                                      |
|            | LH    | 2,PSPUTDCB+X'52'| OUTPUT RECORD SIZE                   |
|            | PUT   | PSPUTDCB,(4)    |                                      |
|            | B     | FPSLOAD7        |                                      |
| *          |       |                 |                                      |
| FPSLOADA   | DS    | 0H              |                                      |
|            | L     | 4,=A(THEWORK)   |                                      |
|            | SR    | 5,4             |                                      |
|            | LTR   | 5,5             |                                      |
|            | BZ    | RETURN99        |                                      |
|            | LH    | 2,PSPUTDCB+X'52'| OUTPUT RECORD SIZE                   |
|            | PUT   | PSPUTDCB,(4)    |                                      |
|            | B     | RETURN99        |                                      |
| *          |       |                 |                                      |
| *          | WHEN 4-BYTES HEADER, WITH 2-BYTES OF RECODE LENGTH OF       |
| *          | INPUT U RECORD FORMAT RECORD AND 2 NULL BYTES, WAS FIRST    |
| *          | APPENDED AT THE BEGINING OF EACH INPUT LOAD LIBRARY RECORD  |
| *          | AND THEN IT WAS DIVIDED INTO MORE THAN ONE OUTPUT RECORDS   |
| *          | OF SAME LENGTH                                              |
| *          |       |                 |                                      |
| FPSLOADB   | DS    | 0H              |                                      |
|            | LA    | 2,FPSLOADF      | NEW EODAD ADDRESS                    |
|            | STCM  | 2,7,PSGETDCB+X'21'| EODAD                              |
| FPSLOADC   | DS    | 0H              |                                      |
|            | GET   | PSGETDCB        | FIRST UPLOAD RECORD OF EACH OUTPUT   |
|            | LR    | 6,1             |                                      |
|            | LH    | 2,0(,6)         | LENGTH OF OUTPUT RECORD              |

TABLE 1-continued

|  |  |  |  |
|---|---|---|---|
|  | STH | 2,LTHEWORK |  |
|  | LH | 3,PSOLRECL | OUTPUT DATASET BLKSIZE |
|  | CR | 2,3 |  |
|  | BH | PDSERR0O | OUTPUT DATASET LRECL TOO SMALL |
|  | LH | 4,PSILRECL | INPUT UPLOAD RECORD LRECL |
|  | S | 4,=F'4' | HEADER LENGTH |
|  | LR | 1,4 |  |
|  | LR | 3,4 |  |
|  | LA | 2,4(,6) | AFTER 4-BYTES HEADER |
|  | L | 0,=A(THEWORK) |  |
|  | MVCL | 0,2 |  |
|  | L | 2,=A(THEWORK) |  |
|  | AR | 2,4 |  |
|  | ST | 2,ATHEWORK |  |
| FPSLOADD | DS | 0H |  |
|  | L | 2,ATHEWORK |  |
|  | L | 3,=A(THEWORK) |  |
|  | SR | 2,3 |  |
|  | LH | 3,LTHEWORK |  |
|  | CR | 2,3 |  |
|  | BNL | FPSLOADE |  |
|  | GET | PSGETDCB |  |
|  | LR | 6,1 |  |
|  | LH | 3,PSILRECL | INPUT UPLOAD RECORD LRECL |
|  | L | 4,ATHEWORK |  |
|  | LR | 1,4 |  |
|  | AR | 1,3 |  |
|  | ST | 1,ATHEWORK |  |
|  | LR | 5,3 |  |
|  | LR | 2,6 |  |
|  | MVCL | 4,2 |  |
|  | B | FPSLOADD |  |
| * |  |  |  |
| FPSLOADE | DS | 0H |  |
|  | L | 4,=A(THEWORK) |  |
|  | LH | 5,LTHEWORK |  |
|  | LH | 2,PSPUTDCB+X'52' |  |
|  | PUT | PSPUTDCB,(4) | OUTPUT RECORD LENGTH |
|  | B | FPSLOADC |  |
| * |  |  |  |
| FPSLOADF | DS | 0H |  |
|  | B | RETURN99 |  |
| *<br>*<br>* |  |  |  |
| PDSDUMP | DS | 0H |  |
| * | STM | 0,15,PDSRSAVE |  |
|  | OPEN | PDSRDCB1 |  |
|  | TM | PDSRDCB1+X'30',X'10' |  |
|  | BNO | PDSERR02 |  |
|  | TM | PDSRDCB1+X'1A',X'02' | PDS ? |
|  | BNO | PDSERR0C | NOT A PDS |
|  | TM | PDSRDCB1+X'24',X'80' | RECFM=F or FB or U ? |
|  | BNO | PDSERR09 | NO, RECFM NOT SUPPORTED |
|  | MVC | PDSRECFM,PDSRDCB1+X'24' | F=X'80' or FB=X'90' or U=X'C0' |
|  | LH | 2,PDSRDCB1+X'3E' | MAX BLOCK SIZE |
|  | STH | 2,PDSBLKSZ |  |
|  | LH | 2,PDSRDCB1+X'52' | LRECL |
|  | STH | 2,PDSLRECL |  |
|  | CLOSE | PDSRDCB1 |  |
| * |  |  |  |
|  | LH | 2,TEXTLEN |  |
|  | LTR | 2,2 | ANY MEMBER ENTERED ? |
|  | BNZ | PDSDUMPA | YES. MEMBER NAME ENTERED. |
| * | ALL MEMBERS WILL BE DUMPED. |  |  |
|  | OPEN | PDSRBDCB |  |
|  | TM | PDSRBDCB+X'30',X'10' |  |
|  | BNO | PDSERR01 |  |
|  | LA | 2,PDSDUMP4 |  |
|  | STCM | 2,7,PDSRBDCB+X'21' | EODAD |
| * |  |  |  |
|  | L | 2,=A(THEWORK) | INIT THEWORK WITH X'00' |
|  | L | 3,=A(THEWORKL+8) | BLOCK SIZE |
|  | SR | 0,0 | INIT WITH X'00' |
|  | SR | 1,1 |  |
|  | MVCL | 2,0 |  |
| * |  |  |  |
|  | L | 6,=A(THEWORK2) |  |

TABLE 1-continued

| | | | | |
|---|---|---|---|---|
| PDSDUMP1 | DS | 0H | | |
| | L | 3,=A(THEWORK) | | |
| | READ | PDSDDEC1,SF,PDSRBDCB,(3),'S',MF=E | | |
| | CHECK | PDSDDEC1 | | |
| | L | 5,PDSDDEC1+12 | RECORD AREA ADDRESS FROM DECB | |
| * | | | | |
| | LH | 4,0(,5) | TEXT LENGTH IN THE INDEX RECORD BLOCK | |
| | AR | 4,5 | THE END OF RECORD IN THE BLOCK | |
| | LA | 5,2(,5) | AFTER 2-BYTES LENGTH FIELD | |
| PDSDUMP2 | DS | 0H | | |
| | CR | 5,4 | THE END OF TEXT IN THE BLOCK ? | |
| | BNL | PDSDUMP1 | YES | |
| | CLC | 0(8,5),=8X'FF' | THE END OF MEMBER LIST ? | |
| | BE | PDSDUMP4 | YES | |
| | MVC | 0(8,6),0(5) | MEMBER NAME | |
| * | | | | |
| | MVC | PDSDIREL(PDSSTOWE-PDSDIREL),0(5) | 40 BYTES | |
| | MVI | PDSDIRVS,C' ' | | |
| | MVC | PDSDIRVS+1(PDSDIRNE-PDSDIRVS-1),PDSDIRVS | | |
| | SR | 2,2 | | |
| | IC | 2,PDSSEG# | # OF 2-BYTES FOLLOWING | |
| | SLL | 2,28 | | |
| | SRL | 2,27 | MULTIPLY BY 2 | |
| | LA | 5,12(2,5) | NEXT ENTRY LOCATION | |
| | CLI | PDSRECFM,X'C0' | RECFM= U ? | |
| | BNE | PDSDMP22 | NO, TEXT LIBRARY | |
| * | LOAD MODULE LIBRARY | | | |
| | MVC | 8(PDSSTOWE-PDSSEG#,6),PDSSEG# | 29 BYTES | |
| | LA | 6,8+PDSSTOWE-PDSSEG#(,6) | 37 BYTES ENTRY | |
| | B | PDSDUMP2 | | |
| PDSDMP22 | DS | 0H | TEXT LIBRARY | |
| | LTR | 2,2 | | |
| | BZ | PDSDUMP3 | | |
| | LA | 1,PDSCRTDT+1 | X'0095013F' | 95/01/13 |
| | BAL | 14,EDITDATE | R1 —> YYDDDMMDD | |
| | MVC | PDSDIRCR(2),0(1) | YY | |
| | MVI | PDSDIRCR+2,C'/' | | |
| | MVC | PDSDIRCR+3(2),5(1) | MM | |
| | MVI | PDSDIRCR+5,C'/' | | |
| | MVC | PDSDIRCR+6(2),7(1) | DD | |
| | LA | 1,PDSUPDDT+1 | X'0095013F' | 95/01/13 |
| | BAL | 14,EDITDATE | R1 —> YYDDDMMDD | |
| | MVC | PDSDIRUP(2),0(1) | YY | |
| | MVI | PDSDIRUP+2,C'/' | | |
| | MVC | PDSDIRUP+3(2),5(1) | MM | |
| | MVI | PDSDIRUP+5,C'/' | | |
| | MVC | PDSDIRUP+6(2),7(1) | DD | |
| | SR | 2,2 | | |
| | SR | 3,3 | | |
| | IC | 3,PDSUPDTM | | |
| | SLDL | 2,28 | | |
| | SRL | 3,28 | | |
| | STC | 2,PDSDIRTM | | |
| | STC | 3,PDSDIRTM+1 | | |
| | OC | PDSDIRTM(2),=X'F0F0' | | |
| | MVI | PDSDIRTM+2,C':' | | |
| | SR | 2,2 | | |
| | SR | 3,3 | | |
| | IC | 3,PDSUPDTM+1 | | |
| | SLDL | 2,28 | | |
| | SRL | 3,28 | | |
| | STC | 2,PDSDIRTM+3 | | |
| | STC | 3,PDSDIRTM+4 | | |
| | OC | PDSDIRTM+3(2),=X'F0F0' | | |
| | SR | 2,2 | | |
| | IC | 2,PDSVERSN | X'0163' | 01.99 |
| | CVD | 2,PDSWRKDW | | |
| | UNPK | PDSWRKWD,PDSWRKDW+6(2) | | |
| | OI | PDSWRKWD+7,X'F0' | | |
| | MVC | PDSDIRVS(2),PDSWRKWD+6 | | |
| | MVI | PDSDIRVS+2,C'.' | | |
| | SR | 2,2 | | |
| | IC | 2,PDSVERSN+1 | X'0163' | 01.99 |
| | CVD | 2,PDSWRKDW | | |
| | UNPK | PDSWRKWD,PDSWRKDW+6(2) | | |
| | OI | PDSWRKWD+7,X'F0' | | |
| | MVC | PDSDIRVS+3(2),PDSWRKWD+6 | | |
| * | | | | |
| | LH | 2,PDSLINE# | X'0276' | 630 |

TABLE 1-continued

|  |  |  |  |
|---|---|---|---|
|  | CVD | 2,PDSWRKDW |  |
|  | UNPK | PDSWRKWD,PDSWRKDW+4(4) |  |
|  | OI | PDSWRKWD+7,X'F0' |  |
|  | MVC | PDSDIRL#,PDSWRKWD+3 |  |
|  | LH | 2,PDSINIT#    X'000A' | 10 |
|  | CVD | 2,PDSWRKDW |  |
|  | UNPK | PDSWRKWD,PDSWRKDW+4(4) |  |
|  | OI | PDSWRKWD+7,X'F0' |  |
|  | MVC | PDSDIR0#,PDSWRKWD+3 |  |
|  | MVC | PDSDIRUS,PDSUPDNM | TSO USER ID |
| PDSDUMP3 | DS | 0H |  |
|  | MVC | 8(PDSDIRNE-PDSDIRVS,6),PDSDIRVS |  |
|  | LA | 6,8+PDSDIRNE-PDSDIRVS(,6) | 64 BYTES ENTRY |
|  | B | PDSDUMP2 |  |
| * |  |  |  |
|  | READ | PDSDDEC1,SF,PDSRBDCB,THEWORK,'S',MF=L |  |
| * |  |  |  |
| PDSDUMP4 | DS | 0H |  |
|  | MVC | 0(8,6),=8X'FF' | THE END MARK |
|  | CLOSE | PDSRBDCB |  |
|  | B | PDSDUMPM |  |
| * |  |  |  |
| * |  |  |  |
| PDSDUMPA | DS | 0H |  |
|  | L | 5,=A(THEWORK2) |  |
|  | L | 6,TEXTLOC |  |
| PDSDUMPB | DS | 0H |  |
|  | L | 3,TEXTLOC |  |
|  | LH | 2,TEXTLEN |  |
|  | AR | 3,2 |  |
|  | CR | 6,3 |  |
|  | BNL | PDSDUMPG |  |
|  | OPEN | PDSRBDCB |  |
|  | TM | PDSRBDCB+X'30',X'10' |  |
|  | BNO | PDSERR01 |  |
|  | LA | 2,PDSERR05 | SUCH MEMBER NOT FOUND IN THIS PDS |
|  | STCM | 2,7,PDSRBDCB+X'21' | EODAD |
| * |  |  |  |
| PDSDUMPC | DS | 0H |  |
|  | L | 3,=A(THEWORK) |  |
|  | READ | PDSDDEC3,SF,PDSRBDCB,(3),'S',MF=E |  |
|  | CHECK | PDSDDEC3 |  |
|  | L | 4,PDSDDEC3+12 | RECORD AREA ADDRESS FROM DECB |
| * |  |  |  |
|  | LH | 3,0(,4) | TEXT LENGTH IN THE BLOCK |
|  | AR | 3,4 | THE END OF RECORD IN THE BLOCK |
|  | LA | 4,2(,4) | AFTER 2-BYTES LENGTH FIELD |
| PDSDUMPD | DS | 0H |  |
|  | CR | 4,3 | THE END OF TEXT IN THE BLOCK ? |
|  | BNL | PDSDUMPC | YES |
|  | CLC | 0(8,4),=8X'FF' | THE END OF MEMBER LIST ? |
|  | BE | PDSERR05 | YES. NO SUCH MEMBER IN THIS PDS |
|  | CLC | 0(8,4),0(6) | SAME MEMBER NAME ? |
|  | BE | PDSDUMPE | YES |
|  | SR | 2,2 |  |
|  | IC | 2,11(,4) | # OF 2-BYTES FOLLOWING |
|  | SLL | 2,28 |  |
|  | SRL | 2,27 | MULTIPLY BY 2 |
|  | LA | 4,12(2,4) | NEXT ENTRY LOCATION |
|  | B | PDSDUMPD |  |
| * |  |  |  |
| PDSDUMPE | DS | 0H |  |
|  | LA | 6,8(,6) | NEXT MEMBER IN TEXTLOC |
|  | MVC | 0(8,5),0(4) | MEMBER NAME |
| * |  |  |  |
|  | MVC | PDSDIREL(PDSSTOWE-PDSDIREL),0(4) MAXIMUM 40 BYTES |  |
|  | MVI | PDSDIRVS,C' ' |  |
|  | MVC | PDSDIRVS+1(PDSDIRNE-PDSDIRVS-1),PDSDIRVS |  |
|  | SR | 2,2 |  |
|  | IC | 2,PDSSEG# | # OF 2-BYTES FOLLOWING |
|  | SLL | 2,28 |  |
|  | SRL | 2,27 | MULTIPLY BY 2 |
|  | LA | 4,12(2,4) | NEXT ENTRY LOCATION |
|  | CLI | PDSRECFM,X'C0' | RECFM= U ? |
|  | BNE | PDSDMPE2 | NO, TEXT LIBRARY |
| * | LOAD MODULE LIBRARY |  |  |
|  | MVC | 8(PDSSTOWE-PDSSEG#,5),PDSSEG# |  |
|  | LA | 5,8+PDSSTOWE-PDSSEG#(,5) |  |
|  | CLOSE | PDSRBDCB |  |

TABLE 1-continued

|  |  |  |  |  |
|---|---|---|---|---|
|  | B | PDSDUMPB |  |  |
| PDSDMPE2 | DS | 0H |  | TEXT LIBRARY |
|  | LTR | 2,2 |  |  |
|  | BZ | PDSDUMPF |  |  |
|  | LA | 1,PDSCRTDT+1 | X'0095013F' | 95/01/13 |
|  | BAL | 14,EDITDATE |  | R1 —> YYDDDMMDD |
|  | MVC | PDSDIRCR(2),0(1) | YY |  |
|  | MVI | PDSDIRCR+2,C'/' |  |  |
|  | MVC | PDSDIRCR+3(2),5(1) | MM |  |
|  | MVI | PDSDIRCR+5,C'/' |  |  |
|  | MVC | PDSDIRCR+6(2),7(1) | DD |  |
|  | LA | 1,PDSUPDDT+1 | X'0095013F' | 95/01/13 |
|  | BAL | 14,EDITDATE |  | R1 —> YYDDDMMDD |
|  | MVC | PDSDIRUP(2),0(1) | YY |  |
|  | MVI | PDSDIRUP+2,C'/' |  |  |
|  | MVC | PDSDIRUP+3(2),5(1) | MM |  |
|  | MVI | PDSDIRUP+5,C'/' |  |  |
|  | MVC | PDSDIRUP+6(2),7(1) | DD |  |
|  | SR | 2,2 |  |  |
|  | SR | 3,3 |  |  |
|  | IC | 3,PDSUPDTM |  |  |
|  | SLDL | 2,28 |  |  |
|  | SRL | 3,28 |  |  |
|  | STC | 2,PDSDIRTM |  |  |
|  | STC | 3,PDSDIRTM+1 |  |  |
|  | OC | PDSDIRTM(2),=X'F0F0' |  |  |
|  | MVI | PDSDIRTM+2,C':' |  |  |
|  | SR | 2,2 |  |  |
|  | SR | 3,3 |  |  |
|  | IC | 3,PDSUPDTM+1 |  |  |
|  | SLDL | 2,28 |  |  |
|  | SRL | 3,28 |  |  |
|  | STC | 2,PDSDIRTM+3 |  |  |
|  | STC | 3,PDSDIRTM+4 |  |  |
|  | OC | PDSDIRTM+3(2),=X'F0F0' |  |  |
|  | SR | 2,2 |  |  |
|  | IC | 2,PDSVERSN | X'0163' | 01.99 |
|  | CVD | 2,PDSWRKDW |  |  |
|  | UNPK | PDSWRKWD,PDSWRKDW+6(2) |  |  |
|  | OI | PDSWRKWD+7,X'F0' |  |  |
|  | MVC | PDSDIRVS(2),PDSWRKWD+6 |  |  |
|  | MVI | PDSDIRVS+2,C'.' |  |  |
|  | SR | 2,2 |  |  |
|  | IC | 2,PDSVERSN+1 | X'0163' | 01.99 |
|  | CVD | 2,PDSWRKDW |  |  |
|  | UNPK | PDSWRKWD,PDSWRKDW+6(2) |  |  |
|  | OI | PDSWRKWD+7,X'F0' |  |  |
|  | MVC | PDSDIRVS+3(2),PDSWRKWD+6 |  |  |
| * |  |  |  |  |
|  | LH | 2,PDSLINE# | X'0276' | 630 |
|  | CVD | 2,PDSWRKDW |  |  |
|  | UNPK | PDSWRKWD,PDSWRKDW+4(4) |  |  |
|  | OI | PDSWRKWD+7,X'F0' |  |  |
|  | MVC | PDSDIRL#,PDSWRKWD+3 |  |  |
|  | LH | 2,PDSINIT# | X'000A' | 10 |
|  | CVD | 2,PDSWRKDW |  |  |
|  | UNPK | PDSWRKWD,PDSWRKDW+4(4) |  |  |
|  | OI | PDSWRKWD+7,X'F0' |  |  |
|  | MVC | PDSDIR0#,PDSWRKWD+3 |  |  |
|  | MVC | PDSDIRUS,PDSUPDNM |  | TSO USER ID |
| PDSDUMPF | DS | 0H |  |  |
|  | MVC | 8(PDSDIRNE−PDSDIRVS,5),PDSDIRVS |  |  |
|  | LA | 5,8+PDSDIRNE−PDSDIRVS(,5) |  |  |
|  | CLOSE | PDSRBDCB |  |  |
|  | B | PDSDUMPB |  |  |
| * |  |  |  |  |
|  | READ | PDSDDEC3,SF,PDSRBDCB,THEWORK,'S',MF=L |  |  |
| * |  |  |  |  |
| PDSDUMPG | DS | 0H |  |  |
|  | MVC | 0(8,5),=8X'FF' |  | THE END MARK |
|  | B | PDSDUMPM |  |  |
| * |  |  |  |  |
| * |  |  |  |  |
| PDSDUMPM | DS | 0H |  |  |
|  | OPEN | (PSPUTDCB,OUTPUT) |  |  |
|  | TM | PSPUTDCB+X'30',X'10' |  |  |
|  | BNO | PDSERR04 |  |  |
|  | LH | 2,PSPUTDCB+X'52' |  | LRECL OF OUTPUT FILE |
|  | STH | 2,PSOLRECL |  |  |

TABLE 1-continued

|  |  |  |  |
|---|---|---|---|
|  | MVC | PDSOUTWK(23),=CL23'Dump of TEXT Library : ' |  |
|  | CLI | PDSRECFM,X'C0' | RECFM=U ? |
|  | BNE | PDSDMPM2 | NO, TEXT LIBRARY |
|  | MVC | PDSOUTWK(23),=CL23'Dump of LOAD Library : ' |  |
| PDSDMPM2 | DS | 0H |  |
|  | RDJFCB | JFCBDCB |  |
|  | MVC | PDSOUTWK+23(44),JFCBAREA | DSNAME |
|  | TIME | DEC |  |
|  | STCM | 1,15,PDSWRKDW | X'00YYDDDF' |
|  | STCM | 0,12,PDSWRKDW+4 | X'HHMM' |
|  | LA | 1,PDSWRKDW+1 | X'0095013F'  95/01/13 |
|  | BAL | 14,EDITDATE | R1 —> YYDDDMMDD |
|  | MVC | PDSOUTWK+68(2),5(1) | MM |
|  | MVI | PDSOUTWK+70,C'/' |  |
|  | MVC | PDSOUTWK+71(2),7(1) | DD |
|  | MVI | PDSOUTWK+73,C'/' |  |
|  | MVC | PDSOUTWK+74(2),0(1) | YY |
|  | PUT | PSPUTDCB,PDSOUTWK |  |
|  | CLI | PDSRECFM,X'C0' | RECFM=U ? |
|  | BE | PDSDMPM3 | LOAD LIBRARY |
|  | MVI | PDSOUTWK,C'*' |  |
|  | MVC | PDSOUTWK+1(79),PDSOUTWK |  |
|  | PUT | PSPUTDCB,PDSOUTWK |  |
| PDSDMPM3 | DS | 0H |  |
|  | OPEN | PDSRDCB1 |  |
|  | TM | PDSRDCB1+X'30',X'10' |  |
|  | BNO | PDSERR02 |  |
| * |  |  |  |
| * |  |  |  |
|  | LA | 2,PDSDUMPQ | WHEN EACH INPUT LOAD LIBRARY RECORD IS |
| * |  |  | DIVIDED AT THE SAME LENGTH OF |
| * |  |  | (OUTPUT LRECL – 4) BYTES AND THEN |
| * |  |  | EACH DIVIDED RECORD IS APPENDED WITH |
| * |  |  | 4-BYTES HEADER OF 2-BYTES OF CONTENT |
| * |  |  | LENGTH AND 2-BYTES OF CONTINUATION |
| * |  |  | SEQUENCE NUMBER |
|  | CLI | PDSDMPSW,X'01' |  |
|  | BE | PDSDMPM4 |  |
| * | LA | 2,PDSDUMPU | WHEN 4-BYTES HEADER, WITH 2-BYTES OF |
| * |  |  | INPUT LOAD LIBRARY RECORD LENGTH AND |
| * |  |  | AND 2 NULL BYTES, IS APPENDED AT THE |
| * |  |  | BEGINING OF EACH INPUT LOAD LIBRARY |
| * |  |  | RECORD FIRST AND THEN IT IS DIVIDED |
| * |  |  | INTO THE OUTPUT RECORDS OF SAME LENGTH |
| * |  |  |  |
| PDSDMPM4 | DS | 0H |  |
|  | STCM | 2,7,PDSRDCB1+X'21' | EODAD |
| * |  |  |  |
| * |  |  |  |
|  | L | 6,=A(THEWORK2) |  |
| PDSDUMPN | DS | 0H |  |
|  | CLC | 0(8,6),=8X'FF' |  |
|  | BE | PDSDUMPR |  |
|  | MVI | PDSOUTWK,C' ' |  |
|  | MVC | PDSOUTWK+1(L'PDSOUTWK-1),PDSOUTWK |  |
|  | MVC | PDSOUTWK(12),=C'@@@@****%%%%' | MEMBER NAME RECORD MARK |
|  | MVC | PDSOUTWK+12(8),0(6) | MEMBER NAME |
|  | MVC | PDSOUTWK+4+PDSDIRNE-PDSDIRVS+4(12),=CL12'DON''T CHANGE' |  |
|  | PUT | PSPUTDCB,PDSOUTWK | WRITE MEMBER NAME MARK |
|  | MVC | PDSOUTWK(4),=C';;;;' |  |
|  | CLI | PDSRECFM,X'C0' | RECFM=U ? |
|  | BE | PDSDMPN2 | YES, LOAD LIBRARY |
|  | MVC | PDSOUTWK+4(PDSDIRNE-PDSDIRVS),8(6) |  |
|  | MVC | PDSOUTWK+4+PDSDIRNE-PDSDIRVS+4(12),=CL12'DON''T CHANGE' |  |
|  | MVC | PDSBLDL1,0(6) | MEMBER NAME |
|  | LA | 6,8+PDSDIRNE-PDSDIRVS(,6) | NEXT MEMBER LOCATION |
|  | B | PDSDMPN3 |  |
| PDSDMPN2 | DS | 0H |  |
|  | MVI | PDSOUTWK+4,X'00' |  |
|  | MVC | PDSOUTWK+5(75),PDSOUTWK+4 |  |
|  | MVC | PDSOUTWK+4(PDSSTOWE-PDSSEG#),8(6) |  |
|  | MVC | PDSBLDL1,0(6) | MEMBER NAME |
|  | LA | 6,8+PDSSTOWE-PDSSEG#(,6) | NEXT MEMBER LOCATION |
| PDSDMPN3 | DS | 0H |  |
|  | PUT | PSPUTDCB,PDSOUTWK | MEMBER DIRECTORY INFO |
|  | LA | 1,1 | 1 MEMBER |
|  | STH | 1,PDSBLDLN | SAVE # OF MEMBERS |
|  | BLDL | PDSRDCB1,PDSBLDLL |  |
| * |  |  |  |

TABLE 1-continued

|  | LA | 5,PDSBLDLT | LOCATION OF TTR |
|  | FIND | PDSRDCB1,(5),C | POSITION AT THE FIRST BLOCK |

```
                LA      5,PDSBLDLT              LOCATION OF TTR
                FIND    PDSRDCB1,(5),C          POSITION AT THE FIRST BLOCK
*
*
*
                CLI     PDSDMPSW,X'02'
                BE      PDSDUMPS
*
*
*
*               WHEN EACH INPUT LOAD LIBRARY RECORD IS FIRST DIVIDED INTO
*               RECORDS OF SAME LENGTH OF (OUTPUT LRECL - 4) BYTES AND THEN
*               EACH DIVIDED RECORD IS APPENDED AT THE FRONT WITH 4-BYTES
*               HEADER OF 2-BYTES OF CONTENT LENGTH IN THE DIVIDED RECORD
*               AND 2-BYTES OF CONTINUATION SEQUENCE NUMBER
PDSDUMPO        DS      0H
                L       2,=A(THEWORK)
                LH      3,PDSRDCB1+X'3E'        INPUT BLOCK SIZE
                LA      3,8(,3)
                LA      5,X'FF'
                SLL     5,24
                SR      4,4
                MVCL    2,4
*
                L       5,=A(THEWORK)
                READ    PDSDDEC2,SF,PDSRDCB1,(5),'S'
*
                CHECK   PDSDDEC2
*
                LH      2,PDSRDCB1+X'3E'        INPUT BLOCK SIZE
                CLI     PDSRECFM,X'C0'          RECFM=U ?
                BNE     PDSDMPO2                NO, TEXT LIBRARY
                LH      2,PDSRDCB1+X'52'        INPUT LRECL SIZE
PDSDMPO2        DS      0H
                L       4,=A(THEWORK)
                AR      4,2                     THE END OF INPUT BLOCK
                SR      1,1
                STH     1,PSORECNO
PDSDUMPP        DS      0H
                CR      5,4                     BLOCK END ?
                BNL     PDSDUMPO                YES
                CLI     PDSRECFM,X'C0'          RECFM=U ?
                BE      PDSDMPP2                YES, LOAD LIBRARY
*               TEXT LIBRARY
                CLC     0(8,5),=8X'FF'          THE END OF INPUT BLOCK ?
                BE      PDSDUMPO                YES
                PUT     PSPUTDCB,(5)
                LA      5,80(,5)                NEXT LOCATION IN BLOCK
                B       PDSDUMPP
*               LOAD LIBRARY
PDSDMPP2        DS      0H
                L       2,=A(THEWORK3)
                LH      3,PSPUTDCB+X'52'        OUTPUT LRECL
                SR      0,0
                SR      1,1
                MVCL    2,0                     INIT WITH X'00'
*
                LH      3,PSOLRECL              OUTPUT FILE LRECL
                S       3,=F'4'
                LR      0,4
                SR      0,5                     REMAINING LENGTH
                CR      0,3
                BNL     PDSDMPP3
                LR      3,0
PDSDMPP3        DS      0H
                L       2,=A(THEWORK3)
                STH     3,0(,2)                 LENGTH
                LH      1,PSORECNO
                LA      1,1(,1)
                STH     1,PSORECNO
                STH     1,2(,2)                 CONCATENATION COUNT
                LR      0,5
                LR      1,3
                LA      2,4(,2)                 AFTER HEADER
                MVCL    2,0
                L       3,=A(THEWORK3)
                PUT     PSPUTDCB,(3)
                LH      2,0(,3)                 LENGTH
                AR      5,2                     NEXT LOCATION IN BLOCK
                B       PDSDUMPP
```

TABLE 1-continued

```
*
PDSDUMPQ    DS       0H                              END OF A MEMBER
            B        PDSDUMPN
*
*
*
*
*           WHEN 4-BYTES HEADER, WITH 2-BYTES OF INPUT LOAD LIBRARY
*           RECORD LENGTH AND 2 NULL BYTES, IS FIRST APPENDED AT THE
*           BEGINING OF EACH INPUT LOAD LIBRARY RECORD AND IT IS DIVIDED
*           INTO THE OUTPUT RECORDS OF SAME LENGTH
PDSDUMPS    DS       0H
            L        2,=A(THEWORK)
            LH       3,PDSRDCB1+X'3E'                INPUT BLOCK SIZE
            LA       3,8(,3)
            SR       4,4
            LA       5,X'FF'                         INIT WITH X'FF'
            SLL      5,24
            MVCL     2,4
*
            L        5,=A(THEWORK)
            READ     PDSDDEC4,SF,PDSRDCB1,(5),'S'
*
            CHECK    PDSDDEC4
*
            CLI      PDSRECFM,X'C0'                  RECFM=U ?
            BE       PDSDMPT2                        LOAD LIBRARY
*           TEXT LIBRARY
            LH       2,PDSRDCB1+X'3E'                INPUT BLOCK SIZE
            L        4,=A(THEWORK)
            AR       4,2                             THE END OF INPUT BLOCK
PDSDUMPT    DS       0H
            CR       5,4                             BLOCK END ?
            BNL      PDSDUMPS                        YES
            CLC      0(8,5),=8X'FF'                  THE END OF INPUT BLOCK ?
            BE       PDSDUMPS                        YES
            PUT      PSPUTDCB,(5)
            LA       5,80(,5)                        NEXT LOCATION IN BLOCK
            B        PDSDUMPT
*           LOAD LIBRARY
PDSDMPT2    DS       0H
            LH       3,PDSRDCB1+X'52'                INPUT LRECL SIZE
            L        4,=A(THEWORK3)                  ADDRESS IN THEWORK3
            STH      3,0(4)                          SAVE THE LENGTH OF THE INPUT RECORD
            SR       1,1
            STH      1,2(,4)
            LR       0,5                             INPUT RECORD ADDRESS
            LR       1,3                             INPUT RECORD LENGTH
            LA       2,4(,4)                         AFTER HEADER
            MVCL     2,0
            LH       3,PDSRDCB1+X'52'                INPUT LRECL SIZE
            LA       4,4(3,4)                        THE END OF DATA IN THEWORK3
            L        5,=A(THEWORK3)
            LH       3,PSOLRECL                      OUTPUT FILE LRECL
PDSDMPT3    DS       0H
            CR       5,4                             END OF DATA IN THEWORK3 ?
            BNL      PDSDUMPS                        YES
            PUT      PSPUTDCB,(5)
            AR       5,3                             NEXT LOCATION IN THEWORK3
            B        PDSDMPT3
*
PDSDUMPU    DS       0H                              END OF A MEMBER
            B        PDSDUMPN
*
*
PDSDUMPR    DS       0H
            CLOSE    PDSRDCB1
            CLOSE    PSPUTDCB
            LM       0,15,PDSRSAVE
            BR       14
*
            LTORG
*
*
*           LOAD MEMBERS FROM A PS DATASET TO A PDS LIBRARY
PDSLOAD     DS       0H
*           STM      0,15,PDSRSAVE
            OPEN     PSGETDCB
            TM       PSGETDCB+X'30',X'10'
            BNO      PDSERR03
```

TABLE 1-continued

|   | | | |
|---|---|---|---|
| | LH | 2,PSGETDCB+X'52' | LRECL |
| | STH | 2,PSILRECL | |
| | OPEN | (PDSWDCB1,OUTPUT) | |
| | TM | PDSWDCB1+X'30',X'10' | |
| | BNO | PDSERR01 | |
| | TM | PDSWDCB1+X'1A',X'02' | PDS ? |
| | BNO | PDSERR0C | NOT A PDS |
| | LH | 2,PDSWDCB1+X'3E' | BLKSIZE |
| | STH | 2,PDSBLKSZ | |
| | MVC | PDSRECFM,PDSWDCB1+X'24' | RECFM |
| | LA | 2,PDSLOADH | |
| | STCM | 2,7,PSGETDCB+X'21' | NEW EODAD |
| * | | | |
| * | TIME | DEC,,ZONE=LT,LINKAGE=SVC | |
| | TIME | DEC | |
| * | | | |
| | STCM | 1,15,PDSCRTDT | X'00YYDDDF' |
| | STCM | 1,15,PDSUPDDT | X'00YYDDDF' |
| | STCM | 0,12,PDSUPDTM | X'HHMM' |
| | SRL | 1,16 | 000000YY |
| | LR | 0,1 | |
| | SRDL | 0,4 | |
| | MH | 0,=H'10' | |
| | SRL | 1,28 | |
| | AR | 1,0 | |
| | STC | 1,PDSVERSN+1 | |
| * | | | |
| | L | 1,X'10' | GET CVT ADDRESS 00FD8E48 |
| | L | 1,0(,1) | CVTTCBP 218 |
| | L | 1,0(,1) | MY TCB FROM X'218' |
| | L | 1,12(,1) | TIOT |
| | MVC | PDSUPDNM,0(1) | JOB NAME |
| * | | | |
| | MVI | PDSTRTHX,X'01' | |
| | MVC | PDSTRTHX+1(255),PDSTRTHX | |
| | MVC | PDSTRTHX+C'0'(10),=10X'00' | |
| * | | | |
| | L | 2,=A(THEWORK) | INIT THEWORK WITH X'00' |
| | L | 3,=A(THEWORKL+8) | BLOCK SIZE |
| | SR | 0,0 | INIT WITH X'00' |
| | SR | 1,1 | |
| | MVCL | 2,0 | |
| * | | | |
| | GET | PSGETDCB | |
| | LR | 6,1 | |
| | CLC | =CL23'Dump of TEXT Library : ',0(6) | |
| | BE | PDSLOAD1 | TEXT LIBRARY |
| | CLC | =CL23'Dump of LOAD Library : ',0(6) | |
| | BNE | PDSERR0N | NOT A LIBRARY UPLOAD |
| | CLI | PDSRECFM,X'C0' | RECFM=U ? |
| | BNE | PDSERR0D | OUTPUT IS NOT A RECFM=U LIBRARY |
| PDSLOAD1 | DS | 0H | |
| | L | 5,=A(THEWORK) | |
| PDSLOAD2 | DS | 0H | |
| | GET | PSGETDCB | |
| | LR | 6,1 | |
| | CLC | =C'@@@@****%%%%',0(6) | |
| | BNE | PDSLOAD2 | |
| PDSLOAD3 | DS | 0H | |
| | L | 5,=A(THEWORK) | DO NOT DELETE |
| | MVC | PDSMEMNM,12(6) | |
| | LH | 3,TEXTLEN | |
| | LTR | 3,3 | |
| | BZ | PDSLOAD5 | |
| | L | 4,TEXTLOC | |
| | AR | 3,4 | |
| PDSLOAD4 | DS | 0H | |
| | CR | 4,3 | |
| | BNL | PDSLOAD2 | |
| | CLC | PDSMEMNM,0(4) | |
| | BE | PDSLOAD5 | |
| | LA | 4,8(,4) | |
| | B | PDSLOAD4 | |
| * | | | |
| PDSLOAD5 | DS | 0H | |
| | CLI | PDSRECFM,X'C0' | RECFM=U ? |
| | BE | PDSLOADM | YES, LOAD LIBRARY |
| * | | | |
| | GET | PSGETDCB | |

TABLE 1-continued

|   |   |   |   |   |
|---|---|---|---|---|
| LR | 6,1 | | | |
| * | | | | |
| MVI | PDSSEG#,X'00' | | DEFAULT TO NO DIRECORY INFO | |
| CLC | 0(4,6),=C';;;;' | | | |
| BNE | PDSLOAD6 | | | |
| MVC | PDSDIRVS(PDSDIRNE-PDSDIRVS),4(6) | | | |
| LA | 4,PDSTRTHX | | | |
| LA | 5,PDSDIRVS | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRVS+3 | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRCR | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRCR+3 | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRCR+6 | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRUP | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRUP+3 | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRUP+6 | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRTM | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRTM+3 | | | |
| LA | 1,2(,5) | | | |
| LA | 3,1 | | | |
| EX | 3,PDSTRT1 | TRT | 0(0,5),0(4) | R5—>ARG, R4—>TABLE |
| BNZ | PDSLOAD6 | | | |
| LA | 5,PDSDIRL# | | | |
| LA | 1,5(,5) | | | |
| LA | 3,4 | | | |
| EX | 3,PDSTRT1 | TRT | 0(0,5),0(4) | R5—>ARG, R4—>TABLE |
| BNZ | PDSLOAD6 | | | |
| LA | 5,PDSDIR0# | | | |
| LA | 1,5(,5) | | | |
| LA | 3,4 | | | |
| EX | 3,PDSTRT1 | TRT | 0(0,5),0(4) | R5—>ARG, R4—>TABLE |
| BNZ | PDSLOAD6 | | | |
| MVI | PDSSEG#,X'0F' | | DIRECORY INFO | |
| MVC | PDSUPDNM,PDSDIRUS | | TSO USER ID | |
| MVC | PDSWRKDW(2),PDSDIRCR+3 | | MM | |
| MVC | PDSWRKDW+2(2),PDSDIRCR+6 | | DD | |
| MVC | PDSWRKDW+4(2),PDSDIRCR | | YY | |
| LA | 1,PDSWRKDW | | MMDDYY | |
| BAL | 14,EDITDATE | | R1 —> YYDDDC | |
| ZAP | PDSCRTDT,0(3,1) | | YYDDDC | |
| OI | PDSCRTDT+L'PDSCRTDT-1,X'0F' | | 00YYDDDF | |
| MVC | PDSWRKDW(2),PDSDIRUP+3 | | MM | |
| MVC | PDSWRKDW+2(2),PDSDIRUP+6 | | DD | |
| MVC | PDSWRKDW+4(2),PDSDIRUP | | YY | |

TABLE 1-continued

|  |  |  |  |
|---|---|---|---|
|  | LA | 1,PDSWRKDW | MMDDYY |
|  | BAL | 14,EDITDATE | R1 —> YYDDDC |
|  | ZAP | PDSUPDDT,0(3,1) | YYDDDC |
|  | OI | PDSUPDDT+L'PDSUPDDT-1,X'0F' | 00YYDDDF |
|  | SR | 2,2 |  |
|  | IC | 2,PDSDIRTM | 1st H of HH |
|  | N | 2,=F'15' | N 2,=X'0000000F' |
|  | SLL | 2,4 |  |
|  | SR | 1,1 |  |
|  | IC | 1,PDSDIRTM+1 | 2nd H of HH |
|  | N | 1,=F'15' | N 1,=X'0000000F' |
|  | OR | 2,1 |  |
|  | STC | 2,PDSUPDTM |  |
|  | SR | 2,2 |  |
|  | IC | 2,PDSDIRTM+3 | 1st M of MM |
|  | N | 2,=F'15' | N 2,=X'0000000F' |
|  | SLL | 2,4 |  |
|  | SR | 1,1 |  |
|  | IC | 1,PDSDIRTM+4 | 2nd M of MM |
|  | N | 1,=F'15' | N 1,=X'0000000F' |
|  | OR | 2,1 |  |
|  | STC | 2,PDSUPDTM+1 |  |
|  | PACK | PDSWRKDW,PDSDIRVS(2) |  |
|  | CVB | 2,PDSWRKDW |  |
|  | STC | 2,PDSVERSN |  |
|  | PACK | PDSWRKDW,PDSDIRVS+3(2) |  |
|  | CVB | 2,PDSWRKDW |  |
|  | STC | 2,PDSVERSN+1 |  |
|  | MVC | PDSVERSN+2(2),=X'0001' |  |
|  | PACK | PDSWRKDW,PDSDIRL# |  |
|  | CVB | 2,PDSWRKDW |  |
|  | STH | 2,PDSLINE# |  |
|  | PACK | PDSWRKDW,PDSDIR0# |  |
|  | CVB | 2,PDSWRKDW |  |
|  | STH | 2,PDSINIT# |  |
|  | MVC | PDSINIT#+2(2),=X'0000' |  |
| * |  |  |  |
| PDSLOAD6 | DS | 0H |  |
|  | L | 5,=A(THEWORK) |  |
| PDSLOAD7 | DS | 0H |  |
|  | L | 4,=A(THEWORK) |  |
|  | LH | 2,PDSWDCB1+X'3E' |  |
|  | AR | 4,2 |  |
|  | CR | 5,4 |  |
|  | BNL | PDSLOAD8 |  |
|  | GET | PSGETDCB |  |
|  | LR | 6,1 |  |
|  | CLC | =C'@@@@****%%%%',0(6) |  |
|  | BE | PDSLOADC |  |
|  | LH | 2,PSGETDCB+X'52' |  |
|  | BCTR | 2,0 |  |
|  | EX | 2,PDSLMVC1 | MVC 0(0,5),0(6) |
|  | LA | 2,1(,2) |  |
|  | AR | 5,2 |  |
|  | B | PDSLOAD7 |  |
| PDSLOAD8 | DS | 0H |  |
|  | L | 4,=A(THEWORK) |  |
|  | WRITE | PDSLDEC1,SF,PDSWDCB1,(4),'S' |  |
|  | CHECK | PDSLDEC1 |  |
|  | NOTE | PDSWDCB1 |  |
|  | STCM | 1,14,PDSTTR1 |  |
| * |  |  |  |
| PDSLOAD9 | DS | 0H |  |
|  | L | 5,=A(THEWORK) |  |
| PDSLOADA | DS | 0H |  |
|  | L | 4,=A(THEWORK) |  |
|  | LH | 2,PDSWDCB1+X'3E' |  |
|  | AR | 4,2 |  |
|  | CR | 5,4 |  |
|  | BNL | PDSLOADB |  |
|  | GET | PSGETDCB |  |
|  | LR | 6,1 |  |
|  | CLC | =C'@@@@****%%%%',0(6) |  |
|  | BE | PDSLOADD |  |
|  | LH | 2,PSGETDCB+X'52' |  |
|  | BCTR | 2,0 |  |
|  | EX | 2,PDSLMVC1 | MVC 0(0,5),0(6) |
|  | LA | 2,1(,2) |  |

TABLE 1-continued

|  |  |  |  |
|---|---|---|---|
|  | AR | 5,2 |  |
|  | B | PDSLOADA |  |
| PDSLOADB | DS | 0H |  |
|  | L | 4,=A(THEWORK) |  |
|  | WRITE | PDSLDEC2,SF,PDSWDCB1,(4),'S' |  |
|  | CHECK | PDSLDEC2 |  |
|  | B | PDSLOAD9 |  |
| * |  |  |  |
| PDSLOADC | DS | 0H |  |
|  | L | 4,=A(THEWORK) |  |
|  | SR | 5,4 |  |
|  | LTR | 5,5 |  |
|  | BZ | PDSLOAD3 |  |
|  | LH | 3,PDSWDCB1+X'3E' | BLKSIZE |
|  | STH | 5,PDSWDCB1+X'3E' | BLKSIZE |
|  | WRITE | PDSLDEC3,SF,PDSWDCB1,(4),'S' |  |
|  | CHECK | PDSLDEC3 |  |
|  | STH | 3,PDSWDCB1+X'3E' | BLKSIZE |
|  | NOTE | PDSWDCB1 |  |
|  | STCM | 1,14,PDSTTR1 |  |
|  | B | PDSLOADE |  |
| * |  |  |  |
| PDSLOADD | DS | 0H |  |
|  | L | 4,=A(THEWORK) |  |
|  | SR | 5,4 |  |
|  | LTR | 5,5 |  |
|  | BZ | PDSLOADE |  |
|  | LH | 3,PDSWDCB1+X'3E' | BLKSIZE |
|  | STH | 5,PDSWDCB1+X'3E' |  |
|  | WRITE | PDSLDEC4,SF,PDSWDCB1,(4),'S' |  |
|  | CHECK | PDSLDEC4 |  |
|  | STH | 3,PDSWDCB1+X'3E' | BLKSIZE |
|  | B | PDSLOADE |  |
| * |  |  |  |
| * |  |  |  |
| PDSLOADM | DS | 0H | LOAD LIBRARY |
|  | GET | PSGETDCB |  |
|  | LR | 6,1 |  |
|  | CLC | 0(4,6),=C';;;;' |  |
|  | BNE | PDSERR0E | DIRECTORY INFO MISSING |
|  | IC | 2,PDSSEG# |  |
|  | SLL | 2,27 |  |
|  | SRL | 2,26 |  |
|  | BCTR | 2,0 |  |
|  | XC | PDSSEG#(PDSSTOWE−PDSSEG#),PDSSEG# |  |
|  | EX | 2,PDSLMVCM | MVC PDSSEG#(PDSSTOWE−PDSSEG#),4(6) |
| * |  |  |  |
| * |  |  |  |
|  | CLI | PDSDMPSW,X'02' |  |
|  | BE | PDSLOADO |  |
| * |  |  |  |
| * |  |  |  |
| * | WHEN EACH INPUT LOAD LIBRARY RECORD WAS FIRST DIVIDED INTO |  |  |
| * | RECORDS OF SAME LENGTH OF (OUTPUT LRECL − 4) BYTES AND THEN |  |  |
| * | EACH DIVIDED RECORD WAS APPENDED AT THE FRONT WITH 4-BYTES |  |  |
| * | HEADER OF 2-BYTES OF CONTENT LENGTH IN THE DIVIDED RECORD |  |  |
| * | AND 2-BYTES OF CONTINUATION SEQUENCE NUMBER |  |  |
|  | L | 5,=A(THEWORK) |  |
|  | XC | PSIRECNO,PSIRECNO |  |
| PDSLOADN | DS | 0H |  |
|  | L | 3,=A(THEWORK) |  |
|  | LH | 2,PDSWDCB1+X'3E' |  |
|  | AR | 3,2 |  |
|  | CR | 5,3 |  |
|  | BH | PDSERR0A | OUTPUT PDS BLOCKSIZE TOO SMALL |
|  | GET | PSGETDCB |  |
|  | LR | 6,1 |  |
|  | CLC | 2(2,6),=X'0001' | CONCATENATION COUNT |
|  | BNE | PDSLODN2 |  |
|  | CLC | PSIRECNO,=X'0000' |  |
|  | BNE | PDSLODN3 | FIRST RECORD OUTPUT OF A MEMBER |
| PDSLODN2 | DS | 0H |  |
|  | MVC | PSIRECNO,2(6) |  |
|  | LH | 1,PSGETDCB+X'52' |  |
|  | S | 1,=F'4' | HEADER LENGTH |
|  | LH | 3,0(,6) | REAL DATA LENGTH |
|  | CR | 3,1 |  |
|  | BH | PDSERR0B | SEQUENTIAL DATASET LRECL TOO SMALL |
|  | LR | 4,5 |  |

TABLE 1-continued

|          |       |                            |                                   |
|----------|-------|----------------------------|-----------------------------------|
|          | LR    | 1,5                        | SAVE R5                           |
|          | LR    | 5,3                        |                                   |
|          | LA    | 2,4(,6)                    |                                   |
|          | MVCL  | 4,2                        |                                   |
|          | LR    | 5,1                        | RESTORE R5                        |
|          | LH    | 2,0(,6)                    | REAL DATA LENGTH                  |
|          | AR    | 5,2                        |                                   |
|          | B     | PDSLOADN                   |                                   |
| *        |       |                            |                                   |
| PDSLODN3 | DS    | 0H                         | FIRST RECORD OF A MEMBER          |
|          | L     | 4,=A(THEWORK)              |                                   |
|          | SR    | 5,4                        | OUTPUT RECORD LENGTH              |
|          | LH    | 3,PDSWDCB1+X'3E'           | MAXIMUM BLKSIZE                   |
|          | STH   | 5,PDSWDCB1+X'3E'           | OUTPUT RECORD LENGTH              |
|          | WRITE | PDSLDEC5,SF,PDSWDCB1,(4),'S' |                                 |
|          | CHECK | PDSLDEC5                   |                                   |
|          | STH   | 3,PDSWDCB1+X'3E'           | MAXIMUM BLKSIZE                   |
|          | NOTE  | PDSWDCB1                   |                                   |
|          | STCM  | 1,14,PDSTTR1               |                                   |
|          | XC    | PDSPCDTR,PDSPCDTR          | TTR OF FIRST PROGRAM CODE         |
|          | MVI   | PDSPGMCD,X'00'             |                                   |
| *        |       |                            |                                   |
| PDSLODN4 | DS    | 0H                         |                                   |
|          | L     | 5,=A(THEWORK)              |                                   |
|          | LH    | 1,PSGETDCB+X'52'           |                                   |
|          | S     | 1,=F'4'                    | HEADER LENGTH                     |
|          | LH    | 3,0(,6)                    | REAL DATA LENGTH                  |
|          | CR    | 3,1                        |                                   |
|          | BH    | PDSERR0B                   | SEQUENTIAL DATASET LRECL TOO SMALL|
|          | LR    | 4,5                        |                                   |
|          | LR    | 1,5                        | SAVE R5                           |
|          | LR    | 5,3                        |                                   |
|          | LA    | 2,4(,6)                    |                                   |
|          | MVCL  | 4,2                        |                                   |
|          | LR    | 5,1                        | RESTORE R5                        |
|          | LH    | 2,0(,6)                    | REAL DATA LENGTH                  |
|          | AR    | 5,2                        |                                   |
| PDSLODN5 | DS    | 0H                         |                                   |
|          | L     | 3,=A(THEWORK)              |                                   |
|          | LH    | 2,PDSWDCB1+X'3E'           |                                   |
|          | AR    | 3,2                        |                                   |
|          | CR    | 5,3                        |                                   |
|          | BH    | PDSERR0A                   | OUTPUT PDS BLOCKSIZE TOO SMALL    |
|          | GET   | PSGETDCB                   |                                   |
|          | LR    | 6,1                        |                                   |
|          | CLC   | =C'@@@@****%%%%',0(6)      |                                   |
|          | BE    | PDSLODN9                   |                                   |
|          | CLC   | 2(2,6),=X'0001'            | CONCATENATION COUNT               |
|          | BE    | PDSLODN6                   |                                   |
|          | LH    | 1,PSGETDCB+X'52'           |                                   |
|          | S     | 1,=F'4'                    | HEADER LENGTH                     |
|          | LH    | 3,0(,6)                    | REAL DATA LENGTH                  |
|          | CR    | 3,1                        |                                   |
|          | BH    | PDSERR0B                   | SEQUENTIAL DATASET LRECL TOO SMALL|
|          | LR    | 4,5                        |                                   |
|          | LR    | 1,5                        | SAVE R5                           |
|          | LR    | 5,3                        |                                   |
|          | LA    | 2,4(,6)                    |                                   |
|          | MVCL  | 4,2                        |                                   |
|          | LR    | 5,1                        | RESTORE R5                        |
|          | LH    | 2,0(,6)                    | REAL DATA LENGTH                  |
|          | AR    | 5,2                        |                                   |
|          | B     | PDSLODN5                   |                                   |
| *        |       |                            |                                   |
| PDSLODN6 | DS    | 0H                         |                                   |
|          | L     | 4,=A(THEWORK)              |                                   |
|          | SR    | 5,4                        |                                   |
|          | LH    | 3,PDSWDCB1+X'3E'           | MAXIMUM BLKSIZE                   |
|          | STH   | 5,PDSWDCB1+X'3E'           | RECORD OUTPUT SIZE                |
|          | WRITE | PDSLDEC6,SF,PDSWDCB1,(4),'S' |                                 |
|          | CHECK | PDSLDEC6                   |                                   |
|          | STH   | 3,PDSWDCB1+X'3E'           | MAXIMUM BLKSIZE                   |
|          | CLI   | PDSPGMCD,X'01'             | THE FIRST INSTRUCTION CODE LINE ? |
|          | BNE   | PDSLODN7                   | NO                                |
|          | NOTE  | PDSWDCB1                   |                                   |
|          | STCM  | 1,14,PDSPCDTR              | TTR OF FIRST PROGRAM CODE         |
|          | MVI   | PDSPGMCD,X'02'             |                                   |
| PDSLODN7 | DS    | 0H                         |                                   |
|          | CLI   | 0(4),X'20'                 |                                   |

TABLE 1-continued

|  | BE | PDSLODN8 |  |
| --- | --- | --- | --- |
|  | CLI | 0(4),X'80' |  |
|  | BE | PDSLODN8 |  |
|  | CLI | 0(4),X'01' |  |
|  | BNE | PDSLODN8 |  |
|  | CLI | PDSPGMCD,X'00' | THE FIRST INSTRUCTION CODE LINE ? |
|  | BNE | PDSLODN8 | NO |
|  | MVI | PDSPGMCD,X'01' | NEXT RECORD IS THE FIRST INSTRUCTION CODE |
|  | LH | 2,14,(4) | LENGTH OF NEXT INSTRUCTION CODE RECORD |
| PDSLODN8 | DS | 0H |  |
|  | B | PDSLODN4 |  |
| * |  |  |  |
| PDSLODN9 | DS | 0H | LAST RECORD OF A MEMBER |
|  | L | 4,=A(THEWORK) |  |
|  | SR | 5,4 |  |
|  | LTR | 5,5 |  |
|  | BZ | PDSLOADE |  |
|  | LH | 3,PDSWDCB1+X'3E' | MAXIMUM BLKSIZE |
|  | STH | 5,PDSWDCB1+X'3E' | OUTPUT RECORD SIZE |
|  | WRITE | PDSLDEC7,SF,PDSWDCB1,(4),'S' |  |
|  | CHECK | PDSLDEC7 |  |
|  | STH | 3,PDSWDCB1+X'3E' | MAXIMUM BLKSIZE |
|  | B | PDSLOADE |  |
| * |  |  |  |
| * |  |  |  |
| * |  |  |  |
| * | WHEN 4-BYTES HEADER, WITH 2-BYTES OF INPUT LOAD LIBRARY |  |  |
| * | RECORD LENGTH AND 2 NULL BYTES, WAS FIRST APPENDED AT THE |  |  |
| * | BEGINING OF EACH INPUT LOAD LIBRARY RECORD AND THEN IT WAS |  |  |
| * | DIVIDED INTO THE OUTPUT RECORDS OF SAME LENGTH |  |  |
| ATHEWORK | DC | A(THEWORK) | ADDRESS IN THEWORK |
| LTHEWORK | DC | H'0' |  |
| * |  |  |  |
| PDSLOADO | DS | 0H |  |
|  | GET | PSGETDCB | FIRST RECORD OF A MEMBER |
|  | LR | 6,1 |  |
|  | LH | 2,0(,6) | LENGTH OF OUTPUT LOAD MODULE RECORD |
|  | STH | 2,LTHEWORK |  |
|  | LH | 3,PDSWDCB1+X'3E' | OUTPUT LOAD LIBRARY BLKSIZE |
|  | CR | 2,3 |  |
|  | BH | PDSERR0A | OUTPUT PDS BLOCKSIZE TOO SMALL |
|  | LH | 4,PSGETDCB+X'52' | INPUT LRECL |
|  | S | 4,=F'4' | HEADER LENGTH |
|  | LR | 1,4 |  |
|  | LR | 3,4 |  |
|  | LA | 2,4(,6) | AFTER 4-BYTES HEADER |
|  | L | 0,=A(THEWORK) |  |
|  | MVCL | 0,2 |  |
|  | L | 2,=A(THEWORK) |  |
|  | AR | 2,4 |  |
|  | ST | 2,ATHEWORK |  |
| PDSLODO2 | DS | 0H |  |
|  | L | 2,ATHEWORK |  |
|  | L | 3,=A(THEWORK) |  |
|  | SR | 2,3 |  |
|  | LH | 3,LTHEWORK |  |
|  | CR | 2,3 |  |
|  | BNL | PDSLODO3 |  |
|  | GET | PSGETDCB |  |
|  | LR | 6,1 |  |
|  | LH | 3,PSGETDCB+X'52' | INPUT LRECL |
|  | L | 4,ATHEWORK |  |
|  | LR | 1,4 |  |
|  | AR | 1,3 |  |
|  | ST | 1,ATHEWORK |  |
|  | LR | 5,3 |  |
|  | LR | 2,6 |  |
|  | MVCL | 4,2 |  |
|  | B | PDSLODO2 |  |
| * |  |  |  |
| PDSLODO3 | DS | 0H | FIRST RECORD OF A MEMBER |
|  | L | 4,=A(THEWORK) |  |
|  | LH | 3,PDSWDCB1+X'3E' | MAXIMUM BLKSIZE |
|  | LH | 5,LTHEWORK |  |
|  | STH | 5,PDSWDCB1+X'3E' | OUTPUT RECORD LENGTH |
|  | WRITE | PDSLDEC9,SF,PDSWDCB1,(4),'S' |  |
|  | CHECK | PDSLDEC9 |  |
|  | STH | 3,PDSWDCB1+X'3E' | MAXIMUM BLKSIZE |
|  | NOTE | PDSWDCB1 |  |
|  | STCM | 1,14,PDSTTR1 |  |

TABLE 1-continued

|  | XC | PDSPCDTR,PDSPCDTR | TTR OF FIRST PROGRAM CODE |
|---|---|---|---|
|  | MVI | PDSPGMCD,X'00' |  |
| * |  |  |  |
| PDSLODO4 | DS | 0H |  |
|  | L | 5,=A(THEWORK) |  |
|  | GET | PSGETDCB | FIRST INPUT RECORD FOR EACH OUTPUT |
| * |  |  | LOAD MODULE RECORD |
|  | LR | 6,1 |  |
|  | CLC | =C'@@@@****%%%%',0(6) |  |
|  | BE | PDSLOADE |  |
|  | LH | 2,0(,6) | LENGTH OF OUTPUT LOAD MODULE RECORD |
|  | STH | 2,LTHEWORK |  |
|  | LH | 3,PDSWDCB1+X'3E' | OUTPUT LOAD LIBRARY BLKSIZE |
|  | CR | 2,3 |  |
|  | BH | PDSERR0A | OUTPUT PDS BLOCKSIZE TOO SMALL |
|  | LA | 2,4(,6) |  |
|  | LH | 3,PSGETDCB+X'52' | LRECL |
|  | S | 3,=F'4' | HEADER |
|  | LR | 5,3 |  |
|  | L | 4,=A(THEWORK) |  |
|  | LR | 1,4 |  |
|  | AR | 1,3 |  |
|  | ST | 1,ATHEWORK |  |
|  | MVCL | 4,2 |  |
| PDSLODO5 | DS | 0H |  |
|  | L | 5,=A(THEWORK) |  |
|  | L | 2,ATHEWORK |  |
|  | SR | 2,5 |  |
|  | LH | 3,LTHEWORK |  |
|  | CR | 2,3 |  |
|  | BNL | PDSLODO6 |  |
|  | GET | PSGETDCB |  |
|  | LR | 6,1 |  |
|  | LH | 3,PSGETDCB+X'52' | INPUT LRECL |
|  | L | 4,ATHEWORK |  |
|  | LR | 1,4 |  |
|  | AR | 1,3 |  |
|  | ST | 1,ATHEWORK | NEW END OF DATA IN THEWORK |
|  | LR | 5,3 |  |
|  | LR | 2,6 |  |
|  | MVCL | 4,2 |  |
|  | B | PDSLODO5 |  |
| * |  |  |  |
| PDSLODO6 | DS | 0H |  |
|  | L | 4,=A(THEWORK) |  |
|  | LH | 5,LTHEWORK |  |
|  | LH | 3,PDSWDCB1+X'3E' | MAXIMUM BLKSIZE |
|  | STH | 5,PDSWDCB1+X'3E' | RECORD OUTPUT SIZE |
|  | WRITE | PDSLDECA,SF,PDSWDCB1,(4),'S' |  |
|  | CHECK | PDSLDECA |  |
|  | STH | 3,PDSWDCB1+X'3E' | MAXIMUM BLKSIZE |
|  | CLI | PDSPGMCD,X'01' | THE FIRST INSTRUCTION CODE LINE ? |
|  | BNE | PDSLODO7 | NO |
|  | NOTE | PDSWDCB1 |  |
|  | STCM | 1,14,PDSPCDTR | TTR OF FIRST PROGRAM CODE |
|  | MVI | PDSPGMCD,X'02' |  |
| PDSLODO7 | DS | 0H |  |
|  | CLI | 0(4),X'20' |  |
|  | BE | PDSLODO8 |  |
|  | CLI | 0(4),X'80' |  |
|  | BE | PDSLODO8 |  |
|  | CLI | 0(4),X'01' |  |
|  | BNE | PDSLODO8 |  |
|  | CLI | PDSPGMCD,X'00' | THE FIRST INSTRUCTION CODE LINE ? |
|  | BNE | PDSLODO8 | NO |
|  | MVI | PDSPGMCD,X'01' | NEXT RECORD IS THE FIRST INSTRUCTION CODE |
|  | LH | 2,14(,4) | LENGTH OF NEXT INSTRUCTION CODE RECORD |
| PDSLODO8 | DS | 0H |  |
|  | B | PDSLODO4 |  |
| * |  |  |  |
| * |  |  |  |
| PDSLOADE | DS | 0H | UPDATE DIRECTORY INDEX OF EACH MEMBER |
|  | STOW | PDSWDCB1,PDSSTOWL,A |  |
|  | LTR | 15,15 |  |
|  | BZ | PDSLOADF | ADDITION OF A NEW MEMBER SUCCESSFUL |
|  | C | 15,=F'4' | THE SPECIFIED NAME ALREADY EXISTS ? |
|  | BNE | PDSLOADG | NO |
| * | ALREADY EXISTS. DELETE IT FIRST AND ADD IT. |  |  |
|  | MVC | PDSWRKDW,PDSMEMNM |  |

TABLE 1-continued

|          | STOW  | PDSWDCB1,PDSWRKDW,D |                                      |
|----------|-------|---------------------|--------------------------------------|
|          | LTR   | 15,15               |                                      |
|          | BNZ   | PDSLOADG            |                                      |
|          | STOW  | PDSWDCB1,PDSSTOWL,A |                                      |
| PDSLOADF | DS    | 0H                  |                                      |
|          | XC    | PDSTTR1,PDSTTR1     |                                      |
|          | B     | PDSLOAD3            |                                      |
| *        |       |                     |                                      |
| *        |       |                     |                                      |
| PDSLOADH | DS    | 0H                  | EODAD OF PSGETDCB                    |
|          | CLI   | PDSRECFM,X'C0'      | LOAD LIBRARY ?                       |
|          | BNE   | PDSLODH2            | NO, TEXT LIBRARY                     |
|          | CLI   | PDSDMPSW,X'02'      |                                      |
|          | BE    | PDSLOADI            |                                      |
|          | L     | 4,=A(THEWORK)       |                                      |
| PDSLODH2 | DS    | 0H                  |                                      |
|          | CR    | 5,4                 |                                      |
|          | BNH   | PDSLOADJ            | NO INPUT RECORD FOR THIS MEMBER      |
| *        | LAST RECORD OF THE LIBRARY WHEN PDSDMPSW = X'01' | | |
|          | SR    | 5,4                 |                                      |
|          | LH    | 3,PDSWDCB1+X'3E'    | BLKSIZE                              |
|          | STH   | 5,PDSWDCB1+X'3E'    |                                      |
|          | WRITE | PDSLDEC8,SF,PDSWDCB1,(4),'S' |                              |
|          | CHECK | PDSLDEC8            |                                      |
|          | STH   | 3,PDSWDCB1+X'3E'    | BLKSIZE                              |
|          | CLC   | PDSTTR1,=3X'00'     |                                      |
|          | BNE   | PDSLOADI            |                                      |
| *        |       |                     |                                      |
|          | NOTE  | PDSWDCB1            |                                      |
|          | STCM  | 1,14,PDSTTR1        |                                      |
| *        |       |                     |                                      |
| PDSLOADI | DS    | 0H                  | UPDATE DIRECTORY INDEX OF LAST MEMBER |
|          | STOW  | PDSWDCB1,PDSSTOWL,A |                                      |
|          | LTR   | 15,15               |                                      |
|          | BZ    | PDSLOADJ            | ADDITION OF A NEW MEMBER SUCCESSFUL  |
|          | C     | 15,=F'4'            | THE SPECIFIED NAME ALREADY EXISTS ?  |
|          | BNE   | PDSLOADG            | NO                                   |
| *        | ALREADY EXISTS. DELETE IT FIRST AND ADD IT. | | |
|          | MVC   | PDSWRKDW,PDSMEMNM   |                                      |
|          | STOW  | PDSWDCB1,PDSWRKDW,D |                                      |
|          | LTR   | 15,15               |                                      |
|          | BNZ   | PDSLOADG            |                                      |
|          | STOW  | PDSWDCB1,PDSSTOWL,A |                                      |
| PDSLOADJ | DS    | 0H                  |                                      |
| DCBPSGTE | DS    | 0H                  |                                      |
|          | CLOSE | PDSWDCB1            |                                      |
|          | CLOSE | PSGETDCB            |                                      |
|          | LM    | 0,15,PDSRSAVE       |                                      |
|          | BR    | 14                  |                                      |
| *        |       |                     |                                      |
| PDSLOADG | DS    | 0H                  |                                      |
|          | C     | 15,=F'12'           | NO DIRECTORY SPACE AVAILABLE ?       |
|          | BE    | PDSERR06            | YES                                  |
|          | C     | 0,=X'00000D37'      | ALL PDS SPACE USED ?                 |
|          | BE    | PDSERR07            | YES                                  |
|          | B     | PDSERR08            |                                      |
| *        |       |                     |                                      |
| PDSERR01 | DS    | 0H                  |                                      |
|          | WTO   | 'PDS OPEN FAILED. 1' |                                     |
|          | LA    | 15,8                |                                      |
|          | B     | PDSPROG9            |                                      |
| *        |       |                     |                                      |
| PDSERR02 | DS    | 0H                  |                                      |
|          | WTO   | 'PDS OPEN FAILED. 2' |                                     |
|          | LA    | 15,12               |                                      |
|          | B     | PDSPROG9            |                                      |
| *        |       |                     |                                      |
| PDSERR03 | DS    | 0H                  |                                      |
|          | WTO   | 'INPUT DATASET OPEN FAILED' |                              |
|          | LA    | 15,16               |                                      |
|          | B     | PDSPROG9            |                                      |
| *        |       |                     |                                      |
| PDSERR04 | DS    | 0H                  |                                      |
|          | WTO   | 'OUTPUT DATASET OPEN FAILED' |                             |
|          | LA    | 15,20               |                                      |
|          | B     | PDSPROG9            |                                      |
| *        |       |                     |                                      |
| PDSERR05 | DS    | 0H                  |                                      |
|          | WTO   | 'MEMBER NAME NOT FOUND IN PDS' |                           |

TABLE 1-continued

|  |  |  |
|---|---|---|
|  | LA | 15,24 |
|  | B | PDSPROG9 |
| * |  |  |
| PDSERR06 | DS | 0H |
|  | WTO | 'PDS DIRECTORY SPACE NOT ENOUGH' |
|  | LA | 15,28 |
|  | B | PDSPROG9 |
| * |  |  |
| PDSERR07 | DS | 0H |
|  | WTO | 'PDS SPACE NOT ENOUGH, D37' |
|  | LA | 15,32 |
|  | B | PDSPROG9 |
| * |  |  |
| PDSERR08 | DS | 0H |
|  | WTO | 'PDS STOW ERROR' |
|  | LA | 15,36 |
|  | B | PDSPROG9 |
| * |  |  |
| PDSERR09 | DS | 0H |
|  | WTO | 'RECORD FORMAT NOT SUPPORTED' |
|  | LA | 15,40 |
|  | B | PDSPROG9 |
| * |  |  |
| PDSERR0A | DS | 0H |
|  | WTO | 'OUTPUT DATASET BLOCKSIZE TOO SMALL' |
|  | LA | 15,44 |
|  | B | PDSPROG9 |
| * |  |  |
| PDSERR0B | DS | 0H |
|  | WTO | 'INPUT UPLOAD SEQUENTIAL DATASET LRECL TOO SMALL' |
|  | LA | 15,48 |
|  | B | PDSPROG9 |
| * |  |  |
| PDSERR0C | DS | 0H |
|  | WTO | 'NOT A PARTITIONED ORGANIZATION' |
|  | LA | 15,52 |
|  | B | PDSPROG9 |
| * |  |  |
| PDSERR0D | DS | 0H |
|  | WTO | 'NOT A RECFM=U LIBRARY' |
|  | LA | 15,56 |
|  | B | PDSPROG9 |
| * |  |  |
| PDSERR0E | DS | 0H |
|  | WTO | 'DIRECTORY INFO MISSING' |
|  | LA | 15,60 |
|  | B | PDSPROG9 |
| * |  |  |
| PDSERR0F | DS | 0H |
|  | WTO | 'OUT RECFM MUST BE F or FB' |
|  | LA | 15,64 |
|  | B | PDSPROG9 |
| * |  |  |
| PDSERR0G | DS | 0H |
|  | WTO | 'RDJFCB FAILED' |
|  | LA | 15,68 |
|  | B | PDSPROG9 |
| * |  |  |
| PDSERR0H | DS | 0H |
|  | WTO | 'OBTAIN FAILED' |
|  | LA | 15,72 |
|  | B | PDSPROG9 |
| * |  |  |
| PDSERR0I | DS | 0H |
|  | WTO | 'MUST BE A SINGLE MEMBER' |
|  | LA | 15,76 |
|  | B | PDSPROG9 |
| * |  |  |
| PDSERR0J | DS | 0H |
|  | WTO | 'NOT A PHYSICAL SEQUENTIAL DATASET' |
|  | LA | 15,80 |
|  | B | PDSPROG9 |
| * |  |  |
| PDSERR0K | DS | 0H |
|  | WTO | 'WRONG INPUT RECORD FORMAT' |
|  | LA | 15,84 |
|  | B | PDSPROG9 |

TABLE 1-continued

```
*
PDSERR0L    DS      0H
            WTO     'INPUT DATA NOT SUPPORTED'
            LA      15,88
            B       PDSPROG9
*
PDSERR0M    DS      0H
            WTO     'WRONG OUTPUT RECORD FORMAT'
            LA      15,92
            B       PDSPROG9
*
PDSERR0N    DS      0H
            WTO     'DATA DELIVERED IS NOT A LIBRARY'
            LA      15,96
            B       PDSPROG9
*
PDSERR0O    DS      0H
            WTO     'OUTPUT DATASET LRECL TOO SMALL'
            LA      15,100
            B       PDSPROG9
*
*
*
PDSRSAVE    DS      16F
PDSLMVC1    MVC     0(0,5),0(6)
PDSLMVCM    MVC     PDSSEG#(0),4(6)
PDSTRT1     TRT     0(0,5),0(4)                   R5—>ARG, R4—>TABLE
PDSTRTHX    DS      XL256
PDSWRKDW    DS      D
PDSWRKWD    DS      CL8
PDSLRECL    DS      H
PSOLRECL    DS      H
PSORECNO    DS      H
*
PDSRECFM    DS      X       F=X'80' or FB=X'90' or U=X'C0'
PDSPGMCD    DS      X       X'01' NEXT RECORD IS THE FIRST INSTRUCTION CODE
PDSBLKSZ    DS      H
PSILRECL    DS      H
PSIRECNO    DS      H
*
*
PSGETDCB    DCB     DDNAME=IN,DSORG=PS,MACRF=GL,EODAD=DCBPSGTE
PSPUTDCB    DCB     DDNAME=OUT,DSORG=PS,MACRF=PM
*
PDSOUTWK    DS      0CL80
            DC      CL1' '
PDSDIREN    DS      0CL133
PDSDIRNM    DC      CL8' '                        MEMBER NAME
            DC      CL3' '
PDSDIRVS    DC      CL5' ' 01.99                  VERSION
            DC      CL2' '
PDSDIRCR    DC      CL8' ' YY/MM/DD               CREATION DATE
            DC      CL2' '
PDSDIRUP    DC      CL8' ' YY/MM/DD               LAST UPDATE DATE
            DC      CL2' '
PDSDIRTM    DC      CL5' ' HH:MM                  LAST UPDATE TIME OF THE DATE
            DC      CL2' '
PDSDIRL#    DC      CL5' '                        NUMBER OF LINES
            DC      CL2' '
PDSDIR0#    DC      CL5' '                        NUMBER OF INITIAL LINES
            DC      CL2' '
PDSDIRUS    DC      CL8' '                        TSO USER ID
PDSDIRNE    DC      CL256' '
*
*
PDSDIREL    DS      0F
PDSSTOWL    DS      0F
PDSMEMNM    DS      CL8
PDSTTR1     DS      XL3
PDSSEG#     DC      X'0F'
PDSPCDTR    DS      0XL3          TTR OF THE FIRST INSTRUCTION CODE RECORD
                                  WHEN IT IS A PROGRAM LOAD MODULE
*
PDSVERSN    DC      X'0163'       01.99
            DC      X'0001'
PDSCRTDT    DC      X'0099285F'   99/10/12
PDSUPDDT    DC      X'0099285F'   99/10/12
PDSUPDTM    DC      X'1042'       10:42
PDSLINE#    DC      X'0001'       1
```

TABLE 1-continued

```
PDSINIT#     DC       X'0001'              1
             DC       X'0000'
PDSUPDNM     DC       CL8' '
PDSSTOWE     DC       CL2' '
*
*
PDSBLDLL     DS       0F
PDSBLDLN     DC       H'1'      # OF ENTRIES
             DC       H'128'    LENGTH OF EACH ENTRY
PDSBLDL1     DC       CL8' '
PDSBLDLT     DS       XL3       TTR
             DC       X'0'      K    ONLY DATASET
             DC       X'0'      Z    PRIVATE LIBRARY
             DC       X'0'      C    MEMBER NAME
PDSBLDLU     DS       XL114     USER DATA
*
*
PDSRBDCB     DCB      DDNAME=IN,MACRF=R,DSORG=PO,                          X
                      RECFM=F,LRECL=256,BLKSIZE=256,                       X
                      EODAD=PDSDUMP4
*
PDSRDCB1     DCB      DDNAME=IN,MACRF=R,DSORG=PO ,EODAD=PDSDUMP8
*
PDSWDCB1     DCB      DDNAME=OUT,DSORG=PO,MACRF=W
*
JFCBDCB      DCB      DDNAME=IN,        FOR VSAM, QSAM NEW OR OLD, BSAM, BDAM,   *
                      DSORG=PS,         BPAM, BPAM MEMBER NEW OR OLD             *
                      MACRF=(R),                                                 *
                      EXLST=(JFCBLIST)
JFCBLIST     DC       AL1(135)                   JFCB TYPE
             DC       AL3(JFCBAREA)              A(JFCB AREA)
             DS       0D
JFCBAREA     DS       0CL176                     TARGET FOR RDJFCB
             DS       CL44                       DSN
             DS       CL132
*
             DS       0F
OBTAIN1      CAMLST   SEARCH,OBTNDSN,OBTVOLSR,OBTNDSCB
OBTNDSN      DC       CL44' '
OBTVOLSR     DC       CL6'VOLSER'
OBTNDSCB     DS       140X
*
*

LTORG
*
*
EDITDATE     DS       0H
*            R1 POINTS TO Julian date YYDDDC or Gregorian date MMDDYY
             LR       0,14                       SAVE R14
             TM       0(1),X'F0'
             BO       EDTDATEG                   A GREGORIAN DATE
*
*            R1 POINTS TO JULIAN DATE, YYDDDC
             ZAP      EDTYYDDD,0(3,1)
             MVO      EDTYYC,EDTYYDDD(1)         0YYC <— YYDDDC
             ZAP      EDTDDDC,EDTYYDDD+1(2)      DDDC <— YYDDDC
EDTDATE2     DS       0H
             LA       15,EDTMONTH
             ZAP      EDTYYYC,EDTYYC
             DP       EDTYYYC,EDTP004
             CP       EDTYYYC+L'EDTYYYC-L'EDTP004(L'EDTP004),EDTP000
             BNE      EDTDATE3
             LA       15,EDTMONT2
EDTDATE3     DS       0H
             LA       14,12
EDTDATE4     DS       0H
             CP       EDTDDDC,4(2,15)
             BNH      EDTDATE5
             LA       15,4(15)
             BCT      14,EDTDATE4
             SP       EDTDDDC,0(2,15)            - 365/366
             AP       EDTYYC,EDTP001
             B        EDTDATE2
EDTDATE5     DS       0H
             MVC      EDTCMM,2(15)
             UNPK     EDTCDDD,EDTDDDC
             OI       EDTCDDD+L'EDTCDDD-1,X'F0'
             SP       EDTDDDC,0(2,15)
             UNPK     EDTCDD,EDTDDDC
```

TABLE 1-continued

|  |  |  |  |
|---|---|---|---|
|  | OI | EDTCDD+L'EDTCDD-1,X'F0' |  |
|  | UNPK | EDTCYY,EDTYYC |  |
|  | OI | EDTCYY+L'EDTCYY-1,X'F0' |  |
|  | LA | 1,EDTCYY | C'YYDDDMMDD' |
|  | LR | 14,0 |  |
|  | BR | 14 |  |
| EDTCYY | DC | CL2'00' |  |
| EDTCDDD | DC | CL3'000' |  |
| EDTCMM | DC | CL2'00' |  |
| EDTCDD | DC | CL2'00' |  |
| EDTYYDDD | DC | PL3'0' |  |
| EDTYYC | DC | PL2'0' |  |
| EDTYYYC | DC | PL3'0' |  |
| EDTMMC | DC | PL2'0' |  |
| EDTDDDC | DC | PL2'0' |  |
| EDTP000 | DC | P'0' |  |
| EDTP001 | DC | P'1' |  |
| EDTP004 | DC | P'4' |  |
| EDTMONTH | DS | 0H |  |
|  | DC | PL2'000',C'01' |  |
|  | DC | PL2'031',C'02' |  |
|  | DC | PL2'059',C'03' |  |
|  | DC | PL2'090',C'04' |  |
|  | DC | PL2'120',C'05' |  |
|  | DC | PL2'151',C'06' |  |
|  | DC | PL2'181',C'07' |  |
|  | DC | PL2'212',C'08' |  |
|  | DC | PL2'243',C'09' |  |
|  | DC | PL2'273',C'10' |  |
|  | DC | PL2'304',C'11' |  |
|  | DC | PL2'334',C'12' |  |
|  | DC | PL2'365',C' ' |  |
| EDTMONT2 | DS | 0H |  |
|  | DC | PL2'000',C'01' |  |
|  | DC | PL2'031',C'02' |  |
|  | DC | PL2'060',C'03' |  |
|  | DC | PL2'091',C'04' |  |
|  | DC | PL2'121',C'05' |  |
|  | DC | PL2'152',C'06' |  |
|  | DC | PL2'182',C'07' |  |
|  | DC | PL2'213',C'08' |  |
|  | DC | PL2'244',C'09' |  |
|  | DC | PL2'274',C'10' |  |
|  | DC | PL2'305',C'11' |  |
|  | DC | PL2'335',C'12' |  |
|  | DC | PL2'366',C' ' |  |
| * |  |  |  |
| EDTDATEG | DS | 0H |  |
| * |  | R1 POINTS TO GREGORIAN DATE, 'MMDDYY' |  |
|  | PACK | EDTDDDC,2(2,1) |  |
|  | PACK | EDTYYC,4(2,1) |  |
|  | MVO | EDTYYDDD(2),EDTYYC | YYCDD <— 0YYC |
|  | LA | 15,EDTMONTH |  |
|  | ZAP | EDTYYYC,EDTYYC |  |
|  | DP | EDTYYYC,EDTP004 |  |
|  | CP | EDTYYYC+L'EDTYYYC-L'EDTP004(L'EDTP004),EDTP000 |  |
|  | BNE | EDTDATE6 |  |
|  | LA | 15,EDTMONT2 |  |
| EDTDATE6 | DS | 0H |  |
|  | LA | 14,12 |  |
| EDTDATE7 | DS | 0H |  |
|  | CLC | 0(2,1),2(15) |  |
|  | BE | EDTDATE8 |  |
|  | LA | 15,4(15) |  |
|  | BCT | 14,EDTDATE7 |  |
| EDTDATE8 | DS | 0H |  |
|  | AP | EDTDDDC,0(2,15) |  |
|  | ZAP | EDTYYDDD+1(2),EDTDDDC | YYDDDC <— DDDC |
|  | LA | 1,EDTYYDDD | P'YYDDDC' |
|  | LR | 14,0 |  |
|  | BR | 14 |  |
| * |  |  |  |
|  | LTORG |  |  |
| * |  |  |  |
| * |  |  |  |
|  | DROP | 13 |  |
|  | DROP | 12 |  |
|  | DROP | 11 |  |
|  | DROP | 10 |  |

TABLE 1-continued

|  | DROP | 9 |  |
|---|---|---|---|
|  | DROP | 8 |  |
| * |  |  |  |
| * |  |  |  |
| * |  |  |  |
|  | DS | 0F |  |
| THEWORK | DS | XL32768 |  |
| THEWORKL | EQU | 32768 |  |
| * |  |  |  |
| THEWORK2 | DS | XL32768 | MAXIMUM 2000 TEXT LIBRARY MEMBERS |
|  | DS | XL32768 |  |
|  | DS | XL32768 |  |
|  | DS | XL32768 |  |
| THEWORK3 | DS | XL32768 |  |
|  | DS | XL32768 |  |
| * |  |  |  |
|  | END |  |  |

What is claimed is:

1. A device for distributing a single mainframe program load module, when the receiver of the program load module does not have the program PCFORM, comprising:

a sender programmer at the sender's site with a file transfer-enabled mainframe PC terminal for creating required JCL streams, for creating required datasets, for submitting required JCL streams, for creating the download sequential dataset records, for downloading the download sequential dataset to the PC and for creating PC-based data media to send to the receiver's site;

a program load module at the sender's site to be delivered to the receiver's site;

a download sequential dataset at the sender's site for storing the output of the program PCFORM;

a program PCFORM at the sender's site for converting the sender's program load module to fixed length records of the download sequential dataset whose logical record length is equal to the block size of the sender's program load module library which is adjusted by the IBM linkage editor IEWL;

a downloaded PC hard disk file at the sender's site for storing the downloaded content of the mainframe download sequential dataset;

a receiver programmer at the receiver's site with a file transfer-enabled mainframe PC terminal for receiving the data from the sender, for creating required JCL streams, for creating required datasets, for uploading the received data from the PC to the mainframe, and for submitting required JCL streams;

an upload sequential dataset at the receiver's site, whose logical record length is equal to the logical record length of the download sequential dataset at the sender's site, for storing the data uploaded from the PC at the receiver's site; and a destination load module library at the receiver's site for storing the program load module processed from the upload sequential dataset by the IBM utility programs IEBGENER and IEWL.

2. A device for distributing a part or whole of a mainframe load library comprising:

a sender programmer at the sender's site with a file transfer-enabled mainframe terminal for creating required JCL streams, for creating required datasets, for submitting required JCL streams, for creating the download sequential dataset records, for downloading the download sequential dataset to the PC and for creating PC-based data media to send to the receiver's site;

a program load module library at the sender's site to be delivered to the receiver's site;

a download sequential dataset at the sender's site, which is of fixed length record format and its logical record length is 80 bytes or greater, for storing the output of the program PCFORM;

a control command and optional member names at the sender's site for the program PCFORM to select all library or the specified members of the sender's program load module library;

a program PCFORM at the sender's site for converting a part or whole of the sender's program load module library to the download sequential dataset of fixed length records;

a downloaded PC hard disk file at the sender's site for storing the downloaded content of the mainframe download sequential dataset;

a receiver programmer at the receiver's site with a mainframe PC terminal for receiving the data from the sender, for creating required JCL streams, for creating required datasets, for uploading the received data from the PC to the mainframe, and for submitting required JCL streams;

an upload sequential dataset at the receiver's site, which is of fixed length record format and its logical record length is equal to the logical record length of the download sequential dataset at the sender's site, for storing the data uploaded from a PC at receiver's site;

a control command and optional member names at the receiver's site for the program PCFORM to select all members or the specified members from the upload sequential dataset;

a destination load module library at the receiver's site for storing the program load modules, which are executable and preserve the integrity of the original's functionality, from the upload sequential dataset; and a program PCFORM at the receiver's site for converting a part or whole of the upload sequential dataset records to the members of the destination program load module library.

3. A device for distributing a part or whole of a text library comprising:

a sender programmer at the sender's site with a file transfer-enabled mainframe terminal for creating required JCL streams, for creating required datasets, for submitting required JCL streams, for creating the download sequential dataset records, for downloading the download sequential dataset to the PC and for creating PC-based data media to send to the receiver's site;

a text library at the sender's site to be delivered to the receiver's site;

a download sequential-dataset at the sender's site, which is of fixed length record format and its logical record length is always 80 bytes, for storing the output of the program PCFORM;

a control command and optional member names at the sender's site for the program PCFORM to select all library or the specified members of the sender's text library;

a program PCFORM at the sender's site for dumping a part or whole of the sender's text library to the download sequential dataset of fixed length records;

a downloaded PC hard disk file at the sender's site for storing the downloaded content of the mainframe download sequential dataset;

a receiver programmer at the receiver's site with a mainframe PC terminal for receiving the data from the sender, for creating required JCL streams, for creating required datasets, for uploading the received data from the PC to the mainframe, and for submitting required JCL streams;

an upload sequential dataset at the receiver's site, which is of fixed length record format and its logical record length is always 80 bytes, for storing the data uploaded from a PC at the receiver's site;

a control command and optional member names at the receiver's site for the program PCFORM to select all members or the specified members from the upload sequential dataset;

a destination text library at the receiver's site for storing the texts from the upload sequential dataset with the same member directory index information as that of the original text library at the sender's site; and a program PCFORM at the receiver's site for loading a part or whole of the upload sequential dataset records to the members of the destination text library.

4. The PC data media distributing device of claims 2 or 3 wherein said optional member names at the sender's site and at the receiver's site can be different from each other if specified.

5. The PC data media distributing device of claims 2 or 3 wherein said program PCFORM at the sender's site converts only the members specified in said optional member name list from said sender's program load module library or text library to fixed length records of said download sequential dataset, and if said control command has no said member names, converts all the members of said sender's program load module library or text library to records of said download sequential dataset.

6. The PC data media distributing device of claims 2 or 3 wherein said program PCFORM at the receiver's site converts only the records of the members specified in said optional member name list from said upload sequential dataset to members of said destination load module library or text library, and if said control command has no said member names, converts all the records of said upload sequential dataset to members of said destination load module library or text library.

7. The PC data media distributing device of claims 1, 2, or 3 wherein said download sequential dataset at the sender's site can be reverted back to its original form at the sender's mainframe.

8. The PC data media distributing device of claim 3 wherein said download sequential dataset at the sender's site and said upload sequential dataset at the receiver's site can be browsed and edited using mainframe text editors at either of the respective sites.

9. The PC data media distributing device of claim 3 wherein, even if said download sequential dataset at the sender's site and said upload sequential dataset at the receiver's site were edited and modified using mainframe text editors at either the sender's or receiver's site, the modified data can be reverted to a text library with any modifications in the mainframes at either of the respective sites.

10. The PC data media distributing device of claims 1, 2, or 3 wherein, if a copy of said download sequential dataset from the sender's site is delivered to the receiver's site, it can be reverted to its original form at the receiver's site.

11. The PC data media distributing device of claims 1, 2, or 3 wherein said downloaded PC hard disk file at the sender's site can be reverted to its original form if it is uploaded back to the sender's mainframe.

12. The PC data media distributing device of claims 1, 2, or 3 wherein, if a copy of said downloaded PC hard disk file at the sender's site is delivered to the receiver's site, it can be reverted to its original form at the receiver's site, if it is uploaded to the receiver's mainframe.

13. The PC data media distributing device of claim 3 wherein said downloaded PC hard disk file at the sender's site and the copy of said downloaded PC hard disk file which is delivered to the receiver's site can be browsed, edited, and printed using PC word processors or ASCII editors on a PC at the respective sites.

14. The PC data media distributing device of claim 3 wherein, even if said downloaded PC hard disk file at the sender's site were edited and modified using PC word processors or ASCII editors at the sender's site, it can still be reverted to its original form, including any modifications, in the sender's mainframe and, if it is delivered to the receiver's site, it can be reverted to its original form, including any modifications in the receiver's mainframe.

15. The PC data media distributing device of claim 3 wherein, even if the text library data delivered to the receiver's site is edited and modified using PC word processors or ASCII editors in a PC at the receiver's site, it can be reverted at the receiver's site to its original form, including any modifications, if it is uploaded to the receiver's mainframe.

16. The PC data media distributing device of claim 1, 2 or 3 wherein the content of said upload sequential dataset at the receiver's site is exactly the same as the content of said download sequential dataset at the sender's site, except for any text data edited after the download to a PC at the sender's site.

17. The PC data media distributing device of claims 2 or 3 wherein, if said destination load library or text library at the receiver's site already has members with the same names as data in said upload sequential dataset, the old content of the existing members in said destination library are replaced with the new content of the matching members in said upload sequential dataset.

18. The PC data media distributing device of claims 2 or 3 wherein said downloaded PC hard disk files of the text and load libraries at the sender's site can be used as backups for the mainframe text and load libraries at the sender's site.

19. The PC data media distributing device of claim 3 wherein said downloaded PC hard disk files of said text libraries at the sender's site can be edited at a local stand-alone PC, or a copy of said downloaded PC hard disk files can be edited on a PC at a remote site using PC word processors or ASCII editors.

20. A device for distributing a sequential dataset of fixed record format, undefined record format or variable record format comprising:

a sender programmer at the sender's site with a file transfer-enabled mainframe terminal for creating required JCL streams, for creating required datasets, for submitting required JCL streams, for creating the download sequential dataset records, for downloading the download sequential dataset to the PC and for creating PC-based data media to send to the receiver's site;

a sequential dataset of fixed record format, undefined record format or variable record format at the sender's site to be delivered to the receiver's site;

a download sequential dataset at the sender's site, which is of fixed length record format and its logical record length is 80 bytes or greater, for storing the output of the program PCFORM;

a program PCFORM at the sender's site for converting the sequential dataset of fixed record format, undefined record format or variable record format to the download sequential dataset of fixed length records;

a downloaded PC hard disk file at the sender's site for storing the downloaded content of the mainframe download sequential dataset;

a receiver programmer at the receiver's site with a mainframe PC terminal for receiving the data from the sender, for creating required JCL streams, for creating required datasets, for uploading the received data from the PC to the mainframe, and for submitting required JCL streams;

an upload sequential dataset at the receiver's site, which is of fixed length record format and its logical record length is equal to the logical record length of the download sequential dataset at the sender's site, for storing the data uploaded from a PC at receiver's site;

a destination sequential dataset of fixed record format, undefined record format or variable record format at the receiver's site, with the same record format as the record format of the download sequential dataset at the sender's site, and with the same logical record length when fixed record format or the same block size when undefined record format or variable record format as the respective sequential dataset at the sender's site, for storing the data from the upload sequential dataset; and a program PCFORM at the receiver's site for converting the upload sequential dataset records to the destination sequential dataset of fixed record format, undefined record format or variable record format.

21. The PC data media distributing device of claims 20 wherein said any sequential dataset of fixed record format, undefined record format or variable record format at the sender's site can be delivered to the receiver's site and reverted to the destination sequential dataset of the same record format of its original form at the receiver's site.

22. The PC data media distributing device of claims 1, 2, 3 or 20 wherein a single load module, a part or whole of a text or load library, or a sequential dataset of any record format can be delivered from one mainframe data center to another using PC-based data media, such as floppy diskettes, recordable CD-ROM's, ZIP disks, Internet world wide web download, Internet-based email attachment, TCP/IP FTP GET/PUT, and other PC data media available now and in the future, without the use of conventional magnetic tapes, and can be reverted to its original form at another mainframe data center.

\* \* \* \* \*

UNITED STATES PATENT AND TRADEMARK OFFICE
CERTIFICATE OF CORRECTION

PATENT NO. : 6,886,160 B1
DATED : April 26, 2005
INVENTOR(S) : Lee

It is certified that error appears in the above-identified patent and that said Letters Patent is hereby corrected as shown below:

Title page,
Item [76], Inventor, "57 23 226th St., Bayside, NY (US) 11364-2046" should read
-- 323 Continental Drive, Manhasset Hills, New York, NY 11040 --.

Signed and Sealed this

Second Day of August, 2005

JON W. DUDAS
*Director of the United States Patent and Trademark Office*